US012693766B2

(12) United States Patent
    Ko et al.

(10) Patent No.: US 12,693,766 B2
(45) Date of Patent: Jul. 28, 2026

(54) ELECTRONIC DEVICE INCLUDING A SENSOR LAYER

(71) Applicant: SAMSUNG DISPLAY CO., LTD.,
     Yongin-si (KR)

(72) Inventors: Gwang-Bum Ko, Yongin-si (KR);
     Kyowon Ku, Yongin-si (KR);
     Hyungbae Kim, Yongin-si (KR);
     Kangwon Lee, Yongin-si (KR)

(73) Assignee: SAMSUNG DISPLAY CO., LTD.,
     Yongin-si (KR)

( * ) Notice: Subject to any disclaimer, the term of this
     patent is extended or adjusted under 35
     U.S.C. 154(b) by 10 days.

(21) Appl. No.: 18/795,649

(22) Filed: Aug. 6, 2024

(65) Prior Publication Data

US 2025/0138686 A1     May 1, 2025

(30) Foreign Application Priority Data

Nov. 1, 2023   (KR) ........................ 10-2023-0149464
     Jan. 15, 2024   (KR) ........................ 10-2024-0006157

(51) Int. Cl.
     *G06F 3/044*      (2006.01)
     *G06F 3/041*      (2006.01)

(52) U.S. Cl.
     CPC ........ *G06F 3/0446* (2019.05); *G06F 3/04162*
         (2019.05); *G06F 3/0443* (2019.05);
         (Continued)

(58) Field of Classification Search
     CPC .. G06F 3/0446; G06F 3/04162; G06F 3/0443;
         G06F 3/0448; G06F 2203/04106;
         (Continued)

(56) References Cited

U.S. PATENT DOCUMENTS 5,134,689  A     7/1992   Murakami et al.
    11,726,625  B2    8/2023   Kim et al.
               (Continued)

FOREIGN PATENT DOCUMENTS

EP          4421596 A1    8/2024
JP        2020-095075 A2   6/2020
               (Continued)

OTHER PUBLICATIONS

Extended European Search Report dated Mar. 11, 2025 in corresponding European Patent Application No. 24209855.6, 10 pages.

*Primary Examiner* — Amy Onyekaba
(74) *Attorney, Agent, or Firm* — F. CHAU & ASSOCIATES, LLC

(57)                ABSTRACT

An electronic device includes a display layer, a sensor layer disposed over the display layer, and a lower conductive layer disposed under the display layer. The sensor layer includes a plurality of first electrodes that are arranged in a first direction and extend in a second direction crossing the first direction. A plurality of second electrodes are arranged in the second direction and extend in the first direction. A plurality of third electrodes are arranged in the first direction and extend in the second direction and have first ends that are connected together. The lower conductive layer includes a plurality of fourth electrodes that are arranged in the second direction and extend in the first direction and have first ends that are connected together.

31 Claims, 74 Drawing Sheets

(52) U.S. Cl.
CPC .. G06F 3/0448 (2019.05); *G06F 2203/04106*
*(2013.01); G06F 2203/04111* (2013.01)

(58) Field of Classification Search
CPC ........... G06F 2203/04111; G06F 3/046; G06F
2203/04102; G06F 2203/04112; G06F
3/0412; G06F 3/04164; H10K 59/40
See application file for complete search history.

(56) References Cited

U.S. PATENT DOCUMENTS

| | | | | |
|---|---|---|---|---|
| 11,899,866 | B2 * | 2/2024 | Yeom | G06F 3/04162 |
| 2008/0158848 | A1 * | 7/2008 | Free | G06F 3/046 |
| | | | | 361/818 |
| 2009/0207150 | A1 * | 8/2009 | Obi | G06F 3/046 |
| | | | | 345/174 |
| 2013/0135247 | A1 * | 5/2013 | Na | G06F 21/32 |
| | | | | 345/174 |
| 2014/0347319 | A1 * | 11/2014 | Lin | G06F 3/0445 |
| | | | | 345/174 |
| 2015/0305138 | A1 * | 10/2015 | Tombs | H05K 3/107 |
| | | | | 29/850 |
| 2016/0139701 | A1 * | 5/2016 | Wang | G06F 3/046 |
| | | | | 345/174 |
| 2017/0024602 | A1 * | 1/2017 | Han | G06F 3/0443 |
| 2017/0068368 | A1 * | 3/2017 | Hsiao | G06F 3/0445 |
| 2017/0123555 | A1 * | 5/2017 | Kim | G06V 40/1359 |
| 2017/0123566 | A1 * | 5/2017 | Noguchi | G06F 3/041661 |
| 2017/0139525 | A1 * | 5/2017 | Jo | G06F 3/046 |
| 2018/0260071 | A1 * | 9/2018 | Kim | G06V 40/1306 |
| 2018/0348912 | A1 * | 12/2018 | Lee | G06F 3/0448 |
| 2021/0019007 | A1 * | 1/2021 | Park | G06F 3/0443 |
| 2021/0072864 | A1 * | 3/2021 | Park | G06F 3/0412 |
| 2022/0187979 | A1 * | 6/2022 | Jung | G06F 3/04166 |
| 2022/0197440 | A1 * | 6/2022 | Son | G06F 3/0418 |
| 2023/0096996 | A1 * | 3/2023 | Kishimoto | H10K 59/131 |
| | | | | 345/174 |
| 2023/0195269 | A1 * | 6/2023 | Lee | G06F 3/0443 |
| | | | | 345/173 |
| 2023/0351796 | A1 * | 11/2023 | Liu | G06V 40/1306 |
| 2025/0264946 | A1 * | 8/2025 | Moon | G06F 3/04162 |

FOREIGN PATENT DOCUMENTS

| | | | |
|---|---|---|---|
| KR | 10-2022-0169972 A | | 12/2022 |
| KR | 10-2526461 B1 | | 4/2023 |
| WO | WO2023068872 A1 | * | 4/2023 |

* cited by examiner 1000-2

DP

DR2

DR1

DR3

EE

Wc

DR2

DR3 DR1

(1-M)

(2-M)

(2-M)

(2-M)

ELECTRONIC DEVICE INCLUDING A SENSOR LAYER

CROSS-REFERENCE TO RELATED APPLICATIONS

This application claims priority under 35 U.S.C. § 119 to Korean Patent Application Nos. 10-2023-0149464 filed on Nov. 1, 2023 and 10-2024-0006157 filed on Jan. 15 2024, in the Korean Intellectual Property Office, the disclosures of which are incorporated by reference herein in their entireties.

TECHNICAL FIELD

The present disclosure relates to an electronic device and, more specifically, to an electronic device including a sensor layer.

DISCUSSION OF THE RELATED ART

Multimedia electronic devices, such as televisions, mobile phones, tablet computers, notebook computers, car navigation units, portable game consoles, and the like, often include a display device for displaying an image. The electronic devices may include a sensor layer (or, an input sensor) capable of providing a touch-based input method that enables a user to intuitively and conveniently input information or instructions, in addition to a conventional input method such as a button, a keyboard, a mouse, or the like. The sensor layer may sense the user's touch or pressure. While some such displays are designed for registering a touch of only a finger of the user, other such displays are specially designed to also be able to register a more precise touch of a stylus/pen device, which may be more intuitive for users who are accustomed to writing with conventional pens, particularly when sketching or drawing.

SUMMARY

An electronic device includes a display layer, a sensor layer disposed over the display layer, and a lower conductive layer disposed under the display layer. The sensor layer includes a plurality of first electrodes arranged in a first direction and extending in a second direction crossing the first direction, a plurality of second electrodes arranged in the second direction and extending in the first direction, and a plurality of third electrodes either arranged in the first direction and extending in the second direction or arranged in the second direction and extending in the first direction, the plurality of third electrodes having first ends connected together. The lower conductive layer includes a plurality of fourth electrodes arranged in the direction of extension of the plurality of third electrodes and extending in the direction of arrangement of the third electrodes, the plurality of fourth electrodes have first ends connected together.

The plurality of first electrodes and the plurality of third electrodes may be disposed on a same layer. The direction of extension of the third electrodes may correspond to the first direction or the second direction, and the plurality of first electrodes may alternate with the plurality of third electrodes.

The plurality of second electrodes and the plurality of third electrodes may be disposed on a same layer. The direction of extension of the third electrodes may correspond to the first direction or the second direction, and the plurality of second electrodes may alternate with the plurality of third electrodes.

Each of the plurality of first electrodes, the plurality of second electrodes, and the plurality of third electrodes may include sensing portions having a rhombic shape and bridge portions, each of which is disposed between sensing portions adjacent to each other among the sensing portions.

The sensing portions and the bridge portions of each of the plurality of first electrodes, the plurality of second electrodes, and the plurality of third electrodes may have a single-body shape, and the plurality of second electrodes may be disposed on a layer different from a layer on which the plurality of first electrodes and the plurality of third electrodes are disposed.

The sensing portions and the bridge portions of each of the plurality of first electrodes and the plurality of third electrodes may have a single-body shape and the sensing portions and the bridge portions of each of the plurality of second electrodes may be disposed on different layers, and the bridge portions of each of the plurality of second electrodes may be disposed on a layer different from a layer on which the plurality of first electrodes and the plurality of third electrodes are disposed.

In one sensing unit of the sensor layer, each of the plurality of first electrodes, the plurality of second electrodes, and the plurality of third electrodes may include four sensing portions and three bridge portions, and among the four sensing portions, a first two sensing portions may have a rhombic shape, and a second two sensing portions may have a half-rhombic shape.

In one sensing unit of the sensor layer, each of the plurality of first electrodes, the plurality of second electrodes, and the plurality of third electrodes may include six sensing portions and five bridge portions, and among the six sensing portions, four sensing portions may have a rhombic shape, and two sensing portions may have a half-rhombic shape.

Each of the plurality of fourth electrodes may include sensing portions having a rhombic shape and bridge portions, each of which may be disposed between sensing portions adjacent to each other among the sensing portions.

Each of the plurality of first electrodes, the plurality of second electrodes, and the plurality of third electrodes may have a bar shape extending in a same direction.

Each of the plurality of first electrodes, the plurality of second electrodes, and the plurality of third electrodes may have a single-body shape, and the plurality of second electrodes may be disposed on a layer different from a layer on which the plurality of first electrodes and the plurality of third electrodes are disposed.

Each of the plurality of first electrodes and the plurality of third electrodes may have a single-body shape, each of the plurality of second electrodes may include sensing portions and bridge portions disposed on different layers, and each of the plurality of first electrodes and the plurality of third electrodes may cross a corresponding bridge portion among the bridge portions of each of the plurality of second electrodes. The bridge portions of each of the plurality of second electrodes may be disposed on a layer different from a layer on which the plurality of first electrodes and the plurality of third electrodes are disposed.

Each of the plurality of fourth electrodes may have a bar shape extending in a same direction.

The sensor layer may further include floating patterns disposed between a first electrode and a third electrode adjacent to each other among the plurality of first electrodes and the plurality of third electrodes.

The sensor layer may further include ground patterns disposed between a first electrode and a third electrode adjacent to each other among the plurality of first electrodes and the plurality of third electrodes.

Each of the plurality of first electrodes may include a first-first divided electrode and a first-second divided electrode connected in parallel, and the first-first divided electrode and the first-second divided electrode may each extend in the second direction and may be spaced apart from each other in the first direction. In one sensing unit of the sensor layer, one third electrode may be disposed between the first-first divided electrode and the first-second divided electrode connected in parallel.

Each of the plurality of second electrodes may include a second-first divided electrode, a second-second divided electrode, and a second-third divided electrode connected in parallel. The second-first divided electrode, the second-second divided electrode, and the second-third divided electrode may each extend in the first direction and may be arranged in the second direction.

The sensor layer may further include electrically-floated or grounded dummy patterns. Some of the second-first divided electrode, the second-second divided electrode, and the second-third divided electrode may be omitted, and the dummy patterns may be disposed in areas where the some of the second-first divided electrode, the second-second divided electrode, and the second-third divided electrode are omitted.

Each of the plurality of second electrodes may include a second-first divided electrode, a second-second divided electrode, a second-third divided electrode, a second-fourth divided electrode, and a second-fifth divided electrode connected in parallel. The second-first divided electrode, the second-second divided electrode, the second-third divided electrode, the second-fourth divided electrode, and the second-fifth divided electrode may each extend in the first direction and may be arranged in the second direction.

The sensor layer may further include electrically-floated or grounded dummy patterns. Some of the second-first divided electrode, the second-second divided electrode, the second-third divided electrode, the second-fourth divided electrode, and the second-fifth divided electrode may be omitted, and the dummy patterns may be disposed in areas where the some of the second-first divided electrode, the second-second divided electrode, the second-third divided electrode, the second-fourth divided electrode, and the second-fifth divided electrode are omitted.

Each of the plurality of third electrodes may include a third-first divided electrode and a third-second divided electrode connected in parallel, and the third-first divided electrode and the third-second divided electrode may each extend in the second direction and may be spaced apart from each other in the first direction. In one sensing unit of the sensor layer, one first electrode may be disposed between the third-first divided electrode and the third-second divided electrode connected in parallel.

A pitch of sensing units of the lower conductive layer may range from 10% less than a pitch of sensing units of the sensor layer to 10% more than the pitch of the sensing units of the sensor layer.

The electronic device may further include a sensor driver configured to selectively operate in a first mode to sense a touch input and a second mode to sense a pen input. The plurality of first electrodes and the plurality of second electrodes may be configured to be driven in the first mode, and the plurality of third electrodes and the plurality of fourth electrodes may be configured to be driven in the second mode.

The second mode may include a charging drive mode and a pen sensing drive mode, and in the charging drive mode, either the plurality of third electrodes or the plurality of fourth electrodes may be driven, and in the pen sensing drive mode, the plurality of third electrodes and the plurality of fourth electrodes may be driven.

The electronic device may further include a first sensor driver configured to operate in a first mode to sense a touch input and a second sensor driver configured to operate in a second mode to sense a pen input. The plurality of first electrodes and the plurality of second electrodes may be configured to be driven in the first mode, and the plurality of third electrodes and the plurality of fourth electrodes may be configured to be driven in the second mode.

Each of the plurality of first electrodes, the plurality of second electrodes, the plurality of third electrodes, and the plurality of fourth electrodes may have a mesh shape. Each of the plurality of first electrodes, the plurality of second electrodes, the plurality of third electrodes, and the plurality of fourth electrodes may have a single-layer structure or a multi-layer structure.

The electronic device may further include a support plate disposed under the display layer. The lower conductive layer may be disposed directly on an upper surface or a lower surface of the support plate.

The electronic device may further include a support plate disposed under the display layer and a lower plate disposed under the support plate. The lower conductive layer may be disposed directly on an upper surface or a lower surface of the lower plate.

The electronic device may further include a protective film disposed under the display layer and a support plate disposed under the protective film. The lower conductive layer may be disposed between the protective film and the support plate.

An electronic device includes a display layer, a sensor layer disposed over the display layer, and a lower conductive layer disposed under the display layer. The sensor layer includes a plurality of first electrodes arranged in a first direction and extending in a second direction crossing the first direction, a plurality of second electrodes arranged in the second direction and extending in the first direction, and a plurality of third electrodes either arranged in the first direction and extending in the second direction or arranged in the second direction and extending in the first direction. The lower conductive layer includes a plurality of fourth electrodes arranged in the direction of extension of the plurality of third electrodes and extending in the direction of arrangement of the third electrode. The plurality of first electrodes and the plurality of second electrodes are configured to sense a touch input in a first mode. The plurality of third electrodes and the plurality of fourth electrodes are configured to sense a pen input in a second mode.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1A:
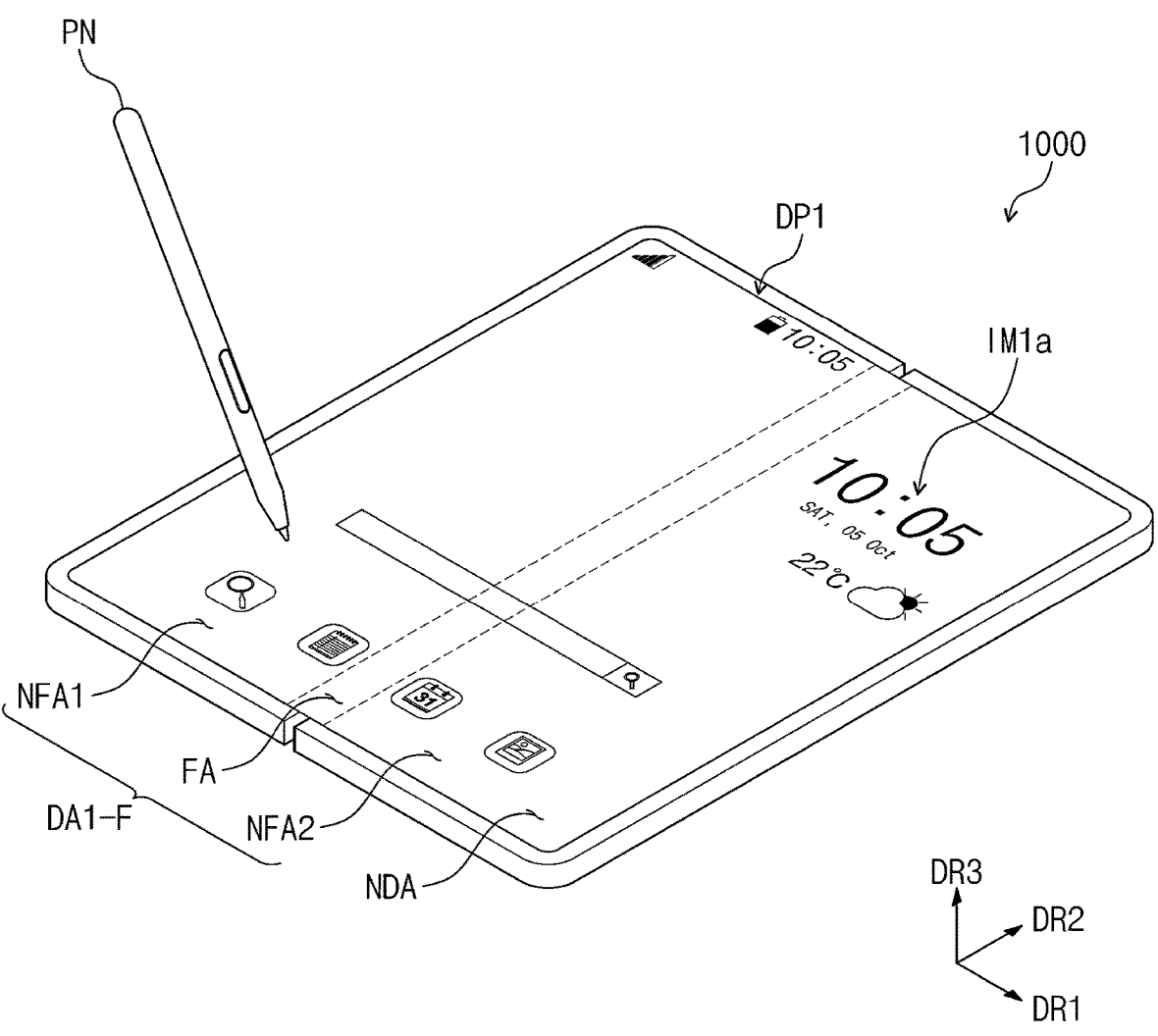
FIG. 1A is a perspective view of an electronic device according to an embodiment of the present disclosure.

In this specification, when it is mentioned that a component (or, an area, a layer, a part, etc.) is referred to as being "on", "connected to" or "coupled to" another component, this means that the component may be directly on, connected to, or coupled to the other component or a third component may be present therebetween.

Identical reference numerals may refer to identical components throughout the specification and the drawings. Additionally, while each drawing may represent one or more particular embodiments of the present disclosure, drawn to scale, such that the relative lengths, thicknesses, and angles can be inferred therefrom, it is to be understood that the present invention is not necessarily limited to the relative lengths, thicknesses, and angles shown. Changes to these values may be made within the spirit and scope of the present disclosure, for example, to allow for manufacturing limitations and the like. As used herein, the term "and/or" includes all of one or more combinations defined by related components.

Terms such as first, second, and the like may be used to describe various components, but the components should not necessarily be limited by the terms. The terms may be used for distinguishing one component from other components. For example, without departing the scope of the present disclosure, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

It should be understood that terms such as "comprise", "include", and "have", when used herein, specify the presence of stated features, numbers, steps, operations, components, parts, or combinations thereof, but do not necessarily preclude the presence or addition of one or more other features, numbers, steps, operations, components, parts, or combinations thereof.

Hereinafter, embodiments of the present disclosure will be described with reference to the accompanying drawings.

Figure 1B:
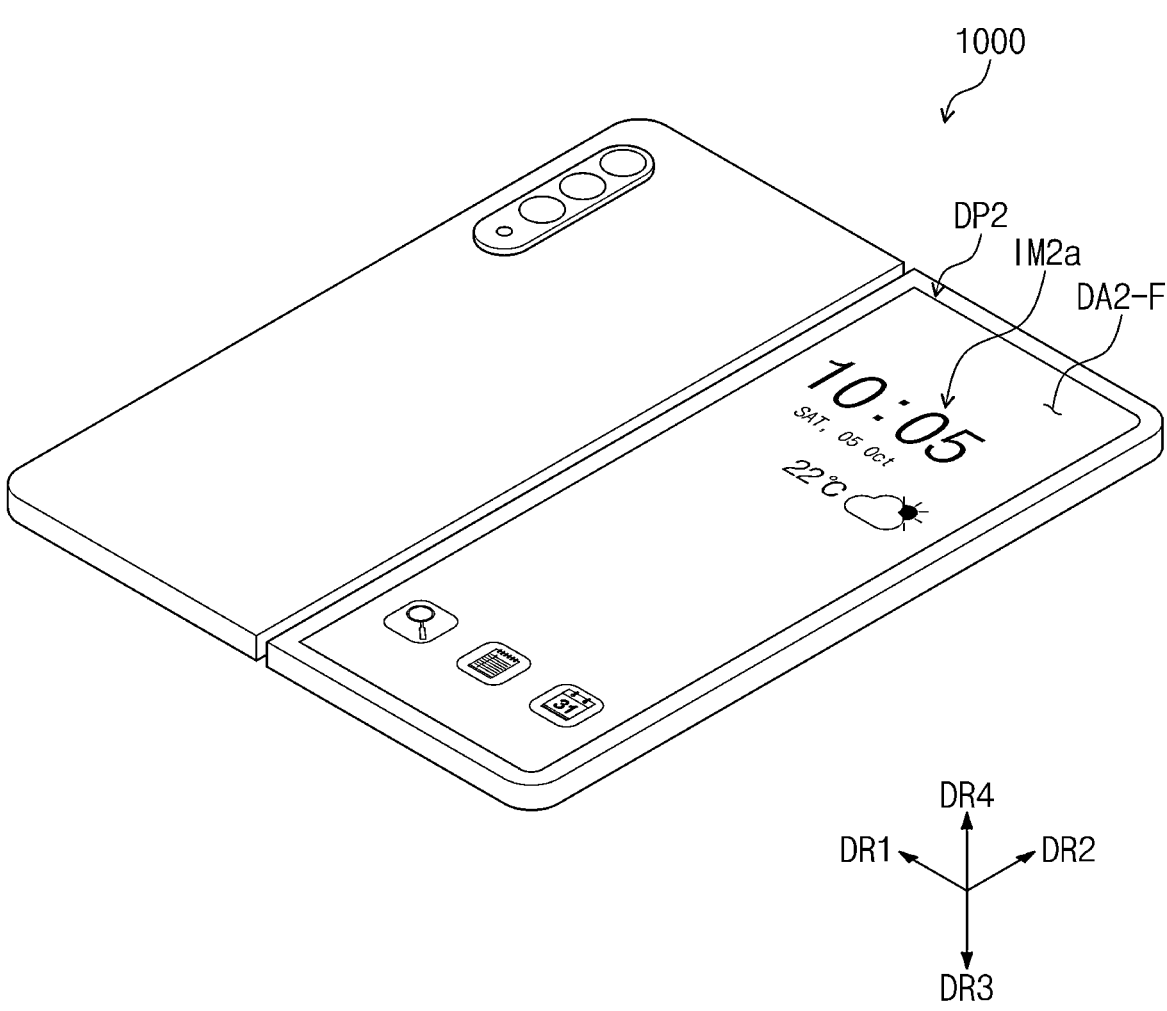
FIG. 1B is a rear perspective view of the electronic device according to an embodiment of the present disclosure.

FIG. 1A is a perspective view of an electronic device 1000 according to an embodiment of the present disclosure. FIG. 1B is a rear perspective view of the electronic device 1000 according to an embodiment of the present disclosure.

Referring to FIGS. 1A and 1B, the electronic device 1000 may be a device activated in response to an electrical signal. For example, the electronic device 1000 may display an image and may sense external input. The external input may be a user input. The user input may include various types of external inputs such as a part of a user's body, a pen PN, light, heat, or pressure.

The electronic device may include a first display panel DP1 and a second display panel DP2. The first display panel DP1 and the second display panel DP2 may be separate panels separated from each other. The first display panel DP1 may be referred to as the main display panel, and the second display panel DP2 may be referred to as an auxiliary display panel or an external display panel.

The first display panel DP1 may include a first display DA1-F, and the second display panel DP2 may include a second display DA2-F. The second display panel DP2 may have a smaller area than the first display panel DP1. The area of the first display DA1-F may be larger than the area of the second display DA2-F to correspond to the sizes of the first display panel DP1 and the second display panel DP2.

In an unfolded state of the electronic device 1000, the first display DA1-F may have a plane extending substantially in a first direction DR1 and a second direction DR2. The thickness direction of the electronic device 1000 may be in a third direction DR3 that crosses the first direction DR1 and the second direction DR2. Accordingly, front surfaces (or, upper surfaces) and rear surfaces (or, lower surfaces) of elements constituting the electronic device 1000 may be defined based on the third direction DR3.

The first display panel DP1 or the first display DA1-F may include a folding area FA that is folded and unfolded and a plurality of non-folding areas NFA1 and NFA2 spaced apart from each other with the folding area FA disposed therebetween. The second display panel DP2 may overlap one of the plurality of non-folding areas NFA1 and NFA2. For example, the second display panel DP2 may overlap the first non-folding area NFA1.

The display direction of a first image IM1a displayed on a portion of the first display panel DP1, for example, the first non-folding area NFA1 may be opposite to the display direction of a second image IM2a displayed on the second display panel DP2. For example, the first image IM1a may be displayed in the third direction DR3, and the second image IM2a may be displayed in a fourth direction DR4 opposite to the third direction DR3.

In an embodiment of the present disclosure, the folding area FA may be bent about a folding axis extending in a direction parallel to the long sides of the electronic device 1000, for example, in the second direction DR2. The folding area FA has a certain radius of curvature in a folded state of the electronic device 1000. The electronic device 1000 may be folded in an in-folding manner such that the first non-folding area NFA1 and the second non-folding area NFA 2 face each other and the first display DA1-F is not exposed to the outside.

In an embodiment of the present disclosure, the electronic device 1000 may be folded in an out-folding manner such that the first display DA1-F is exposed to the outside. In an embodiment of the present disclosure, the electronic device 1000 may be folded in an in-folding or out-folding manner in the unfolded state. However, the present disclosure is not necessarily limited thereto.

Although FIG. 1A illustrates an example that one folding area FA is defined in the electronic device 1000, the present disclosure is not necessarily limited thereto. For example, a plurality of folding axes and a plurality of folding areas corresponding thereto may be defined in the electronic device 1000, and the electronic device 1000 may be folded about the plurality of folding axes in an in-folding or out-folding manner in the unfolded state.

According to an embodiment of the present disclosure, at least one of the first display panel DP1 or the second display panel DP2 may sense an input by the pen PN even without a digitizer. Since the digitizer for sensing the pen PN is omitted, an increase in the thickness and weight of the electronic device 1000 and a decrease in the flexibility of the electronic device 1000 depending on the addition of the digitizer might not occur. Accordingly, not only the first display panel DP1 but also the second display panel DP2 may be designed to sense the pen PN.

Figure 2:
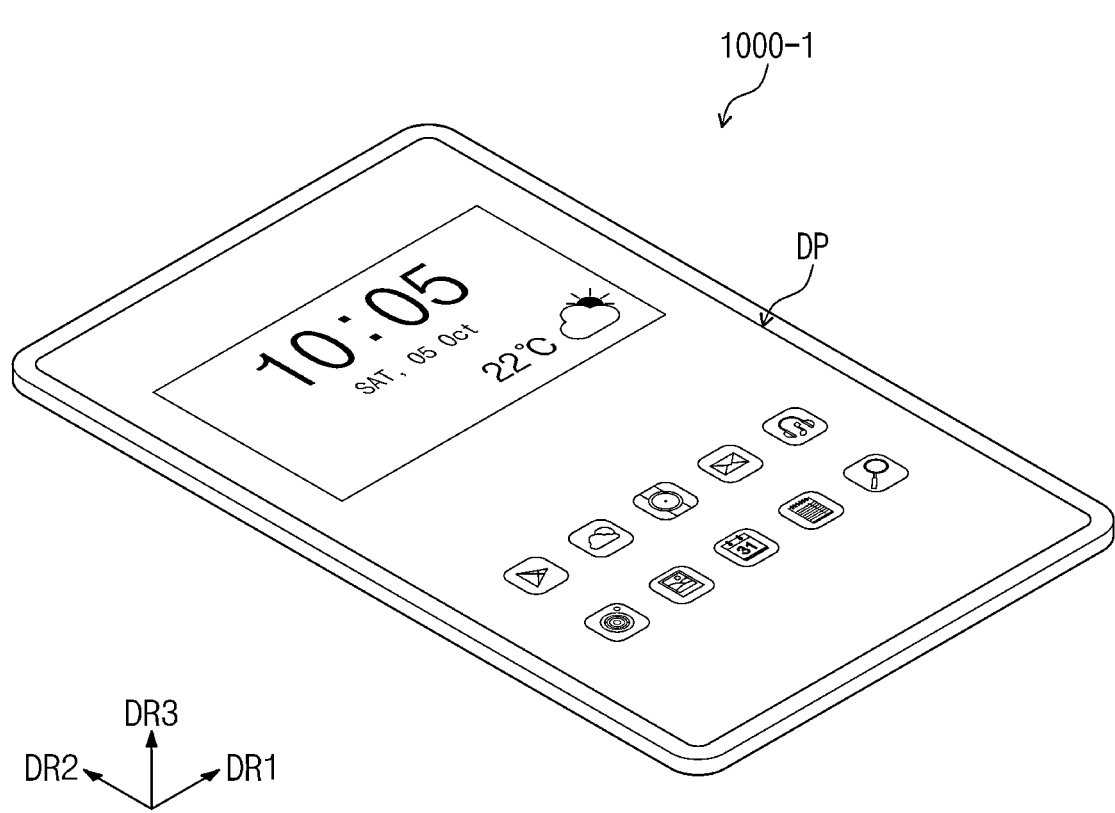
FIG. 2 is a perspective view of an electronic device according to an embodiment of the present disclosure.
Figure 3:
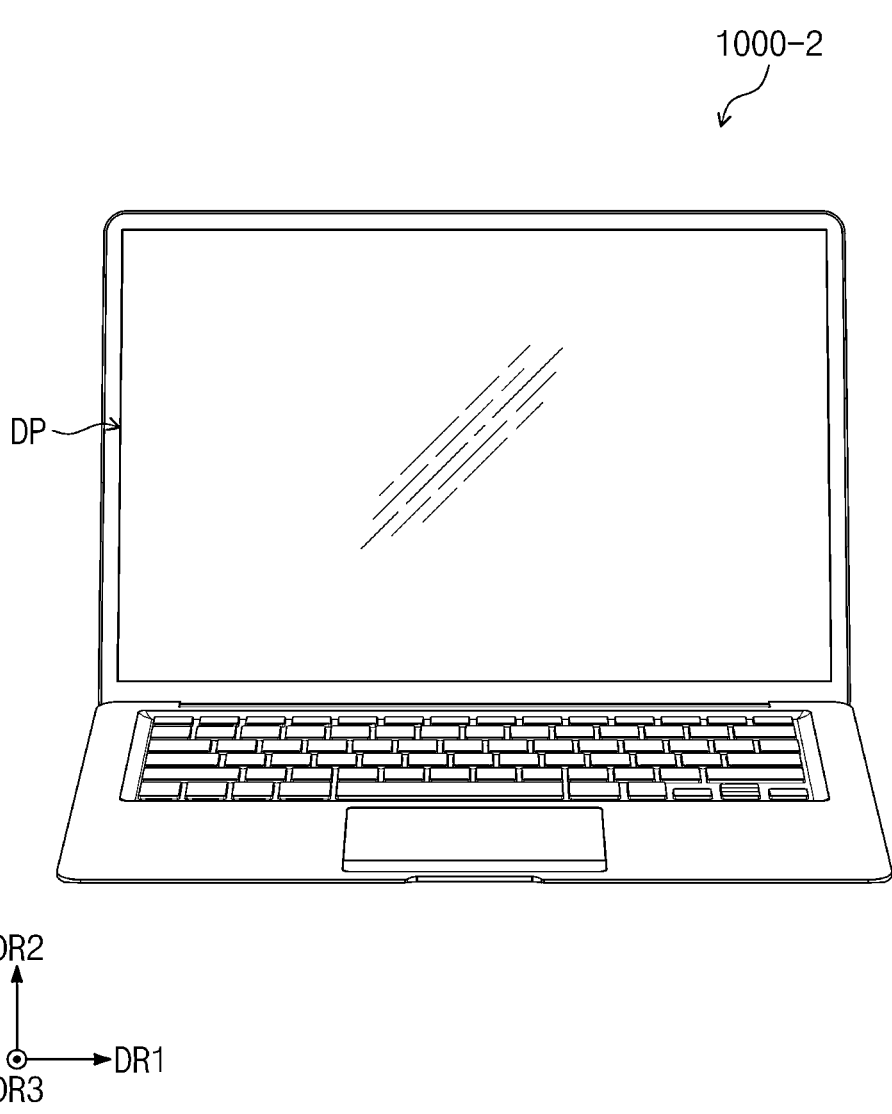
FIG. 3 is a perspective view of an electronic device according to an embodiment of the present disclosure.

FIG. 2 is a perspective view of an electronic device 1000-1 according to an embodiment of the present disclosure. FIG. 3 is a perspective view of an electronic device 1000-2 according to an embodiment of the present disclosure.

Although FIG. 2 illustrates an example that the electronic device 1000-1 is a mobile phone, the electronic device 1000-1 may include a display panel DP. Although FIG. 3 illustrates an example that the electronic device 1000-2 is a notebook computer, the electronic device 1000-2 may include a display panel DP.

In an embodiment of the present disclosure, the display panel DP may sense inputs applied thereto. The external input may be a user input. The user input may include various types of external inputs such as touch by a part of a user's body, the pen PN (refer to FIG. 1A), light, heat, or pressure.

According to an embodiment of the present disclosure, the display panel DP may sense an input by the pen PN even without a digitizer. Since the digitizer for sensing the pen PN is omitted, an increase in the thickness and weight of the electronic device 1000-1 or 1000-2 depending on the addition of the digitizer might not occur.

Although the foldable electronic device 1000 is illustrated in FIG. 1A, the bar-type electronic device 1000-1 is illustrated in FIG. 2, and the present disclosure is not necessarily limited thereto. For example, the following descriptions may be applied to various electronic devices such as a rollable electronic device, a slidable electronic device, and a stretchable electronic device.

FIGS. 4A to 4D are cross-sectional views of the electronic device 1000 according to an embodiment of the present disclosure. The cross-sectional views illustrated in FIGS. 4A to 4D may be cross-sectional views illustrating a portion of the electronic device 1000 including the first display panel DP1 of the electronic device 1000 illustrated in FIG. 1A.

Figure 4A:
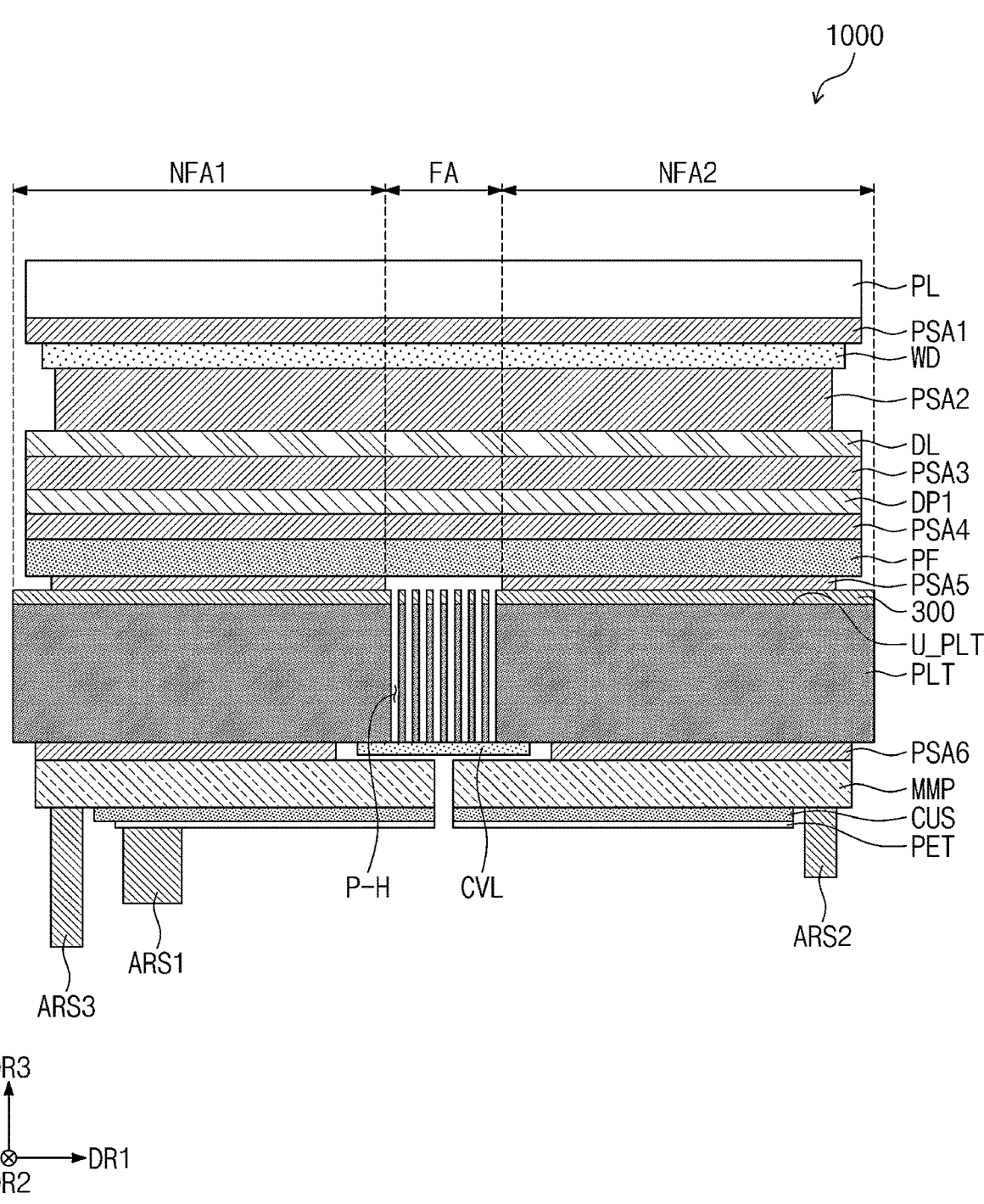
FIGS. 4A to 4D are cross-sectional views of an electronic device according to an embodiment of the present disclosure.

Referring to FIG. 4A, the electronic device 1000 may include the first display panel DP1, upper functional layers, and lower functional layers. The upper functional layers may include components disposed over the first display panel DP1, and the lower functional layers may include components disposed under the first display panel DP1.

The first display panel DP1 may be a component that generates an image and senses an input applied thereto. For example, the first display panel DP1 may include a display layer 100 (refer to FIG. 5) and a sensor layer 200 (refer to FIG. 5).

The upper functional layers may include a protective layer PL, a window WD, an impact absorbing layer DL, and first to third adhesive layers PSA1, PSA2, and PSA3. Components included in the upper functional layers are not necessarily limited to the aforementioned components. At least some of the aforementioned components may be omitted, and other components may be added.

The protective layer PL may protect components disposed under the protective layer PL. The protective layer PL may have a thickness of 60 μm to 70 μm, for example, a thickness of 65 μm. However, the thickness of the protective layer PL is not necessarily limited thereto.

A hard coating layer, an anti-fingerprint layer, and the like may be additionally provided to the protective layer PL to increase characteristics such as chemical resistance, wear resistance, and the like. For example, the hard coating layer may be a functional layer for improving the usage characteristics of the electronic device 1000 and may be provided on the protective layer PL by coating. For example, anti-fingerprint characteristics, anti-contamination characteristics, and anti-scratch characteristics may be increased by the hard coating layer. For example, the hard coating layer may have a thickness of 5 μm, but is not necessarily particularly limited thereto.

The window WD may be disposed under the protective layer PL. The first adhesive layer PSA1 may be disposed between the window WD and the protective layer PL. The first adhesive layer PSA1 may have a thickness of 30 μm to 40 μm, for example, a thickness of 35 μm. However, the thickness of the first adhesive layer PSA1 is not necessarily limited thereto. In an embodiment of the present disclosure, a bezel pattern may be disposed between the first adhesive layer PSA1 and the protective layer PL.

The window WD may include an optically clear insulating material. For example, the window WD may include a glass substrate or a synthetic resin film. The window WD may have a multi-layer structure or a single-layer structure. For example, the window WD may include a plurality of synthetic resin films coupled through an adhesive, or may include a glass substrate and a synthetic resin film coupled through an adhesive. When the window WD is a glass substrate, the window WD may have a thickness of 80 μm or less, for example, a thickness of 30 μm. However, the thickness of the window WD is not necessarily limited thereto.

The impact absorbing layer DL may be disposed under the window WD. The second adhesive layer PSA2 may be disposed between the window WD and the impact absorbing layer DL. The second adhesive layer PSA2 may have a thickness of 70 μm to 80 μm, for example, a thickness of 75 μm. However, the thickness of the second adhesive layer PSA2 is not necessarily limited thereto.

The impact absorbing layer DL may protect the first display panel DP1 by absorbing impact applied toward the first display panel DP1. The impact absorbing layer DL may be manufactured in the form of a stretchable film. For example, the impact absorbing layer DL may include a flexible plastic material. The flexible plastic material may be defined as a synthetic resin film. For example, the impact absorbing layer DL may include a flexible plastic material such as polyimide or polyethylene terephthalate. The impact absorbing layer DL may have a thickness of 18 μm to 28 μm, for example, a thickness of 23 μm. However, the thickness of the impact absorbing layer DL is not necessarily limited thereto. In an embodiment of the present disclosure, the impact absorbing layer DL may be omitted.

The third adhesive layer PSA3 may be disposed between the impact absorbing layer DL and the first display panel DP1. The third adhesive layer PSA3 may have a thickness of 45 μm to 55 μm, for example, a thickness of 50 μm. However, the thickness of the third adhesive layer PSA3 is not necessarily limited thereto.

The lower functional layers may include a protective film PF, a lower conductive layer 300, a plate PLT, a cover layer CVL, a shielding layer MMP, a lower sheet CUS, an insulating film PET, a step compensation members ARS1, ARS2, and ARS3, and fourth to sixth adhesive layers PSA4, PSA5, and PSA6. Components included in the lower functional layers are not necessarily limited to the aforementioned components. At least some of the aforementioned components may be omitted, and other components may be added.

The protective film PF may be coupled to the rear surface of the first display panel DP1 through the fourth adhesive layer PSA4. The fourth adhesive layer PSA4 may have a thickness of 20 μm to 30 μm, for example, a thickness of 25 μm. However, the thickness of the fourth adhesive layer PSA4 is not necessarily limited thereto.

The protective film PF may prevent a scratch on the rear surface of the first display panel DP1 during a manufacturing process of the first display panel DP1. The protective film PF may be a colored polyimide film. For example, the protective film PF may be an opaque yellow film, but is not necessarily limited thereto. The protective film PF may have a thickness of 45 μm to 55 μm, for example, a thickness of 50 μm. However, the thickness of the protective film PF is not necessarily limited thereto.

The plate PLT may be disposed under the protective film PF. The fifth adhesive layer PSA5 may be disposed between the plate PLT and the protective film PF. The fifth adhesive layer PSA5 may have a thickness of 11 μm to 21 μm, for example, a thickness of 16 μm. However, the thickness of the fifth adhesive layer PSA5 is not necessarily limited thereto.

The plate PLT may include carbon fiber reinforced plastic (CFRP), metal, or metal alloy. The plate PLT may support components disposed thereon. Opening P-H may be defined (or, formed or provided) in a portion of the plate PLT. For example, the plate PLT may include the openings P-H having a shape penetrating the upper surface and the lower surface of the plate PLT. The opening P-H may be defined in an area overlapping the folding area FA. The openings P-H may overlap the folding area FA in a plan view, for example, when viewed in the third direction DR3 or the thickness direction of the plate PLT. A portion of the plate PLT may be more easily deformed by the openings P-H. The plate PLT may have a thickness of 160 μm to 180 μm, for example, a thickness of 170 μm. However, the thickness of the plate PLT is not necessarily limited thereto.

The lower conductive layer 300 may be disposed under the first display panel DP1 and over the shielding layer MMP. In an embodiment, the lower conductive layer 300 may be disposed on the upper surface U_PLT of the plate PLT. The lower conductive layer 300 may include patterned electrodes and/or lines. The lower conductive layer 300 may constitute a sensor module SM (refer to FIG. 6) together with the sensor layer 200 (refer to FIG. 5) included in the first display panel DP1. Detailed description thereabout will be given below. The lower functional layers may further include an insulating layer disposed between the lower conductive layer 300 and the plate PLT. The lower functional layers may further include an insulating layer that covers the lower conductive layer 300.

The cover layer CVL may be attached to the plate PLT. The cover layer CVL may cover the openings P-H of the plate PLT. Accordingly, the cover layer CVL may prevent infiltration of foreign matter into the openings P-H. The cover layer CVL may include thermoplastic polyurethane, but is not necessarily limited thereto. The cover layer CVL may have a thickness of 11 μm to 21 μm, for example, a thickness of 16 μm. However, the thickness of the cover layer CVL is not necessarily limited thereto.

The shielding layer MMP may be disposed under the plate PLT and the cover layer CVL. The sixth adhesive layer PSA6 may be disposed between the shielding layer MMP and the plate PLT. The sixth adhesive layer PSA6 may have a thickness of 15 μm to 25 μm, for example, a thickness of 20 μm. However, the thickness of the sixth adhesive layer PSA6 is not necessarily limited thereto.

The shielding layer MMP may include magnetic metal powder. The shielding layer MMP may be referred to as a ferrite sheet, a magnetic metal powder layer, a magnetic layer, a magnetic circuit layer, or a magnetic path layer. The shielding layer MMP may shield a magnetic field that transmits through the first display panel DP1. For example, the shielding layer MMP may serve to induce the direction of the transmitted magnetic field in another direction. Accordingly, the magnetic field that reaches the shielding layer MMP may be shielded without being leaked to the outside, for example, below the shielding layer MMP. The shielding layer MMP may have a thickness of 53 μm to 63 μm, for example, a thickness of 58 μm. However, the thickness of the shielding layer MMP is not necessarily limited thereto.

The lower sheet CUS may be disposed under the shielding layer MMP. The lower sheet CUS may be a sheet that serves to reflect a magnetic field toward the shielding layer MMP. The lower sheet CUS may include metal or metal alloy. For example, the lower sheet CUS may include aluminum, copper, or copper alloy. The lower sheet CUS may have a thickness of 15 μm to 25 μm, for example, a thickness of 20 μm. However, the thickness of the lower sheet CUS is not necessarily limited thereto.

The insulating film PET may be disposed under the lower sheet CUS. The insulating film PET may include polyethylene terephthalate, but is not necessarily limited thereto. The insulating film PET may prevent introduction of static electricity. For example, the insulating film PET may prevent electrical interference between elements disposed on the insulating film PET and elements disposed under the insulating film PET. The insulating film PET may have a thickness of 3 μm to 9 μm, for example, a thickness of 6 μm. However, the thickness of the insulating film PET is not necessarily limited thereto.

The step compensation elements ARS1, ARS2, and ARS3 may include the first step compensation element ARS1 attached to the insulating film PET, the second step compensation element ARS2 attached to the shielding layer MMP, and the third step compensation element ARS3 attached to the shielding layer MMP. The thicknesses of the first to third step compensation elements ARS1, ARS2, and ARS3 may be diversely set depending on a product structure or an arrangement relationship between components. For example, the first step compensation element ARS1 may have a thickness of 90 μm, the second step compensation element ARS2 may have a thickness of 87 μm, and the third step compensation element ARS3 may have a thickness of 87 μm. However, the present disclosure is not necessarily limited thereto.

In an embodiment of the present disclosure, the sixth adhesive layer PSA6, the shielding layer MMP, the lower sheet CUS, and the insulating film PET may each have a structure divided at a portion overlapping the folding area FA. For example, the sixth adhesive layer PSA6, the shielding layer MMP, the lower sheet CUS, and the insulating film PET may each be divided into two components spaced apart from each other with a certain gap at the portion overlapping the folding area FA. The gap may range from 0.6 mm to 1.7 mm, but is not necessarily limited thereto.

Figure 4B:
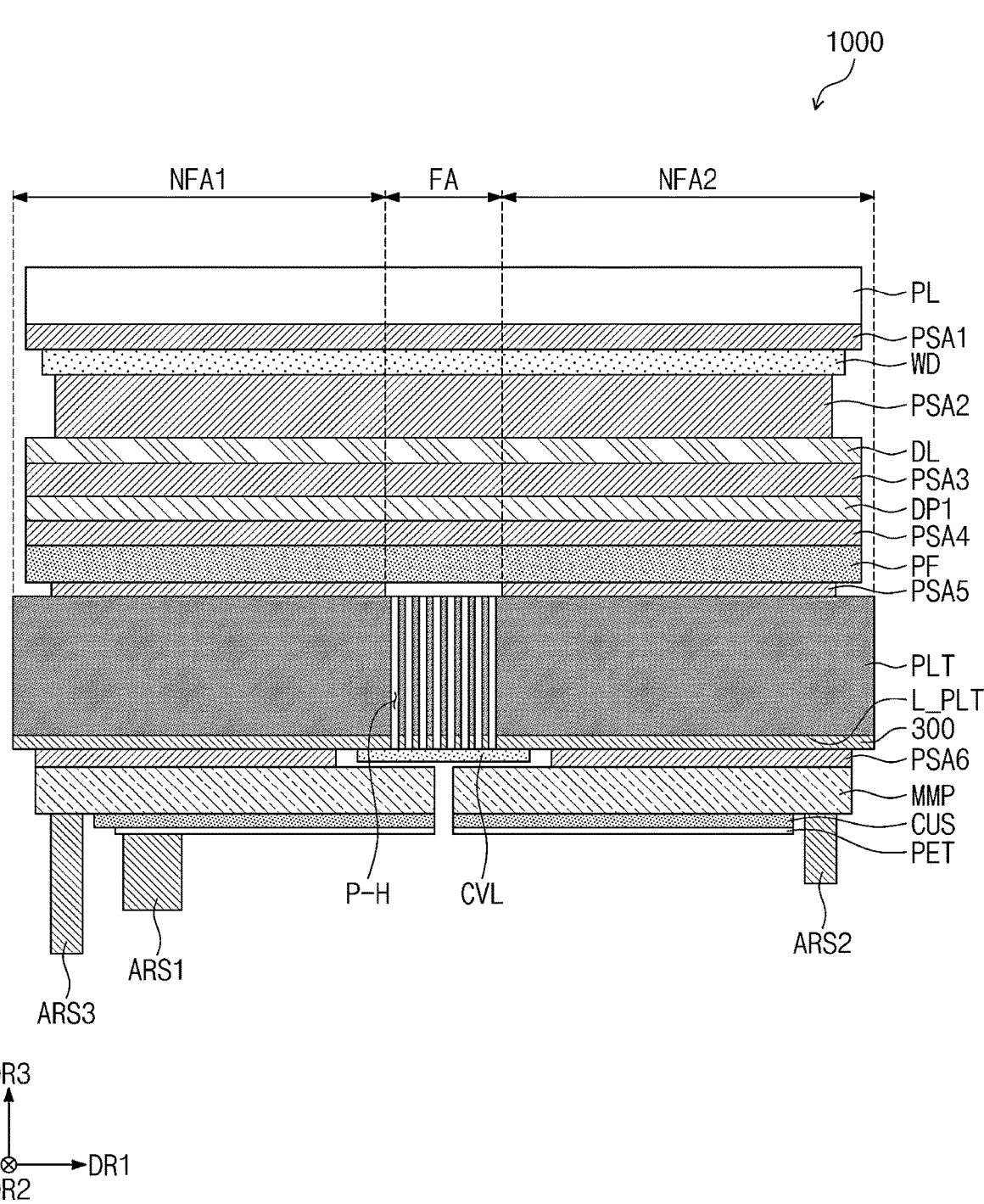

Referring to FIG. 4B, the lower conductive layer 300, according to an embodiment, may be disposed on the lower surface L_PLT of the plate PLT. The lower functional layers may further include an insulating layer disposed between the plate PLT and the lower conductive layer 300. The lower functional layers may further include an insulating layer that covers the lower conductive layer 300.

Figure 4C:
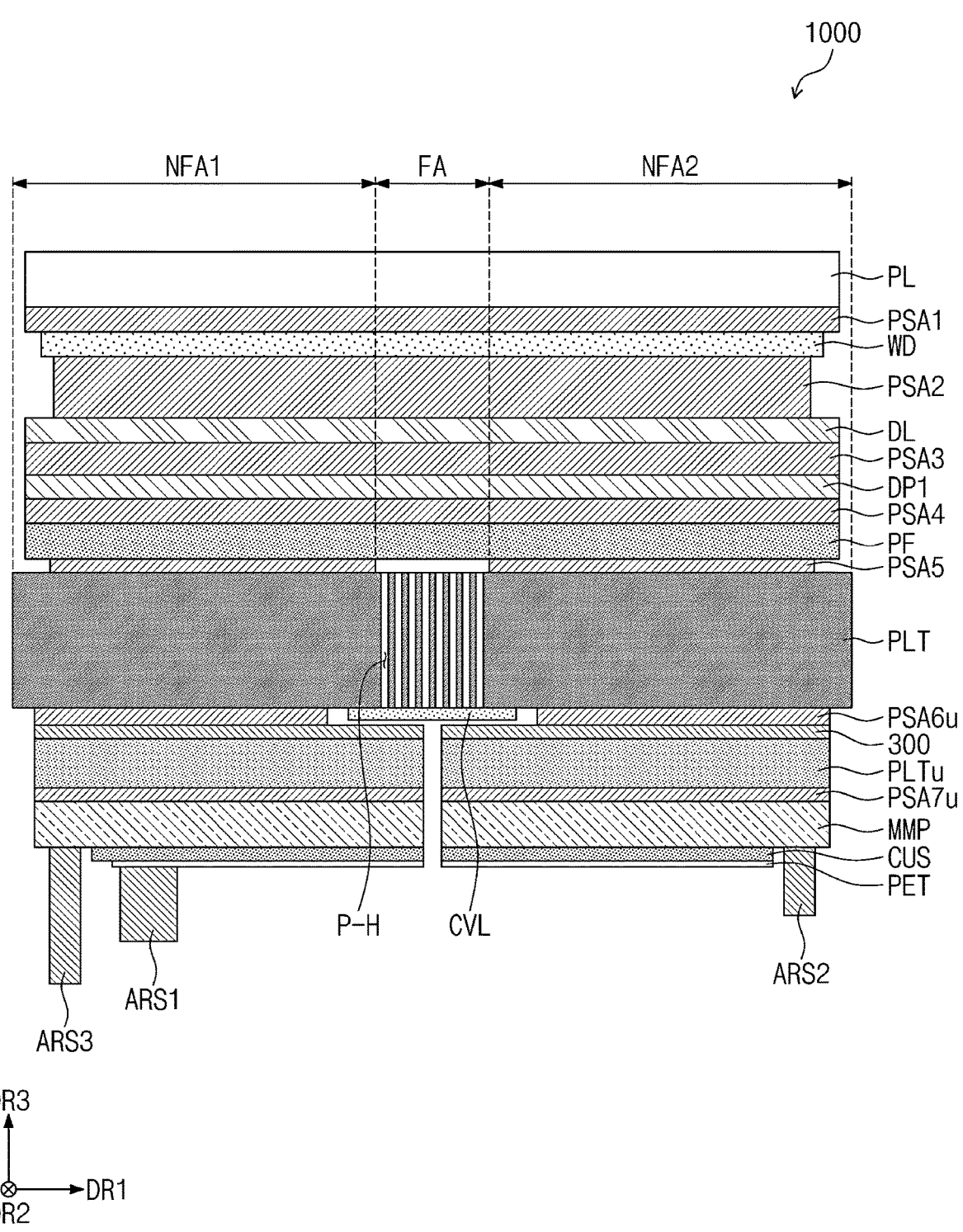

Referring to FIG. 4C, the lower functional layers, according to an embodiment, may include the protective film PF, the plate PLT, the cover layer CVL, the lower conductive layer 300, a lower plate PLTu, the shielding layer MMP, the lower sheet CUS, the insulating film PET, the step compensation elements ARS1, ARS2, and ARS3, and fourth to seventh adhesive layers PSA4, PSA5, PSA6u, and PSA7u.

The lower plate PLTu may be disposed between the plate PLT and the shielding layer MMP. The lower plate PLTu may be disposed under the plate PLT and the cover layer CVL. The sixth adhesive layer PSA6u may be disposed between the plate PLT and the lower plate PLTu. The seventh adhesive layer PSA7u may be disposed between the lower plate PLTu and the shielding layer MMP. In an embodiment, the lower plate PLTu may include a first lower plate and a second lower plate that are spaced apart from each other and that overlap the first non-folding area NFA1 and the second non-folding area NFA2, respectively. In an embodiment, the lower plate PLTu may include a non-metallic material such as a fiber reinforced composite. The fiber reinforced composite may be carbon fiber reinforced plastic (CFRP) or glass fiber reinforced plastic (GFRP).

In an embodiment, the lower conductive layer 300 may be disposed on the upper surface of the lower plate PLTu. The lower functional layers may further include an insulating layer disposed between the lower plate PLTu and the lower conductive layer 300. The lower functional layers may further include an insulating layer that covers the lower conductive layer 300. In an embodiment of the present disclosure, the lower conductive layer 300 may be disposed on the lower surface of the lower plate PLTu.

Figure 4D:
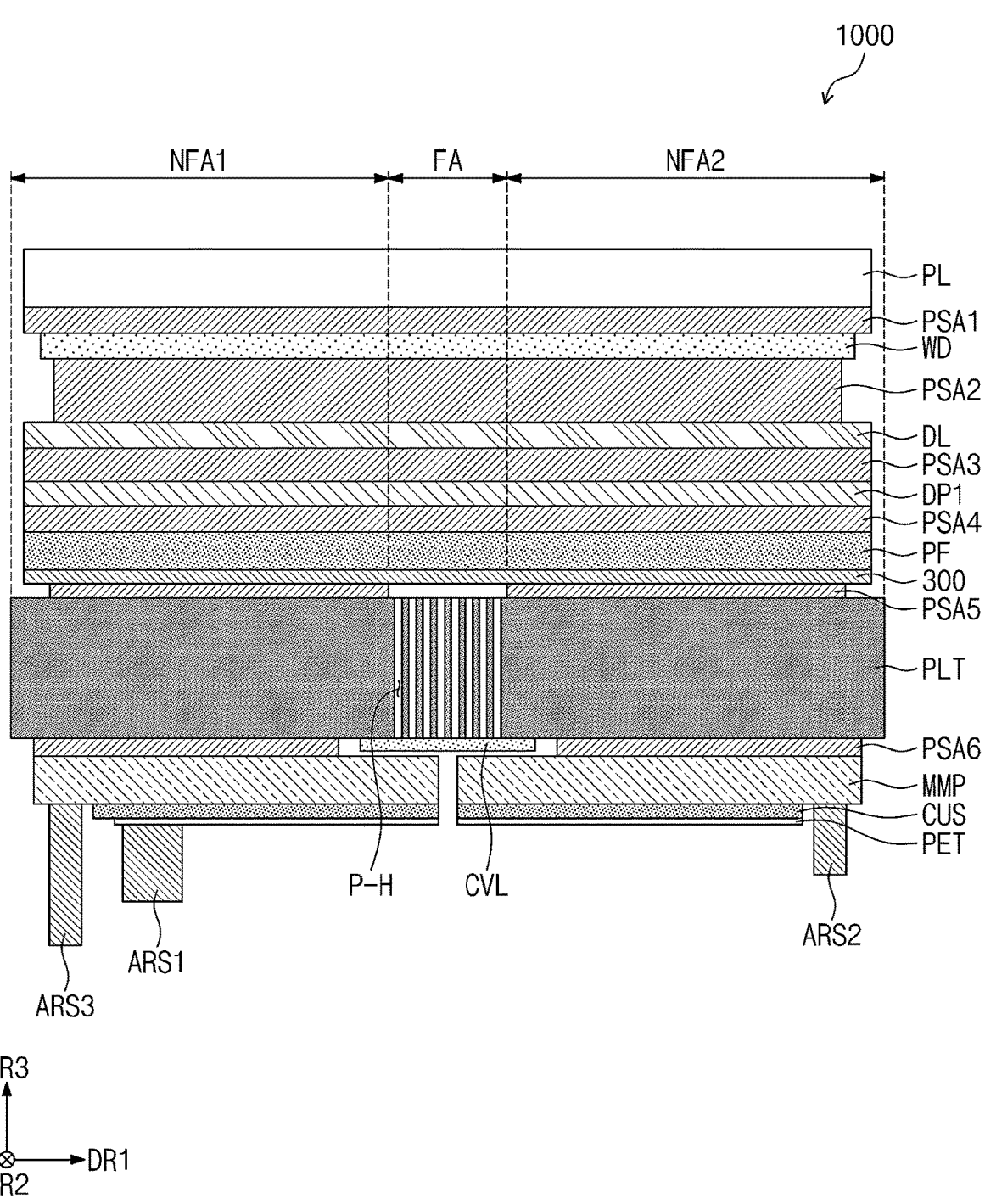

Referring to FIG. 4D, the lower conductive layer 300 according to this embodiment may be disposed between the protective film PF and the plate PLT. For example, the lower conductive layer 300 may be disposed between the protective film PF and the fifth insulating layer PSA5, and the fifth adhesive layer PSA5 may be disposed between the lower conductive layer 300 and the plate PLT. The lower functional layers may further include an insulating layer disposed between the protective film PF and the lower conductive layer 300 and/or between the lower conductive layer 300 and the fifth adhesive layer PSA5. An adhesive layer may be additionally disposed between the protective film PF and the lower conductive layer 300.

Figure 5:
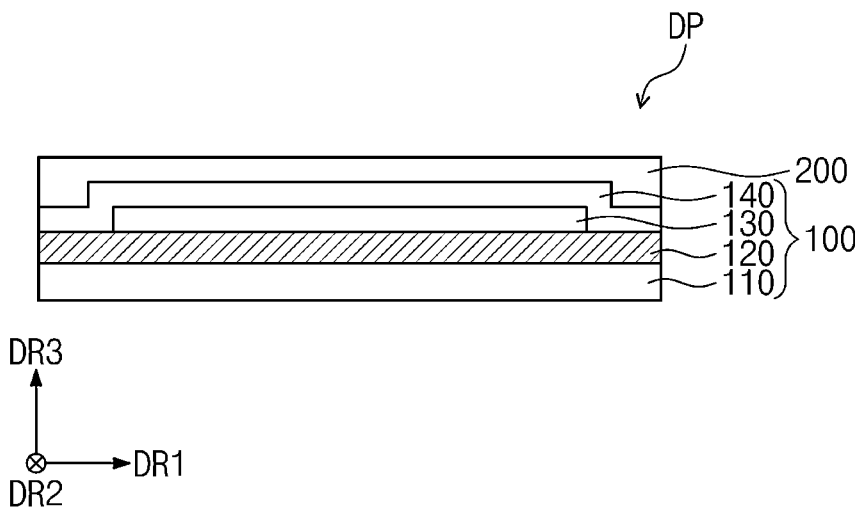
FIG. 5 is a schematic cross-sectional view of a display panel according to an embodiment of the present disclosure.

FIG. 5 is a schematic cross-sectional view of the display panel DP according to an embodiment of the present disclosure.

Referring to FIG. 5, the display panel DP may include the display layer 100 and the sensor layer 200.

The display layer 100 may be a component that substantially generates an image. The display layer 100 may be an emissive display layer. For example, the display layer 100 may be an organic light emitting display layer, an inorganic light emitting display layer, an organic-inorganic light emitting display layer, a quantum-dot display layer, a micro-LED display layer, or a nano-LED display layer. The display layer 100 may include a base layer 110, a circuit layer 120, a light emitting element layer 130, and an encapsulation layer 140.

The base layer 110 may be an element that provides a base surface on which the circuit layer 120 is disposed. The base layer 110 may have a multi-layer structure or a single-layer structure. The base layer 110 may be a glass substrate, a metal substrate, a silicon substrate, or a polymer substrate, but is not necessarily limited thereto.

The circuit layer 120 may be disposed on the base layer 110. The circuit layer 120 may include an insulating layer, a semiconductor pattern, a conductive pattern, and a signal line. An insulating layer, a semiconductor layer, and a conductive layer may be formed on the base layer 110 by a process such as coating or deposition and may be selectively subjected to patterning by performing a photolithography process a plurality of times.

The light emitting element layer 130 may be disposed on the circuit layer 120. The light emitting element layer 130 may include light emitting elements. For example, the light emitting element layer 130 may include an organic luminescent material, an inorganic luminescent material, an organic-inorganic luminescent material, a quantum dot, a quantum rod, a micro LED, or a nano LED.

The encapsulation layer 140 may be disposed on the light emitting element layer 130. The encapsulation layer 140 may protect the light emitting element layer 130 from foreign matter such as moisture, oxygen, and dust particles.

The sensor layer 200 may be disposed on the display layer 100. The sensor layer 200 may sense an external input applied from the outside. The sensor layer 200 may be an integrated sensor continuously formed in a process of manufacturing the display layer 100. Alternatively, the sensor layer 200 may be an external sensor attached to the display layer 100. The sensor layer 200 may be referred to as a sensor, an input sensing layer, an input sensing panel, or an electronic device for sensing input coordinates.

According to an embodiment of the present disclosure, the sensor layer 200, together with the lower conductive layer 300, may sense both an input by a passive input means such as a part of the user's body and an input by an input device that generates a magnetic field having a certain resonant frequency. The input device may be referred to as a pen, an input pen, a magnetic pen, a stylus pen, or an electromagnetic resonance pen.

Figure 6A:
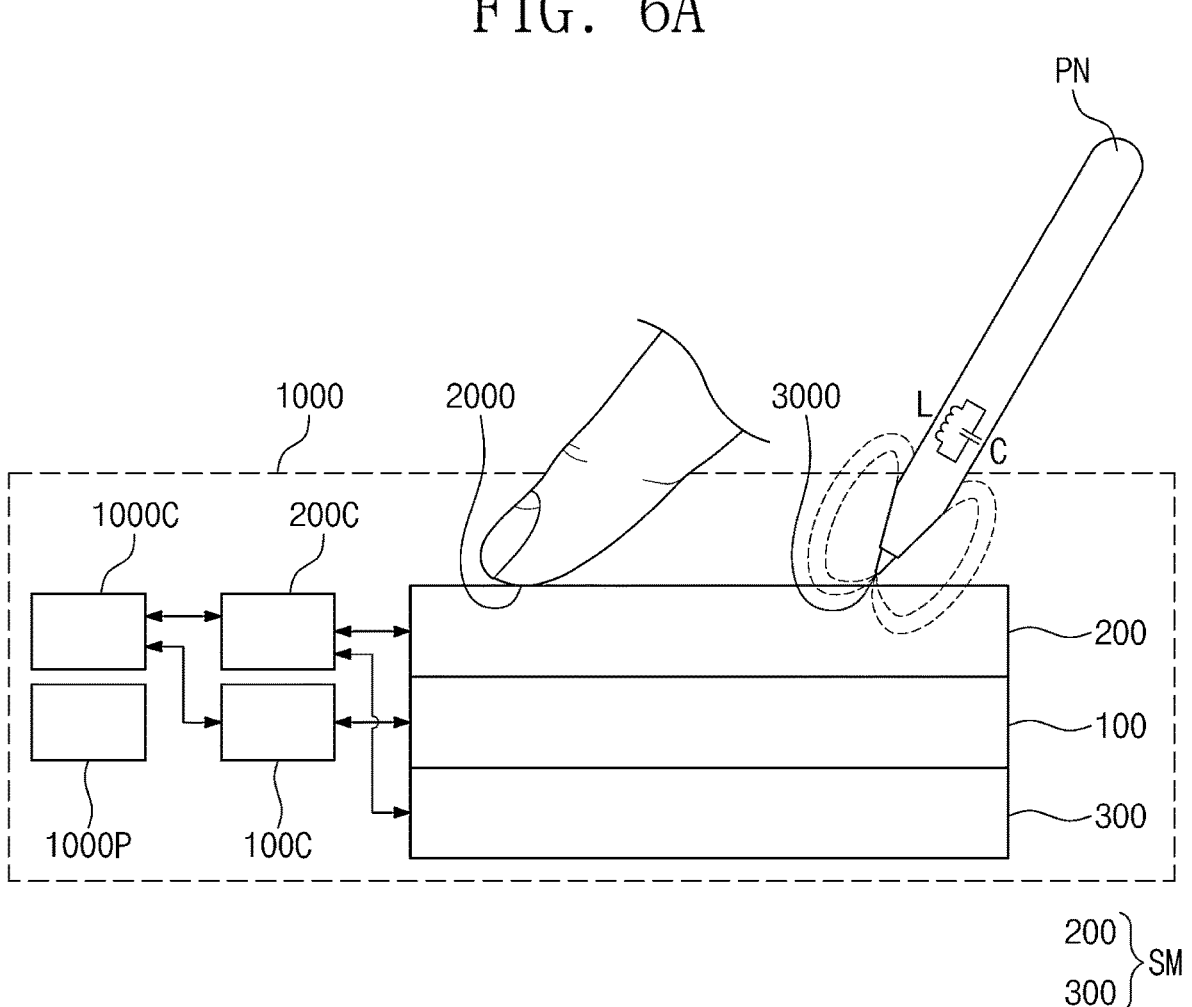
FIGS. 6A and 6B are block diagrams for explaining operation of an electronic device according to an embodiment of the present disclosure.
Figure 6B:
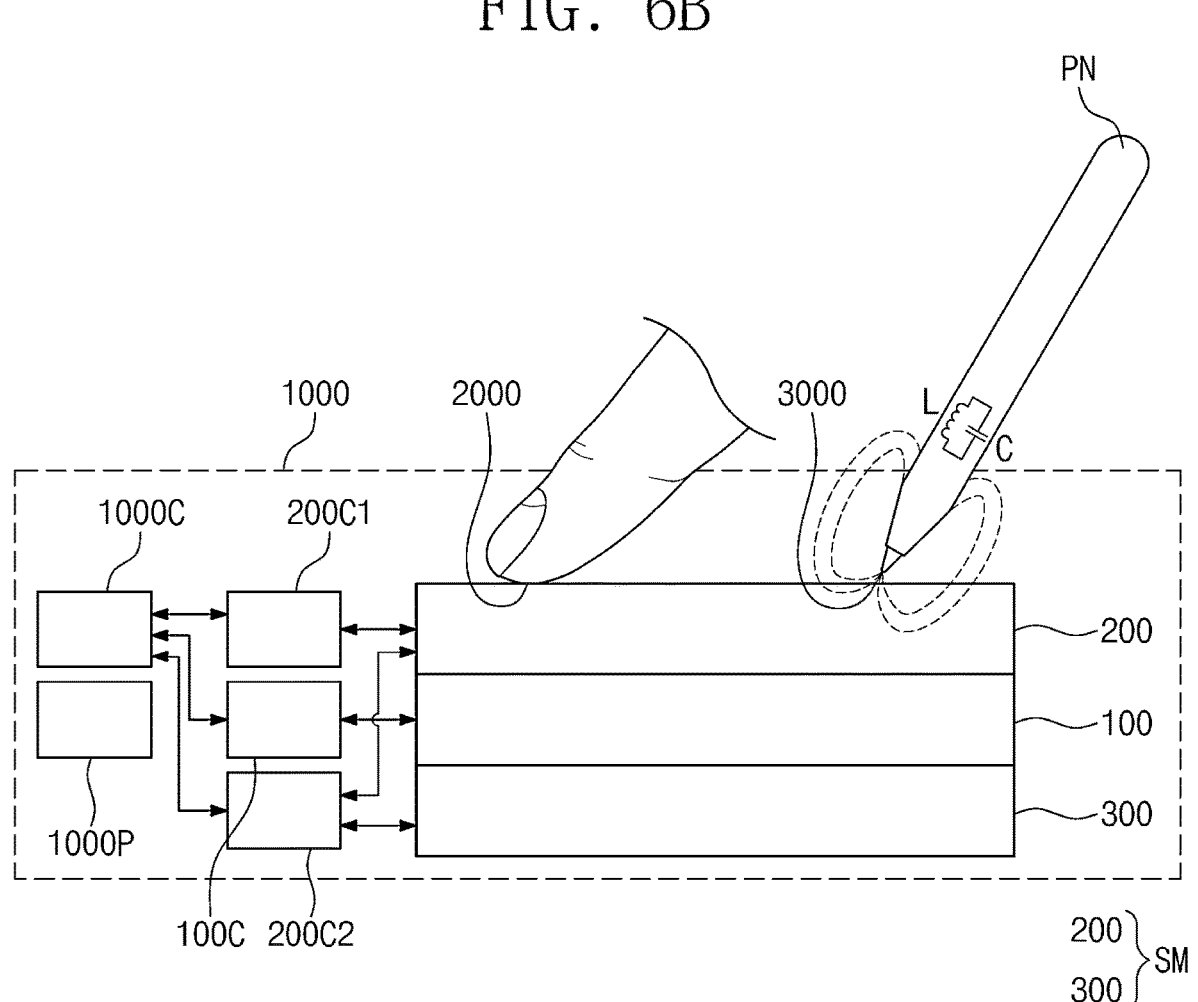

FIGS. 6A and 6B are block diagrams for explaining operation of the electronic device 1000 according to an embodiment of the present disclosure.

Referring to FIG. 6A, the electronic device 1000 may include the display layer 100, the sensing module SM, a display driver 100C, a sensor driver 200C, a main driver 1000C, and a power circuit 1000P. The sensing module SM may include the sensor layer 200 and the lower conductive layer 300.

The sensor module SM may sense a first input 2000 or a second input 3000 applied from the outside. Each of the first input 2000 and the second input 3000 may be an input means capable of providing a change in the capacitance of the sensor layer 200 or an input means capable of causing an induced current in the lower conductive layer 300. For example, the first input 2000 may be a passive input means such as a part of the user's body. The second input 3000 may be an input by the pen PN or an input by an RFIC tag. For example, the pen PN may be a passive pen or an active pen.

In an embodiment of the present disclosure, the pen PN may be a device that generates a magnetic field having a certain resonant frequency. The pen PN may be configured to transmit an output signal based on an electromagnetic resonance scheme. The pen PN may be referred to as an input device, an input pen, a magnetic pen, a stylus pen, or an electromagnetic resonance pen.

The pen PN may include an RLC resonance circuit, and the RLC resonance circuit may include an inductor L and a capacitor C. In an embodiment of the present disclosure, the RLC resonance circuit may be a variable resonance circuit that varies the resonant frequency. In this case, the inductor L may be a variable inductor, and/or the capacitor C may be a variable capacitor. However, the present disclosure is not necessarily limited thereto.

The inductor L generates a current by a magnetic field formed in the sensor layer 200 and/or the lower conductive layer 300. However, the present disclosure is not necessarily limited thereto. For example, when the pen PN operates in an active type, the pen PN may generate a current even though a magnetic field is not provided to the pen PN. The generated current is transferred to the capacitor C. The capacitor C charges the current input from the inductor L and discharges the charged current to the inductor L. Thereafter, the inductor L may emit a magnetic field having a resonant frequency. An induced current may flow in the sensor layer 200 and/or the lower conductive layer 300 by the magnetic field emitted from the pen PN. The induced current may be transferred to the sensor driver 200C as a reception signal (or, a sensing signal or a signal).

The main driver 1000C may control overall operation of the electronic device 1000. For example, the main driver 1000C may control operations of the display driver 100C and the sensor driver 200C. The main driver 1000C may include at least one microprocessor and may further include a graphic controller. The main driver 1000C may be referred to as an application processor, a central processing unit, or a main processor.

The display driver 100C may drive the display layer 100. The display driver 100C may receive image data and a control signal from the main driver 1000C. The control signal may include various signals. For example, the control signal may include an input vertical synchronization signal, an input horizontal synchronization signal, a main clock, and a data enable signal.

The sensor driver 200C may drive the sensor layer 200 and the lower conductive layer 300. The sensor driver 200C may receive a control signal from the main driver 1000C. The control signal may include a clock signal of the sensor driver 200C. In addition, the control signal may further include a mode determination signal for determining a driving mode of the sensor driver 200C and the sensing module SM.

The sensor driver 200C may be implemented with an integrated circuit (IC) and may be electrically connected with the sensor layer 200 and the lower conductive layer 300. For example, the sensor driver 200C may be directly mounted on a certain area of the display panel or may be mounted on a separate printed circuit board using a chip on film (COF) method and may be electrically connected with the sensor layer 200.

The sensor driver 200C and the sensing module SM may selectively operate in a first mode or a second mode. For example, the first mode may be a mode for sensing a touch input, for example, the first input 2000. The second mode may be a mode for sensing an input of the pen PN, for example, the second input 3000. The first mode may be referred to as a touch sensing mode, and the second mode may be referred to as a pen sensing mode.

In an embodiment, the sensor driver 200C may drive the sensor layer 200 in the first mode and may drive the sensor layer 200 and the lower conductive layer 300 in the second mode.

Switching between the first mode and the second mode may be performed in various ways. For example, the sensor driver 200C and the sensing module SM may be driven in the first mode and the second mode in a time-division manner and may sense the first input 2000 and the second input 3000. Alternatively, the switching between the first mode and the second mode may be performed by the user's selection or the user's specific action, or by activating or deactivating a specific application, one of the first mode and the second mode may be activated or deactivated or the driving mode may be switched from one mode to the other mode. In another case, while the sensor driver 200C and the sensing module SM alternately operate in the first mode and the second mode, when the first input 2000 is sensed, the sensor driver 200C and the sensing module SM may remain in the first mode, and when the second input 3000 is sensed, the sensor driver 200C and the sensing module SM may remain in the second mode.

The sensor driver 200C may calculate coordinate information of an input based on a signal received from the sensor layer 200 and/or the lower conductive layer 300 and may provide a coordinate signal having the coordinate information to the main driver 1000C. The main driver 1000C executes an operation corresponding to a user input, based on the coordinate signal. For example, the main driver 1000C may operate the display driver 100C such that a new application image is displayed on the display layer 100.

The power circuit 1000P may include a power management integrated circuit (PMIC). The power circuit 1000P may generate a plurality of drive voltages for driving the display layer 100, the sensor layer 200, the display driver 100C, and the sensor driver 200C. For example, the plurality of drive voltages may include a gate high-voltage, a gate low-voltage, a first drive voltage (e.g., an ELVSS voltage), a second drive voltage (e.g., an ELVDD voltage), an initialization voltage, and the like, but are not necessarily limited to the examples.

Referring to FIG. 6B, the electronic device 1000 according to an embodiment may include the display layer 100, the sensing module SM, the display driver 100C, a first sensor driver 200C1, a second sensor driver 200C2, the main driver 1000C, and the power circuit 1000P. The sensing module SM may include the sensor layer 200 and the lower conductive layer 300. The main driver 1000C may control operations of the display driver 100C, the first sensor driver 200C1, and the second sensor driver 200C2.

The first sensor driver 200C1 may drive the sensor layer 200. The first sensor driver 200C1 may sense the first input 2000 in the first mode. The second sensor driver 200C2 may drive the sensor layer 200 and the lower conductive layer 300. The second sensor driver 200C2 may sense the second input 3000 in the second mode. In an embodiment, the first mode and the second mode may be driven by different drivers and may independently operate.

Figure 7:
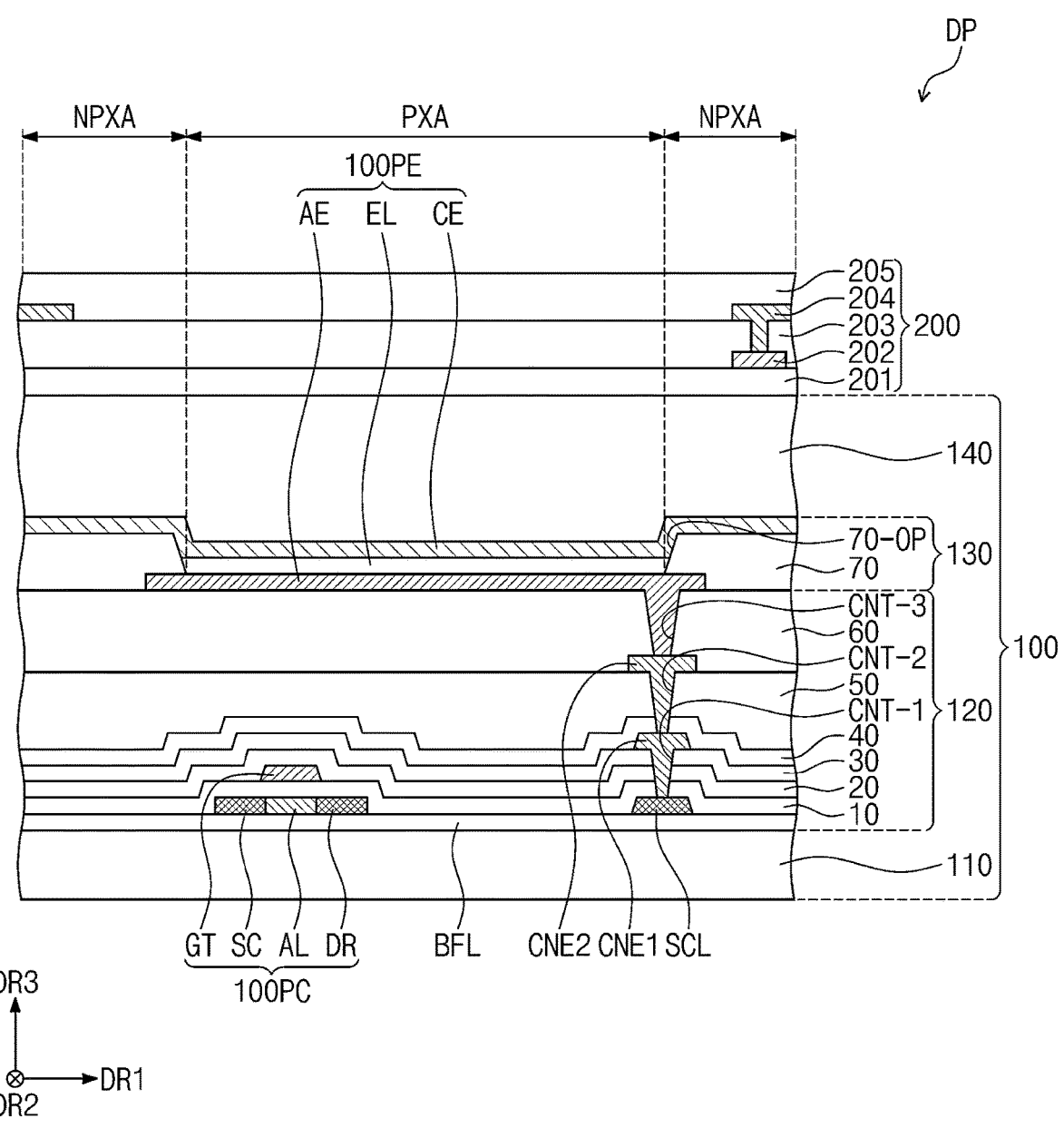
FIG. 7 is a cross-sectional view of the display panel according to an embodiment of the present disclosure.

FIG. 7 is a cross-sectional view of the display panel DP according to an embodiment of the present disclosure.

Referring to FIG. 7, at least one buffer layer BFL is formed on the upper surface of the base layer 110. The buffer layer BFL may increase the coupling force between the base layer 110 and a semiconductor pattern. The buffer layer BFL may be formed of multiple layers. Alternatively, the display layer 100 may further include a barrier layer. The buffer layer BFL may include at least one of silicon oxide, silicon nitride, or silicon oxy nitride. For example, the buffer layer BFL may include a structure in which silicon oxide layers and silicon nitride layers are alternately stacked one above another.

The semiconductor pattern SC, AL, DR, and SCL may be disposed on the buffer layer BFL. The semiconductor pattern SC, AL, DR, and SCL may include poly silicon. However, without necessarily being limited thereto, the semiconductor pattern SC, AL, DR, and SCL may include amorphous silicon, low-temperature polycrystalline silicon, or an oxide semiconductor.

FIG. 7 illustrates a portion of the semiconductor pattern SC, AL, DR, and SCL, and the semiconductor pattern may be additionally disposed in other areas. The semiconductor pattern SC, AL, DR, and SCL may be arranged over pixels according to a specific rule. The semiconductor pattern SC, AL, DR, and SCL may have different electrical properties depending on whether doping is performed or not. The semiconductor pattern SC, AL, DR, and SCL may include first areas SC, DR, and SCL having a high conductivity and a second area AL having a low conductivity. The first areas SC, DR, and SCL may be doped with an N-type dopant or a P-type dopant. A P-type transistor may include a doped area that is doped with a P-type dopant, and an N-type transistor may include a doped area that is doped with an N-type dopant. The second area AL may be an un-doped area, or may be an area more lightly doped than the first areas.

The first areas SC, DR, and SCL may have a higher conductivity than the second area AL and may substantially serve as electrodes or signal lines. The second area AL may substantially correspond to an active area AL (or, a channel) of a transistor 100PC. For example, one portion AL of the semiconductor pattern SC, AL, DR, and SCL may be the active area AL of the transistor 100PC, another portion SC or DR of the semiconductor pattern SC, AL, DR, and SCL may be a source area SC or a drain area DR of the transistor 100PC, and the other portion SCL of the semiconductor pattern SC, AL, DR, and SCL may be a connecting electrode or a connecting signal line SCL.

Each of the pixels may have an equivalent circuit including seven transistors, one capacitor, and a light emitting element, and the equivalent circuit of the pixel may be modified in various forms. In FIG. 7, one transistor 100PC and one light emitting element 100PE included in the pixel are illustrated as an example.

The source area SC, the active area AL, and the drain area DR of the transistor 100PC may be formed from the semiconductor pattern SC, AL, DR, and SCL. The source area SC and the drain area DR may extend from the active area AL in opposite directions on the section. In FIG. 7, a portion of the connecting signal line SCL formed from the semiconductor pattern SC, AL, DR, and SCL is illustrated. The connecting signal line SCL may be connected to the drain area DR of the transistor 100PC in a plan view.

A first insulating layer 10 may be disposed on the buffer layer BFL. The first insulating layer 10 may commonly overlap the plurality of pixels and may cover the semiconductor pattern SC, AL, DR, and SCL. The first insulating layer 10 may be an inorganic layer and/or an organic layer and may have a single-layer structure or a multi-layer structure. The first insulating layer 10 may include aluminum oxide, titanium oxide, silicon oxide, silicon nitride, silicon oxy nitride, zirconium oxide, and/or hafnium oxide. In this embodiment, the first insulating layer 10 may be a single silicon oxide layer. Not only the first insulating layer 10 but also insulating layers of the circuit layer 120 that will be described below may be inorganic layers and/or organic layers and may have a single-layer structure or a multi-layer structure. The inorganic layers may include at least one of the aforementioned materials, but are not necessarily limited thereto.

A gate GT of the transistor 100PC is disposed on the first insulating layer 10. The gate GT may be a portion of a metal pattern. The gate GT overlaps the active area AL. The gate GT may function as a mask in a process of doping or reducing the semiconductor pattern SC, AL, DR, and SCL.

A second insulating layer 20 may be disposed on the first insulating layer 10 and may cover the gate GT. The second insulating layer 20 may commonly overlap the pixels. The second insulating layer 20 may be an inorganic layer and/or an organic layer and may have a single-layer structure or a multi-layer structure. The second insulating layer 20 may include at least one of silicon oxide, silicon nitride, or silicon oxy nitride. In this embodiment, the second insulating layer 20 may have a multi-layer structure including a silicon oxide layer and a silicon nitride layer.

A third insulating layer 30 may be disposed on the second insulating layer 20. The third insulating layer 30 may have a single-layer structure or a multi-layer structure. For example, the third insulating layer 30 may have a multi-layer structure including a silicon oxide layer and a silicon nitride layer.

A first connecting electrode CNE1 may be disposed on the third insulating layer 30. The first connecting electrode CNE1 may be connected to the connecting signal line SCL through a contact hole CNT-1 penetrating the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connecting electrode CNE2 may be disposed on the fifth insulating layer 50. The second connecting electrode CNE2 may be connected to the first connecting electrode CNE1 through a contact hole CNT-2 penetrating the fourth insulating layer 40 and the fifth insulating layer 50.

A sixth insulating layer 60 may be disposed on the fifth insulating layer 50 and may cover the second connecting electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic luminescent material, an inorganic luminescent material, an organic-inorganic luminescent material, a quantum dot, a quantum rod, a micro LED, or a nano LED. Hereinafter, it will be exemplified that the light emitting element 100PE is an organic light emitting element. However, the present disclosure is not necessarily limited thereto.

The light emitting element 100PE may include a first electrode AE, an emissive layer EL, and a second electrode CE.

The first electrode AE may be disposed on the sixth insulating layer 60. The first electrode AE may be connected to the second connecting electrode CNE2 through a contact hole CNT-3 penetrating the sixth insulating layer 60.

A pixel defining layer 70 may be disposed on the sixth insulating layer 60 and may cover a portion of the first electrode AE. The pixel defining layer 70 may have an opening 70-OP defined therein. The opening 70-OP of the pixel defining layer 70 exposes at least a portion of the first electrode AE.

The first display DA1-F (refer to FIG. 1A) may include an emissive area PXA and a non-emissive area NPXA adjacent to the emissive area PXA. The non-emissive area NPXA may surround the emissive area PXA. In this embodiment, the emissive area PXA is defined to correspond to a partial area of the first electrode AE exposed through the opening 70-OP.

The emissive layer EL may be disposed on the first electrode AE. The emissive layer EL may be disposed in an area corresponding to the opening 70-OP. For example, the emissive layer EL may be separately formed for each of the pixels. When the emissive layer EL is separately formed for each of the pixels, the emissive layers EL may each emit at least one of blue light, red light, or green light. However, without necessarily being limited thereto, the emissive layer EL may be connected to the pixels and may be commonly included in the pixels. In this case, the emissive layer EL may provide blue light or white light.

The second electrode CE may be disposed on the emissive layer EL. The second electrode CE may have a single-body shape and may be commonly included in the plurality of pixels.

In an embodiment of the present disclosure, a hole control layer may be disposed between the first electrode AE and the emissive layer EL. The hole control layer may be commonly disposed in the emissive area PXA and the non-emissive area NPXA. The hole control layer may include a hole transport layer and may further include a hole injection layer. An electron control layer may be disposed between the emissive layer EL and the second electrode CE. The electron control layer may include an electron transport layer and may further include an electron injection layer. The hole control layer and the electron control layer may be commonly formed for the plurality of pixels by using an open mask or an ink-jet process.

The encapsulation layer 140 may be disposed on the light emitting element layer 130. The encapsulation layer 140 may include an inorganic layer, an organic layer, and an inorganic layer sequentially stacked one above another. However, layers constituting the encapsulation layer 140 are not necessarily limited thereto. The inorganic layers may protect the light emitting element layer 130 from moisture and oxygen, and the organic layer may protect the light emitting element layer 130 from foreign matter such as dust particles. The inorganic layers may include a silicon nitride layer, a silicon oxy nitride layer, a silicon oxide layer, a titanium oxide layer, or an aluminum oxide layer. The organic layer may include an acrylic organic layer, but is not necessarily limited thereto.

The sensor layer 200 may include a base layer 201, a first conductive layer 202, an intermediate insulating layer 203, a second conductive layer 204, and a cover insulating layer 205.

The base layer 201 may be an inorganic layer including silicon nitride, silicon oxy nitride, and/or silicon oxide. Alternatively, the base layer 201 may be an organic layer including an epoxy resin, an acrylic resin, or an imide-based resin. The base layer 201 may have a single-layer structure, or may have a multi-layer structure stacked in the third direction DR3.

Each of the first conductive layer 202 and the second conductive layer 204 may have a single-layer structure, or may have a multi-layer structure stacked in the third direction DR3.

Each of the first conductive layer 202 and the second conductive layer 204 that have a single-layer structure may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), indium zinc tin oxide (IZTO), or the like. In addition, the transparent conductive layer may include a conductive polymer such as poly(3,4-ethylenedioxythiophene) (PEDOT), a metal nano wire, or graphene.

Each of the first conductive layer 202 and the second conductive layer 204 that have a multi-layer structure may include metal layers. The meal layers may have, for example, a three-layer structure of titanium/aluminum/titanium. The conductive layer having a multi-layer structure may include at least one metal layer and at least one transparent conductive layer.

At least one of the intermediate insulating layer 203 or the cover insulating layer 205 may include an inorganic film. The inorganic film may include at least one of aluminum oxide, titanium oxide, silicon oxide, silicon nitride, silicon oxy nitride, zirconium oxide, or hafnium oxide.

At least one of the intermediate insulating layer 203 or the cover insulating layer 205 may include an organic film. The organic film may include at least one of an acrylic resin, a methacrylic resin, a polyisoprene resin, a vinyl resin, an epoxy resin, a urethane-based resin, a cellulosic resin, a siloxane-based resin, a polyimide resin, a polyamide resin, or a perylene-based resin.

Although it has been described that the sensor layer 200 includes the first conductive layer 202 and the second conductive layer 204, for example, a total of two conductive layers, the present disclosure is not necessarily limited thereto. For example, the sensor layer 200 may include three or more conductive layers.

Figure 8A:
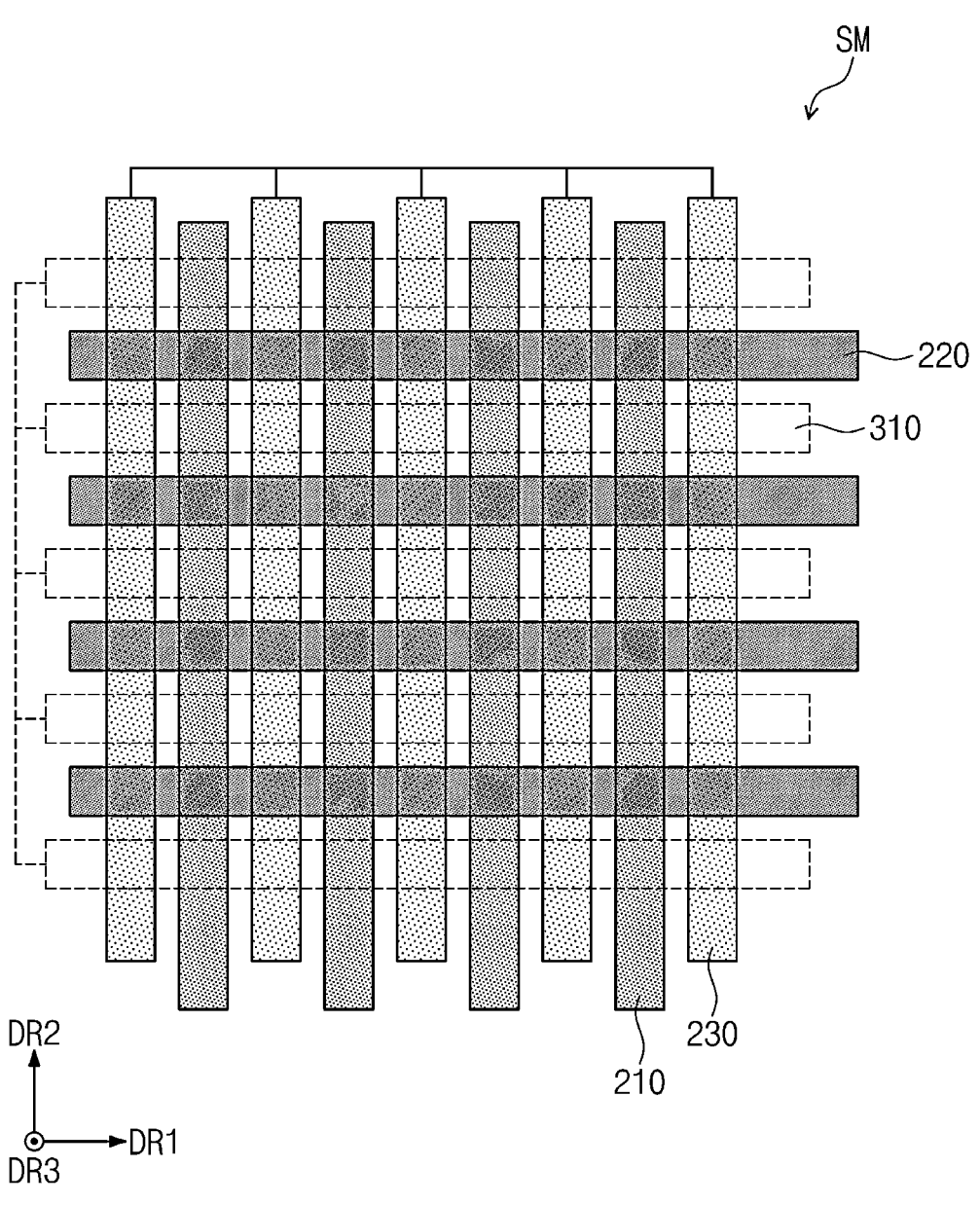
FIGS. 8A and 8B are schematic plan views illustrating some components of a sensing module according to an embodiment of the present disclosure.
Figure 8B:
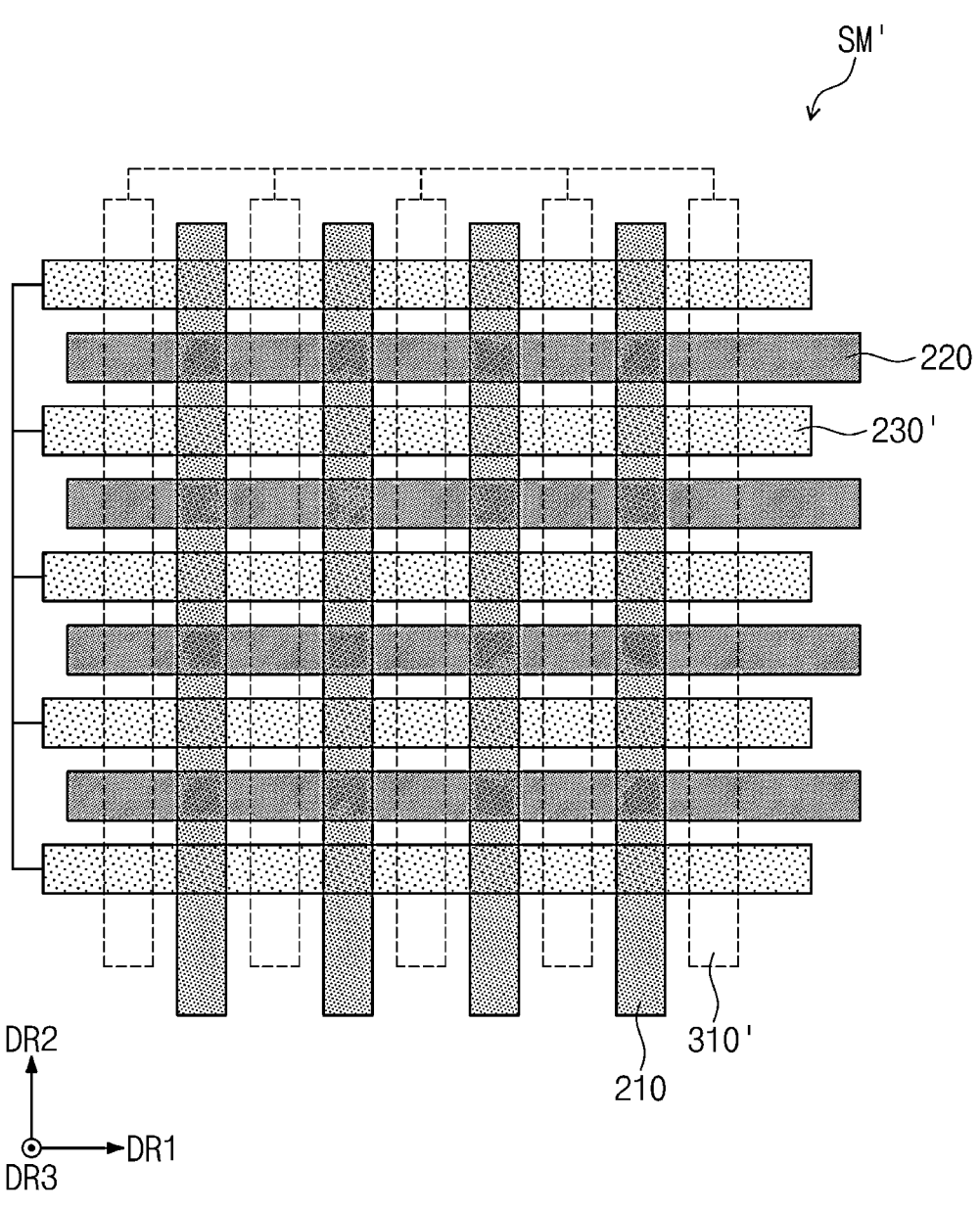

FIGS. 8A and 8B are schematic plan views illustrating some components of the sensing module SM according to an embodiment of the present disclosure.

Referring to FIGS. 8A and 8B, the sensing module SM may include first touch sensing electrodes 210, second touch sensing electrodes 220, first pen sensing electrodes 230 and 310', and second pen sensing electrodes 310 and 230'. The first touch sensing electrodes 210 and the second touch sensing electrodes 220 may sense a touch input, for example, the first input 2000 (refer to FIGS. 6A and 6B). The first pen sensing electrodes 230 and 310' and the second pen sensing electrodes 310 and 230' may sense an input by the pen PN, for example, the second input 3000.

The first touch sensing electrodes 210 may each extend in the second direction DR2 and may be arranged in the first direction DR1 so as to be spaced apart from each other. The second touch sensing electrodes 220 may each extend in the first direction DR1 and may be arranged in the second direction DR2 so as to be spaced apart from each other. The second touch sensing electrodes 220 may be insulated from the first touch sensing electrodes 210 and may cross the first touch sensing electrodes 210.

The first pen sensing electrodes 230 and 310' may each extend in the second direction DR2 and may be arranged in the first direction DR1 so as to be spaced apart from each other. First ends of the first pen sensing electrodes 230 and 310' may all be connected through a separate trace line. The second pen sensing electrodes 310 and 230' may each extend in the first direction DR1 and may be arranged in the second direction DR2 so as to be spaced apart from each other. First ends of the second pen sensing electrodes 310 and 230' may all be connected through a separate trace line. The second pen sensing electrodes 310 and 230' may be insulated from the first pen sensing electrodes 230 and 310' and may cross the first pen sensing electrodes 230 and 310'. The first pen sensing electrodes 230 and 310' and the second pen sensing electrodes 310 and 230' may be disposed on different layers. The first pen sensing electrodes 230 and 310' and the second pen sensing electrodes 310 and 230' may be spaced apart from each other with the display layer 100 (refer to FIG. 6) disposed therebetween.

Referring to FIGS. 6A, 6B, and 8A, in an embodiment, the first touch sensing electrodes 210, the second touch sensing electrodes 220, and the first pen sensing electrodes 230 may be included in the sensor layer 200, and the second pen sensing electrodes 310 may be included in the lower conductive layer 300.

Each of the first touch sensing electrodes 210, in a plan view, may be disposed between the first pen sensing electrodes 230 adjacent to each other. For example, the first touch sensing electrodes 210 may alternate with the first pen sensing electrodes 230 in a plan view. In an embodiment, the first touch sensing electrodes 210 and the first pen sensing electrodes 230 may be disposed on the same layer so as to be spaced apart from each other.

Each of the second touch sensing electrodes 220, in a plan view, may be disposed between the second pen sensing electrodes 310 adjacent to each other. For example, the second touch sensing electrodes 220 may alternate with the second pen sensing electrodes 310 in a plan view. However, embodiments are not necessarily limited thereto. The second pen sensing electrodes 310 may be disposed on a layer different from the layer on which the first and second touch sensing electrodes 210 and 220 and the first pen sensing electrodes 230 are disposed, and thus the arrangement form of the second pen sensing electrodes 310 may be more freely designed. For example, the second touch sensing electrodes 220 may overlap the second pen sensing electrodes 310 in a plan view.

Referring to FIGS. 6A, 6B, and 8B, in an embodiment, the first touch sensing electrodes 210, the second touch sensing electrodes 220, and the second pen sensing electrodes 230' may be included in the sensor layer 200, and the first pen sensing electrodes 310' may be included in the lower conductive layer 300.

Each of the second touch sensing electrodes 220, in a plan view, may be disposed between the second pen sensing electrodes 230' adjacent to each other. For example, the second touch sensing electrodes 220 may alternate with the second pen sensing electrodes 230' in a plan view. In an embodiment, the second touch sensing electrodes 220 and the second pen sensing electrodes 230' may be disposed on the same layer so as to be spaced apart from each other.

Each of the first touch sensing electrodes 210, in a plan view, may be disposed between the first pen sensing electrodes 310' adjacent to each other. For example, the first touch sensing electrodes 210 may alternate with the first pen sensing electrodes 310' in a plan view. However, embodiments are not necessarily limited thereto. The first pen sensing electrodes 310' may be disposed on a layer different from the layer on which the first and second touch sensing electrodes 210 and 220 and the second pen sensing electrodes 230' are disposed, and thus the arrangement form of the first pen sensing electrodes 310' may be more freely designed. For example, the first touch sensing electrodes 210 may overlap the first pen sensing electrodes 310' in a plan view.

The following description will be given based on the fact that, as illustrated in FIG. 8A, the first pen sensing electrodes 230 are included in the sensor layer 200 and the second pen sensing electrodes 310 are disposed in the lower conductive layer 300.

Figure 9A:
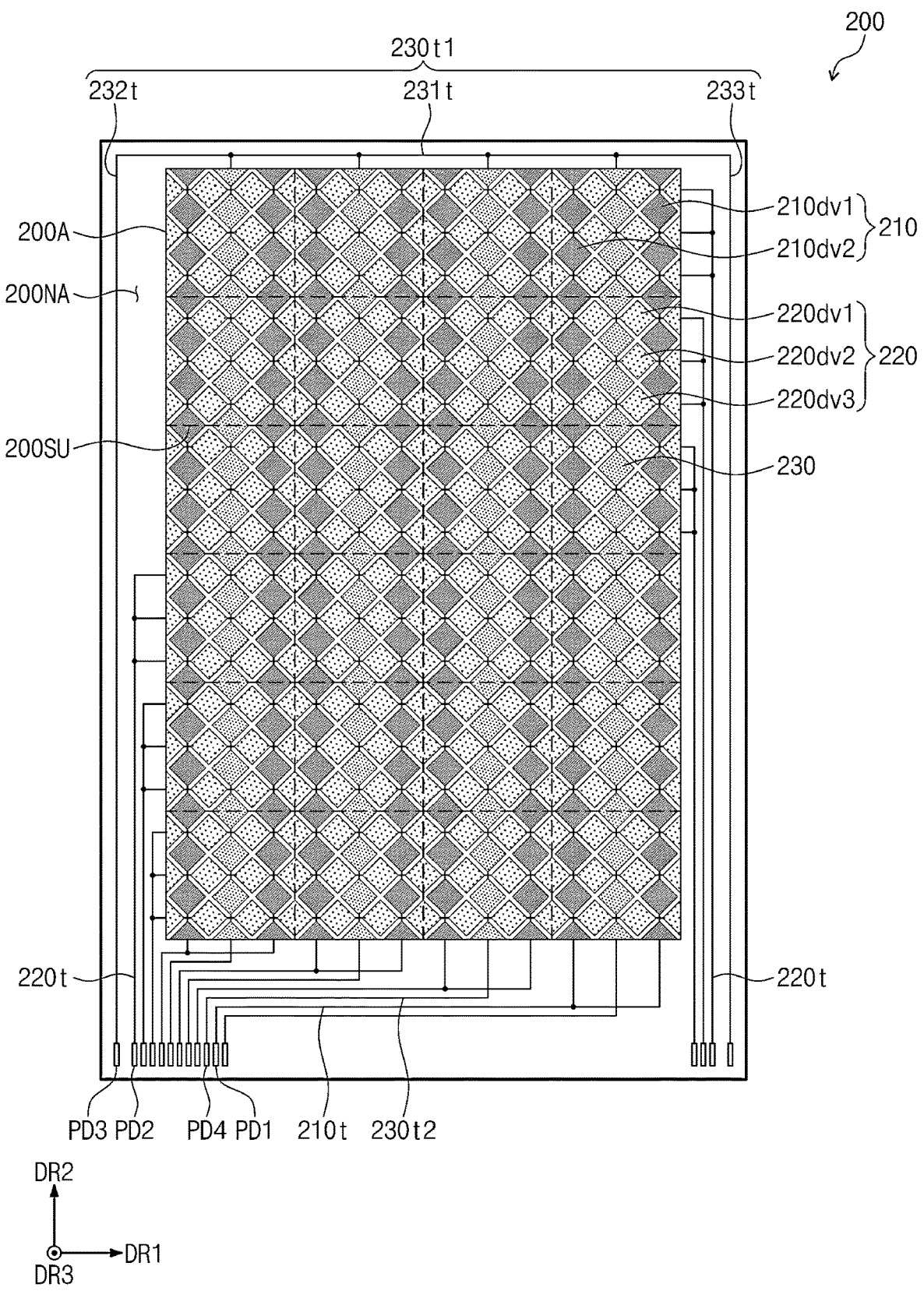
FIGS. 9A and 9B are plan views of a sensor layer according to an embodiment of the present disclosure.
Figure 9B:
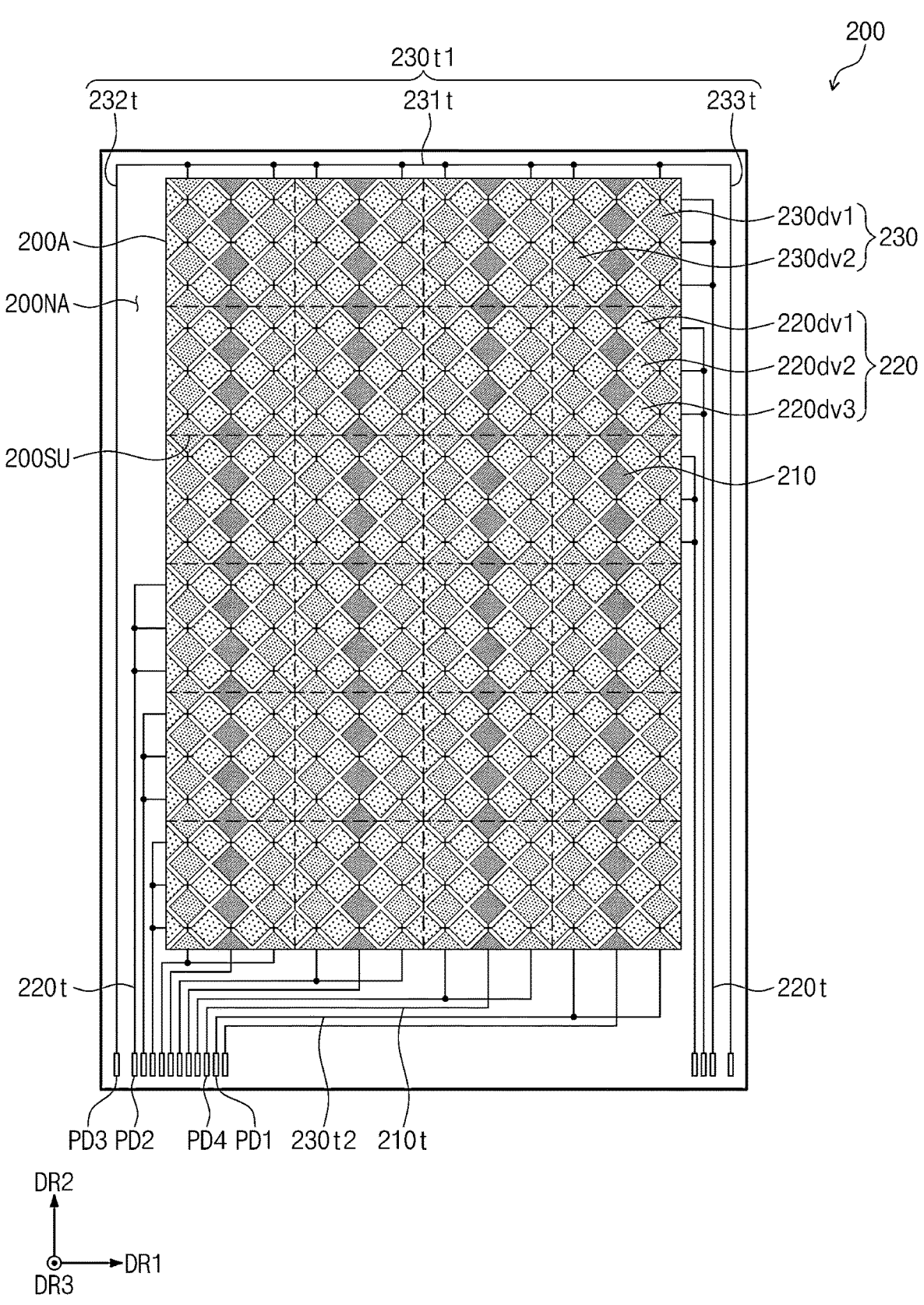

FIGS. 9A and 9B are plan views of the sensor layer 200 according to an embodiment of the present disclosure.

Referring to FIG. 9A, a sensing area 200A and a peripheral area 200NA adjacent to the sensing area 200A may be defined in the sensor layer 200.

The sensor layer 200 may include the plurality of first touch sensing electrodes 210, the plurality of second touch sensing electrodes 220, and the plurality of first pen sensing electrodes 230 disposed in the sensing area 200A. The plurality of first touch sensing electrodes 210 may be referred to as first electrodes, the plurality of second touch sensing electrodes 220 may be referred to as second electrodes, and the plurality of first pen sensing electrodes 230 may be referred to as third electrodes.

Each of the first touch sensing electrodes 210 may cross the second touch sensing electrodes 220. Each of the first touch sensing electrodes 210 may extend in the second direction DR2, and the first touch sensing electrodes 210 may be arranged in the first direction DR1 so as to be spaced apart from each other. Each of the second touch sensing electrodes 220 may extend in the first direction DR1, and the second touch sensing electrodes 220 may be arranged in the second direction DR2 so as to be spaced apart from each other. A sensing unit SU of the sensor layer 200 may be an area where one first touch sensing electrode 210 and one second touch sensing electrode 220 cross each other.

In FIG. 8A, four first touch sensing electrodes 210 and six second touch sensing electrodes 220 are illustrated, and 24 sensing units 200SU are illustrated. However, the number of first touch sensing electrodes 210 and the number of second touch sensing electrodes 220 are not necessarily limited thereto.

In an embodiment, each of the first touch sensing electrodes 210 may include first divided touch electrodes 210$dv$1 and 210$dv$2. The first divided touch electrodes 210$dv$1 and 210$dv$2 may extend in the second direction DR2 and may be spaced apart from each other in the first direction DR1. FIG. 8A illustrates an example that each of the first touch sensing electrodes 210 includes the two first divided touch electrodes 210$dv$1 and 210$dv$2.

In an embodiment, each of the second touch sensing electrodes 220 may include second divided touch electrodes 220$dv$1, 220$dv$2, and 220$dv$3. The second divided touch electrodes 220$dv$1, 220$dv$2, and 220$dv$3 may extend in the first direction DR1 and may be spaced apart from each other in the second direction DR2. FIG. 8A illustrates an example that each of the second touch sensing electrodes 220 includes the three second divided touch electrodes 220$dv$1, 220$dv$2, and 220$dv$3.

Each of the first pen sensing electrodes 230 may extend in the second direction DR2, and the first pen sensing electrodes 230 may be arranged in the first direction DR1 so as to be spaced apart from each other. In an embodiment, a portion of one first pen sensing electrode 230 may be included in one sensing unit 200SU.

Each of the first pen sensing electrodes 230 may be disposed between the two first divided touch electrodes 210$dv$1 and 210$dv$2 included in the first touch sensing electrode 210.

The sensor layer 200 may further include a plurality of first trace lines 210$t$ disposed in the peripheral area 200NA, a plurality of first pads PD1 connected to the first trace lines 210$t$ in a one-to-one correspondence, a plurality of second trace lines 220$t$, and a plurality of second pads PD2 connected to the second trace lines 220$t$ in a one-to-one correspondence.

The first trace lines 210$t$ may be electrically connected to the first touch sensing electrodes 210 in a one-to-one correspondence. The two first divided touch electrodes 210$dv$1 and 210$dv$2 included in the first touch sensing electrode 210 may be connected to one first trace line among the first trace lines 210$t$. Each of the first trace lines 210$t$ may include a plurality of branch portions for connection to the two first divided touch electrodes 210$dv$1 and 210$dv$2. In an embodiment of the present disclosure, the two first divided touch electrodes 210$dv$1 and 210$dv$2 may be connected with each other in the sensing area 200A.

The second trace lines 220$t$ may be electrically connected to the second touch sensing electrodes 220 in a one-to-one correspondence. The three second divided touch electrodes 220$dv$1, 220$dv$2, and 220$dv$3 included in the second touch sensing electrode 220 may be connected to one second trace line among the second trace lines 220$t$. Each of the second trace lines 220$t$ may include a plurality of branch portions for connection to the three second divided touch electrodes 220$dv$1, 220$dv$2, and 220$dv$3. In an embodiment of the present disclosure, the three second divided touch electrodes 220$dv$1, 220$dv$2, and 220$dv$3 may be connected together in the sensing area 200A.

The sensor layer 200 may further include a third trace line 230$t$1 disposed in the peripheral area 200NA, a plurality of third pads PD3 connected to one end and an opposite end of the third trace line 230$t$1, fourth trace lines 230$t$2, and fourth pads PD4 connected to the fourth trace lines 230$t$2 in a one-to-one correspondence.

The third trace line 230$t$1 may be electrically connected with at least one first pen sensing electrode 230 among the first pen sensing electrodes 230. In an embodiment of the present disclosure, the third trace line 230$t$1 may be electrically connected with all the first pen sensing electrodes 230. For example, the third trace line 230$t$1 may be electrically connected to all the first pen sensing electrodes 230. The third trace line 230$t$1 may include a first line portion 231$t$ that extends in the first direction DR1 and that is electrically connected to the first pen sensing electrodes 230, a second line portion 232$t$ extending from a first end of the first line portion 231$t$ in the second direction DR2, and a third line portion 233$t$ extending from a second end of the first line portion 231$t$ in the second direction DR2.

In an embodiment of the present disclosure, each of the resistance of the second line portion 232$t$ and the resistance of the third line portion 233$t$ may be substantially the same as the resistance of one first pen sensing electrode 230 among the first pen sensing electrodes 230. Accordingly, the second line portion 232$t$ and the third line portion 233$t$ may serve as the first pen sensing electrodes 230, and the same effect as disposing the first pen sensing electrodes 230 even in the peripheral area 200NA may be obtained. For example, one of the second line portion 232$t$ and the third line portion 233$t$ and one of the first pen sensing electrodes 230 may form a coil. Accordingly, the pen located in an area adjacent to the peripheral area 200NA may also be sufficiently charged by a loop including the second line portion 232$t$ or the third line portion 233$t$.

In an embodiment of the present disclosure, to adjust the resistance of the second line portion 232$t$ and the resistance of the third line portion 233$t$, the widths of the second line portion 232$t$ and the third line portion 233$t$ in the first direction DR1 may be adjusted. However, this is merely illustrative, and the first to third line portions 231$t$, 232$t$, and 233$t$ may have substantially the same width.

The fourth trace lines 230$t$2 may be connected to the first pen sensing electrodes 230 in a one-to-one correspondence. For example, the number of fourth trace lines 230$t$2 may correspond to the number of first pen sensing electrodes 230. In FIG. 9A, four fourth trace lines 230$t$2 are illustrated as an example. However, without necessarily being limited thereto, the fourth trace lines 230$t$2 may be connected to the plurality of first pen sensing electrodes 230, respectively, and may include a plurality of branch portions for connection to the plurality of first pen sensing electrodes 230.

In an embodiment of the present disclosure, the fourth trace lines 230$t$2 and the fourth pads PD4 may be omitted, and a charging drive mode for charging the pen may be omitted. In this case, the sensor layer 200 may sense an input by an active pen capable of emitting a magnetic field even though a magnetic field is not provided from the sensor layer 200.

Referring to FIG. 9B, in an embodiment, each of the first touch sensing electrodes 210 might not include divided touch electrodes spaced apart from each other in the first direction DR1. For example, each of the first touch sensing electrodes 210 may be connected to one first trace line 210$t$ that does not include branch portions.

In an embodiment, each of the first pen sensing electrodes 230 may include first divided pen electrodes 230$dv$1 and 230$dv$2 connected in parallel. The first divided pen electrodes 230$dv$1 and 230$dv$2 may extend in the second direction DR2 and may be spaced apart from each other in the first direction DR1. In an embodiment, a portion of each of the first divided pen electrodes 230$dv$1 and 230$dv$2 connected in parallel may be included in one sensing unit 200SU. FIG. 9B illustrates an example that each of the first pen sensing electrodes 230 includes the two first divided pen electrodes 230$dv$1 and 230$dv$2. The number of first divided pen electrodes 230$dv$1 and 230$dv$2 included in each of the first pen sensing electrodes 230 may be diversely modified.

Each of the first touch sensing electrodes 210 may be disposed between the two first divided pen electrodes 230$dv$1 and 230$dv$2 included in one first pen sensing electrode 230.

The two first divided pen electrodes 230$dv$1 and 230$dv$2 included in the one first pen sensing electrode 230 may be connected to one fourth trace line among the fourth trace lines 230$t$2. Each of the fourth trace lines 230$t$2 may include a plurality of branch portions for connection to the two first divided pen electrodes 230$dv$1 and 230$dv$2. In an embodiment of the present disclosure, the two first divided pen electrodes 230$dv$1 and 230$dv$2 may be connected with each other in the sensing area 200A.

Figure 10A:
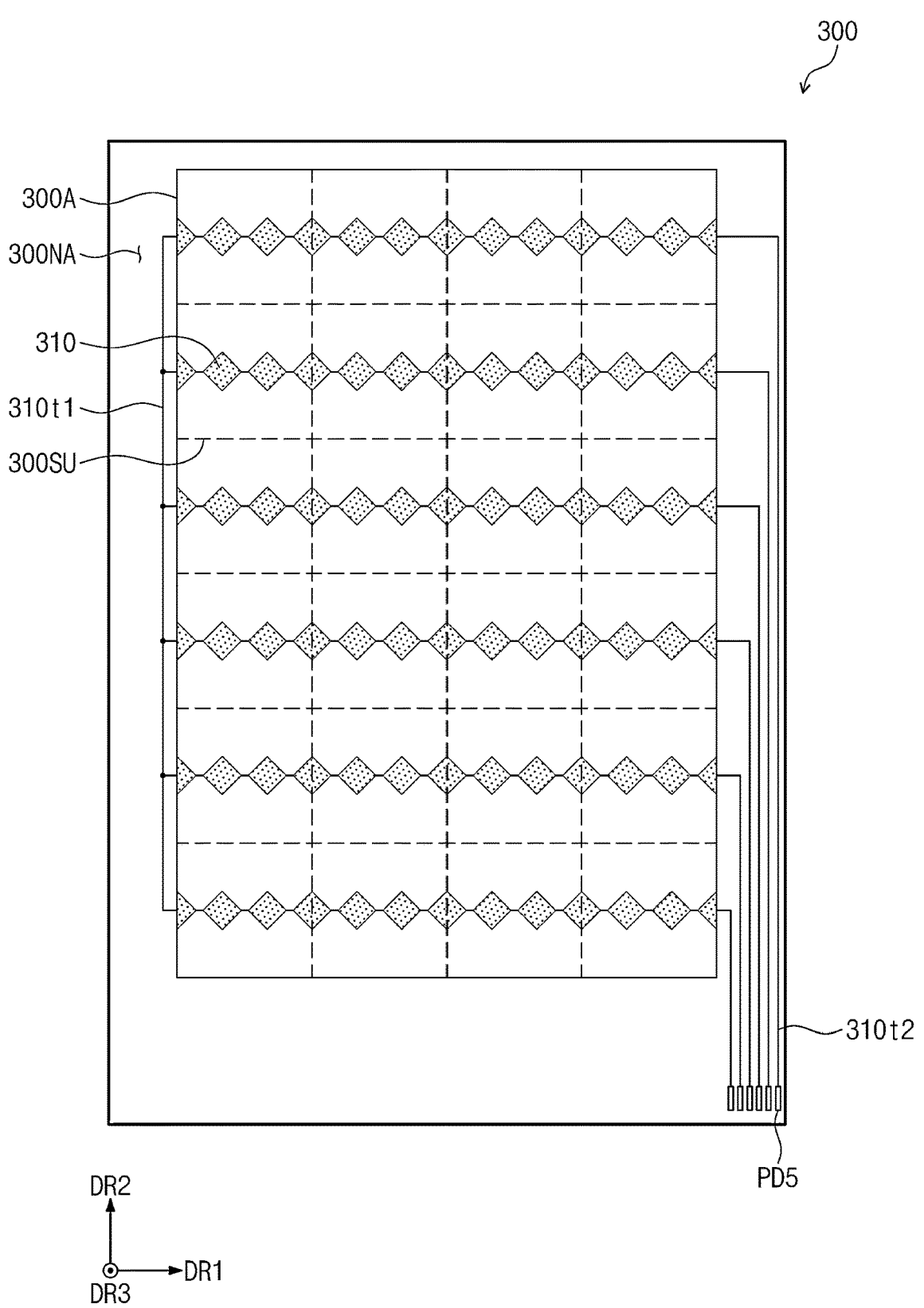
FIGS. 10A and 10B are plan views of a lower conductive layer according to an embodiment of the present disclosure.
Figure 10B:
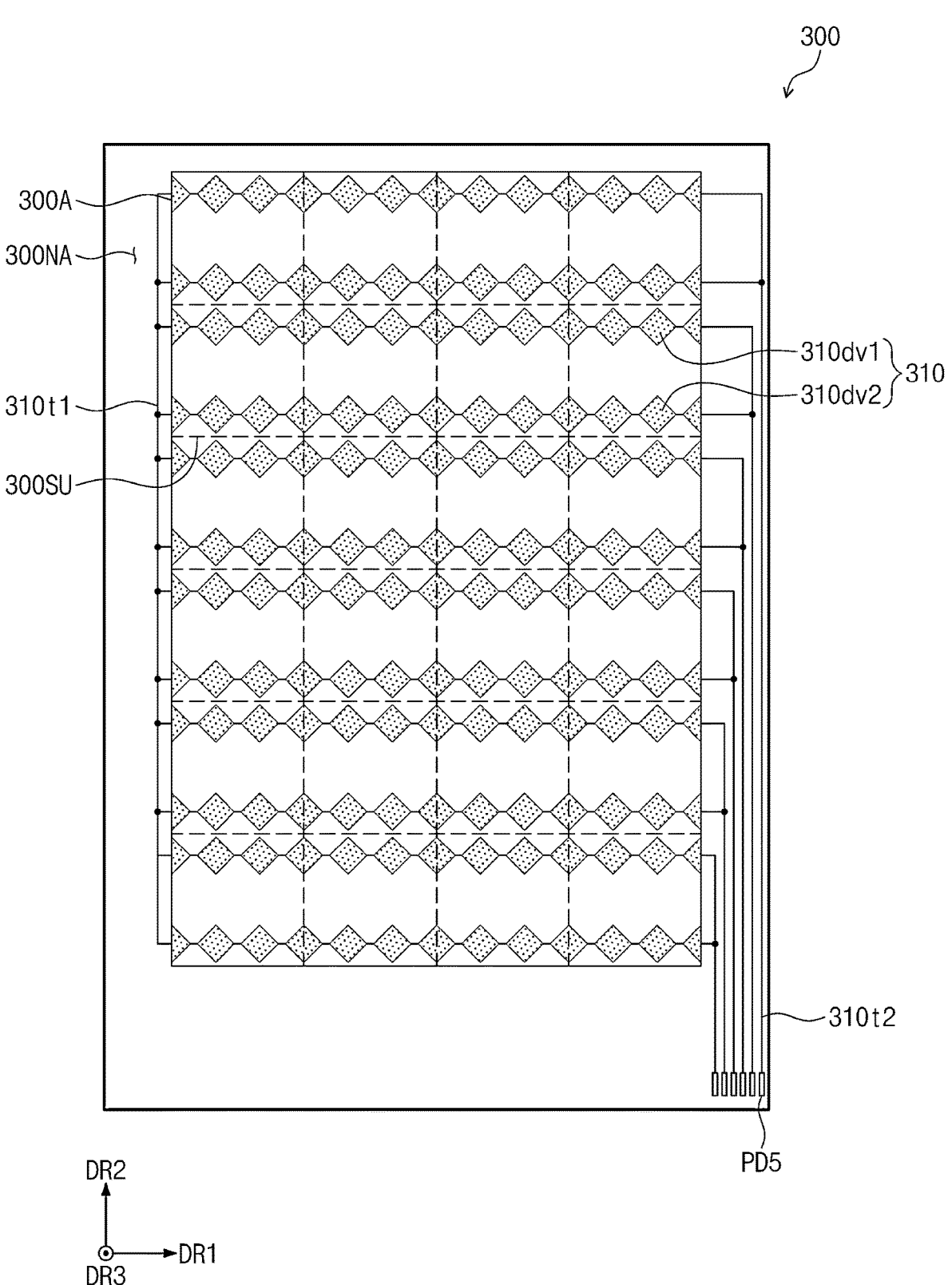

FIGS. 10A and 10B are plan views of the lower conductive layer 300 according to an embodiment of the present disclosure.

Referring to FIG. 10A, a sensing area 300A and a peripheral area 300NA adjacent to the sensing area 300A may be defined in the lower conductive layer 300. The sensing area 300A and the peripheral area 300NA of the lower conductive layer 300 may correspond to (or, overlap) the sensing area 200A (refer to FIGS. 9A and 9B) and the peripheral area 200 NA (refer to FIGS. 9A and 9B) of the sensor layer 200 (refer to FIGS. 9A and 9B), respectively.

In an embodiment, the lower conductive layer 300 may include the plurality of second pen sensing electrodes 310 disposed in the sensing area 300A. The plurality of second pen sensing electrodes 310 may be referred to as fourth electrodes.

Each of the second pen sensing electrodes 310 may extend in the first direction DR1, and the second pen sensing electrodes 310 may be arranged in the second direction DR2 so as to be spaced apart from each other. For example, the second pen sensing electrodes 310 may extend in a direction perpendicular to the extension direction of the first pen sensing electrodes 230. The second pen sensing electrodes 310 may be arranged so as to be spaced apart from each other in a direction perpendicular to the arrangement direction of the first pen sensing electrodes 230.

In an embodiment, a portion of one second pen sensing electrode 310 may be included in one sensing unit 300SU. In the one sensing unit 300SU, the portion of the one second pen sensing electrode 310 may be disposed in a central portion.

The lower conductive layer 300 may further include a fifth trace line 310*t*1 disposed in the peripheral area 300NA, a plurality of sixth trace lines 310*t*2, and a plurality of fifth pads PD5 connected to the sixth trace lines 310*t*2 in a one-to-one correspondence.

The fifth trace line 310*t*1 may be electrically connected with at least one second pen sensing electrode among the second pen sensing electrodes 310. In an embodiment of the present disclosure, the fifth trace line 310*t*1 may be electrically connected with all the second pen sensing electrodes 310. For example, the fifth trace line 310*t*1 may be electrically connected to all the second pen sensing electrodes 310.

FIG. 10A illustrates an example that the fifth trace line 310*t*1 extends in the second direction DR2 and includes a line portion electrically connected to the second pen sensing electrodes 310. In an embodiment of the present disclosure, the fifth trace line 230*t*1 may extend in the second direction DR2 and may include a first line portion electrically connected to the second pen sensing electrodes 310, a second line portion extending from a first end of the first line portion in the first direction DR1, and a third line portion extending from a second end of the first line portion in the first direction DR1. The lower conductive layer 300 may further include a plurality of pads connected to one end and an opposite end of the fifth trace line 310*t*1.

The sixth trace lines 310*t*2 may be connected to the second pen sensing electrodes 310 in a one-to-one correspondence. For example, the number of sixth trace lines 310*t*2 may correspond to the number of second pen sensing electrodes 310. In FIG. 10A, six sixth trace lines 310*t*2 are illustrated as an example. However, without necessarily being limited thereto, the sixth trace lines 310*t*2 may be connected to the plurality of second pen sensing electrodes 310, respectively, and may include a plurality of branch portions for connection to the plurality of second pen sensing electrodes 310.

Referring to FIGS. 9A to 10A, according to this embodiment, by providing some of the electrodes driven in a pen sensing drive mode through the lower conductive layer 300 disposed under the display layer 100 (refer to FIGS. 6A and 6B), the forms of the electrodes driven in the pen sensing drive mode may be more freely designed. For example, when the first pen sensing electrodes 230 are disposed in the sensor layer 200 and the second pen sensing electrodes 310 are disposed in the lower conductive layer 300, the degree of freedom in design may be increased as compared with when the first pen sensing electrodes 230 and the second pen sensing electrodes 310 are all disposed in the sensor layer 200. For example, when not only the first touch sensing electrodes 210 and the second touch sensing electrodes 220 but also the first pen sensing electrodes 230 and the second pen sensing electrodes 310 are disposed in the sensor layer 200, it may be difficult to form low-resistance films of the electrodes, and it may be difficult to provide the first pen sensing electrodes 230 and the second pen sensing electrodes 310 in a loop form due to space limitation. In contrast, when the second pen sensing electrodes 310 are disposed through the separate lower conductive layer 300 as in this embodiment, the degree of freedom in the design of the electrodes may be increased. Accordingly, the first pen sensing electrodes 230 and the second pen sensing electrodes 310 may all be provided in a loop form, and it may be possible to form the low-resistance films of the electrodes.

Referring to FIG. 10B, in an embodiment, each of the second pen sensing electrodes 310 may include second divided pen electrodes 310*dv*1 and 310*dv*2 connected in parallel. The second divided pen electrodes 310*dv*1 and 310*dv*2 may extend in the first direction DR1 and may be spaced apart from each other in the second direction DR2. In an embodiment, a portion of each of the second divided pen electrodes 310*dv*1 and 310*dv*2 connected in parallel may be included in one sensing unit 300SU. In the one sensing unit 300SU, the second divided pen electrodes 310*dv*1 and 310*dv*2 connected in parallel may be disposed in an upper edge portion and a lower edge portion, respectively. FIG. 10B illustrates an example that each of the second pen sensing electrodes 310 includes two first divided pen electrodes 310*dv*1 and 310*dv*2. The number of second divided pen electrodes 310*dv*1 and 310*dv*2 included in each of the second pen sensing electrodes 310 may be diversely modified.

The two second divided pen electrodes 310*dv*1 and 310*dv*2 included in the second pen sensing electrode 310 may be connected to one sixth trace line among the sixth trace lines 310*t*2. Each of the sixth trace lines 310*t*2 may include a plurality of branch portions for connection to the two second divided pen electrodes 310*dv*1 and 310*dv*2. In an embodiment of the present disclosure, the two second divided pen electrodes 310*dv*1 and 310*dv*2 may be connected with each other in the sensing area 300A.

Figure 11A:
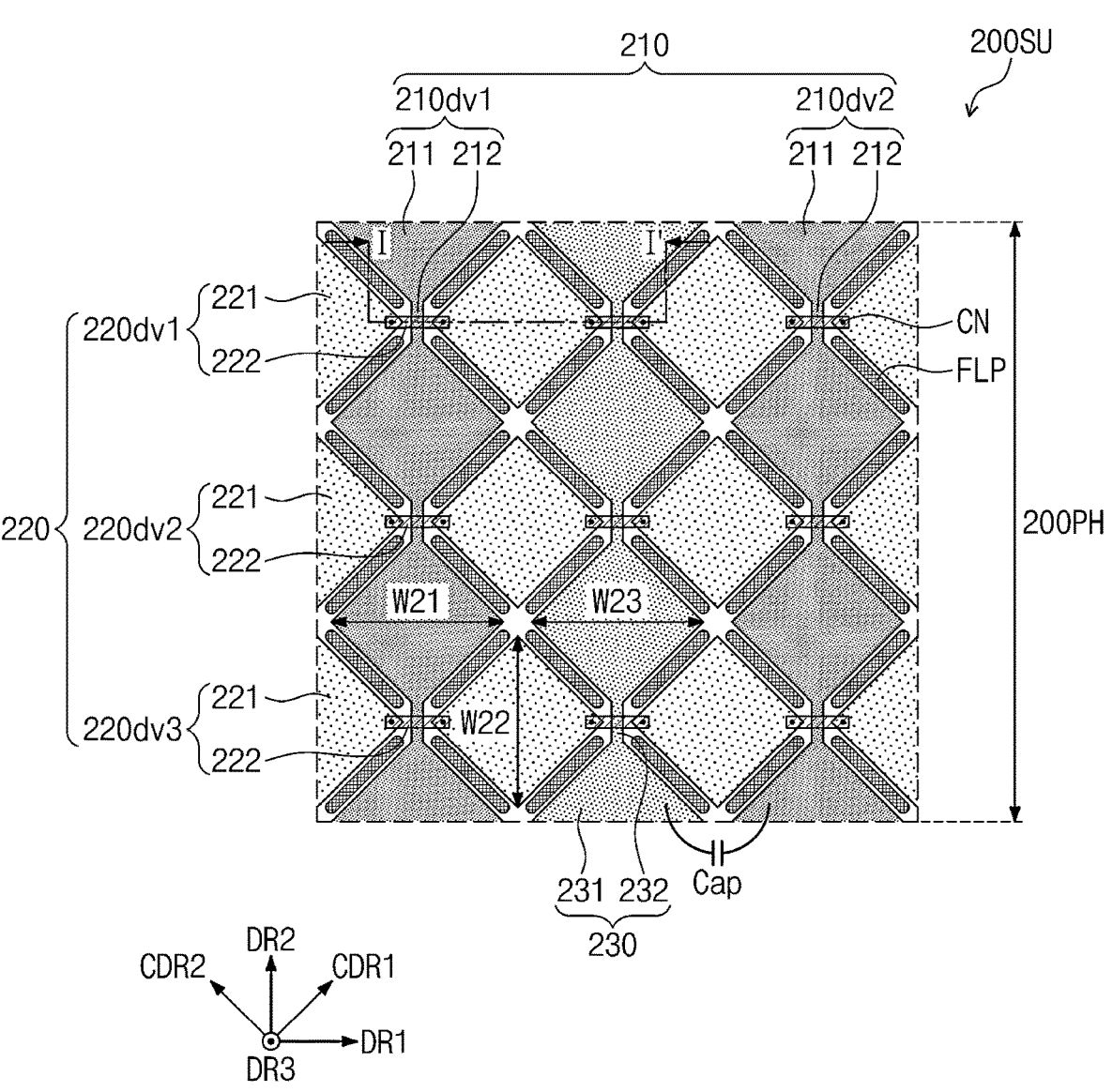
FIG. 11A is an enlarged plan view illustrating one sensing unit in the sensor layer according to an embodiment of the present disclosure.
Figure 11B:
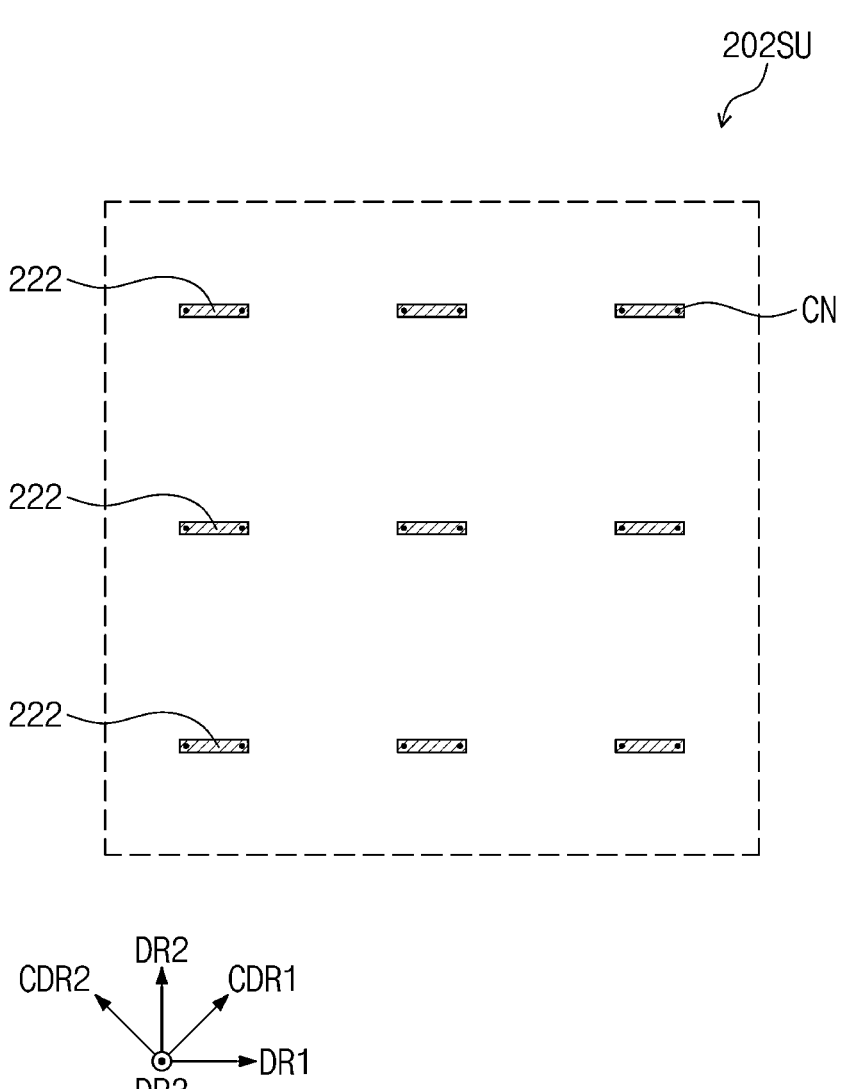
FIG. 11B is a plan view illustrating a first conductive layer of the sensing unit according to an embodiment of the present disclosure.
Figure 11C:
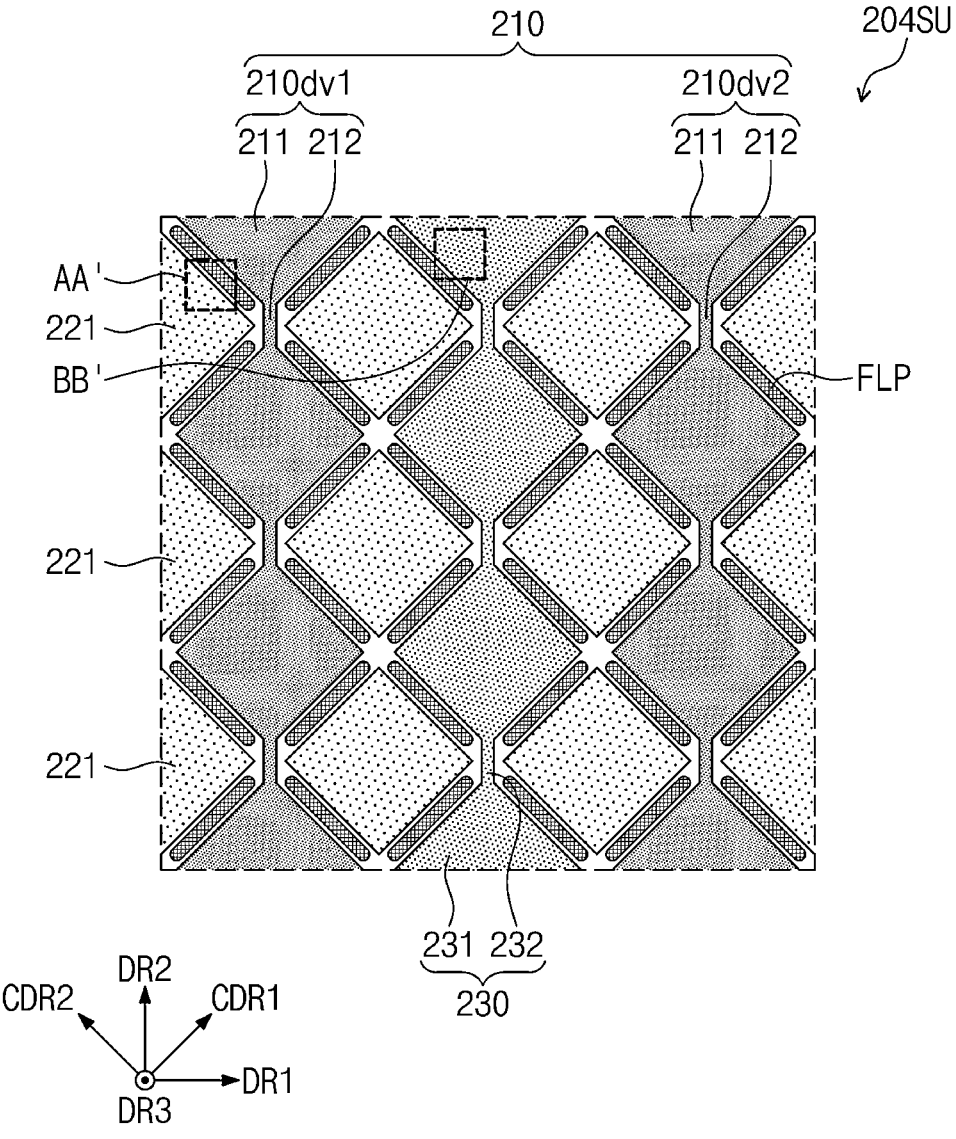
FIG. 11C is a plan view illustrating a second conductive layer of the sensing unit according to an embodiment of the present disclosure.
Figure 12:
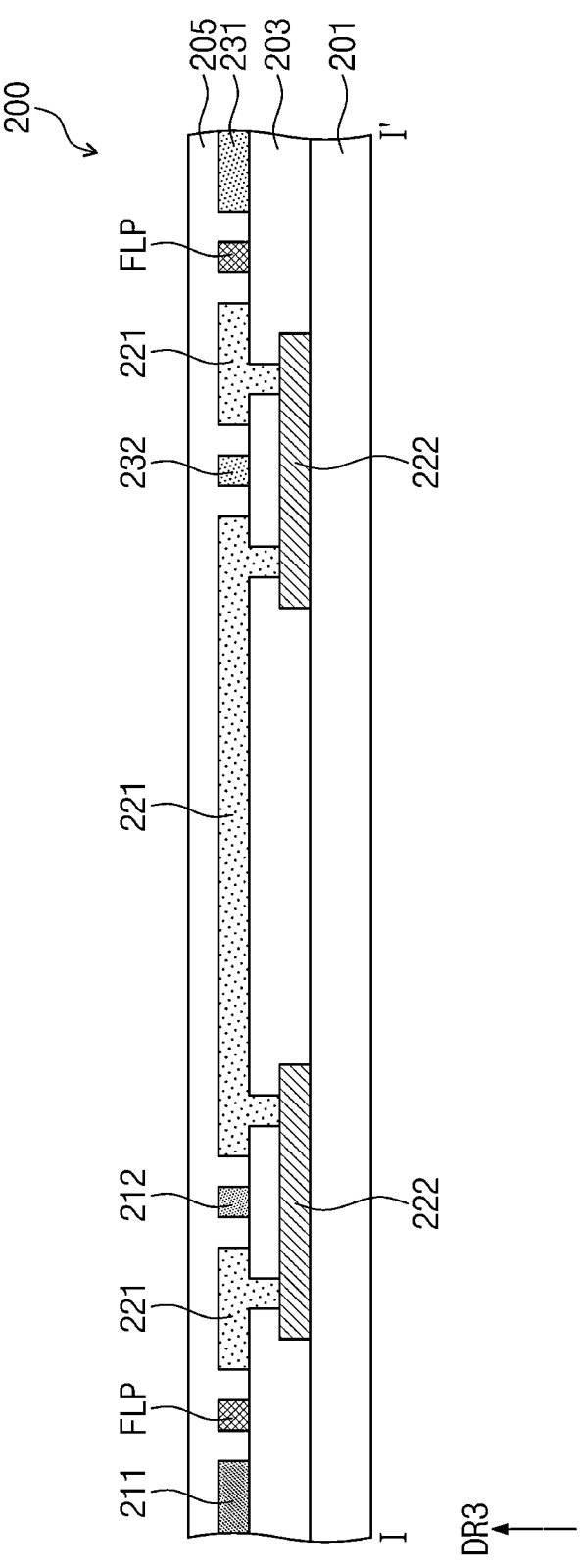
FIG. 12 is a cross-sectional view of the sensor layer taken along line I-I' illustrated in FIG. 11A according to an embodiment of the present disclosure.

FIG. 11A is an enlarged plan view illustrating one sensing unit 200SU in the sensor layer 200 (refer to FIG. 5) according to an embodiment of the present disclosure. FIG. 11B is a plan view illustrating a first conductive layer 202SU of the sensing unit 200SU (refer to FIG. 11A) according to an embodiment of the present disclosure. FIG. 11C is a plan view illustrating a second conductive layer 204SU of the sensing unit 200SU (refer to FIG. 11A) according to an embodiment of the present disclosure. FIG. 12 is a cross-sectional view of the sensor layer 200 taken along line I-I' illustrated in FIG. 11A according to an embodiment of the present disclosure.

Referring to FIGS. 11A to 12, in an embodiment, a first touch sensing electrode 210 may include two first divided touch electrodes 210*dv*1 and 210*dv*2 in the one sensing unit 200SU. The two first divided touch electrodes 210*dv*1 and 210*dv*2 may be referred to as a first-first divided electrode 210*dv*1 and a first-second divided electrode 210*dv*2, respectively. Each of the first divided sensing electrodes 210*dv*1 and 210*dv*2 may include two portions having different shapes. Each of the first divided sensing electrodes 210*dv*1 and 210*dv*2 may include first sensing portions 211 and first bridge portions 212. Portions having a relatively large area may be defined as the first sensing portions 211, and portions having a relatively small area may be defined as the first bridge portions 212. The first sensing portions 211 may alternate with the first bridge portions 212 in the second direction DR2.

In an embodiment, the first sensing portions 211 and the first bridge portions 212 included in the first divided touch electrode 210*dv*1 or 210*dv*2 may have a single-body shape. In an embodiment, the first sensing portions 211 may have a rhombic shape. Each of the first bridge portions 212 may connect the first sensing portions 211 adjacent to each other and may have a bar shape extending in the second direction DR2.

In the one sensing unit 200SU, each of the first divided sensing electrodes 210dv1 and 210dv2 may include four first sensing portions 211 and three first bridge portions 212. Among the four first sensing portions 211, two first sensing portions 211 may include an entire area of a rhombic shape, and the remaining two first sensing portions 211 may include a partial area corresponding to half of a rhombic shape (e.g., a half-rhombic shape). The total area of the first sensing portions 211 included in the first divided sensing electrode 210dv1 or 210dv2 in the one sensing unit 200SU may be equal to the sum of the areas of three first sensing portions 211 having a rhombic shape.

In an embodiment, a second touch sensing electrode 220 may include three second divided touch electrodes 220dv1, 220dv2, and 220dv3 in the one sensing unit 200SU. The three second divided touch electrodes 220dv1, 220dv2, and 220dv3 may be referred to as a second-first divided electrode 220dv1, a second-second divided electrode 220dv2, and a second-third divided electrode 220dv3, respectively. Each of the second divided touch electrodes 220dv1, 220dv2, and 220dv3 may include two portions having different shapes. Each of the second divided touch electrodes 220dv1, 220dv2, and 220dv3 may include second sensing portions 221 and second bridge portions 222. Portions having a relatively large area may be defined as the second sensing portions 221, and portions having a relatively small area may be defined as the second bridge portions 222. The second sensing portions 221 may alternate with the second bridge portions 222 in the first direction DR1.

In an embodiment, the second sensing portions 221 and the second bridge portions 222 may be disposed on different layers. The second sensing portions 221 adjacent to each other and the second bridge portion 222 connecting the adjacent second sensing portions 221 may be connected through a contact hole CN. The second sensing portions 221 and the second bridge portions 222 may be referred to as second sensing patterns and second bridge patterns, respectively.

In an embodiment, each of the second sensing portions 221 may have a rhombic shape. Each of the second bridge portions 222 may connect the second sensing portions 221 adjacent to each other and may have a bar shape extending in the second direction DR2.

In the one sensing unit 200SU, each of the second divided touch electrodes 220dv1, 220dv2, and 220dv3 may include four second sensing portions 221 and three second bridge portions 222. Among the four second sensing portions 221, two second sensing portions 221 may include an entire area of a rhombic shape, and the remaining two second sensing portions 221 may include a partial area corresponding to half of a rhombic shape (e.g., a half-rhombic shape). The total area of the second sensing portions 221 included in the second divided touch electrode 220dv1, 220dv2, or 220dv3 in the one sensing unit 200SU may be equal to the sum of the areas of three second sensing portions 221 having a rhombic shape.

In an embodiment, a first pen sensing electrode 230 might not include separate divided electrodes in the one sensing unit 200SU and may be disposed as one electrode. The first pen sensing electrode 230 may include two portions having different shapes. The first pen sensing electrode 230 may include third sensing portions 231 and third bridge portions 232. Portions having a relatively large area may be defined as the third sensing portions 231, and portions having a relatively small area may be defined as the third bridge portions 232. The third sensing portions 231 may alternate with the third bridge portions 232 in the second direction DR2.

In an embodiment, the third sensing portions 231 and the third bridge portions 232 included in the first pen sensing electrode 230 may have a single-body shape. In an embodiment, the third sensing portions 231 may have a rhombic shape. Each of the third bridge portions 232 may connect the third sensing portions 231 adjacent to each other and may have a bar shape extending in the second direction DR2.

In the one sensing unit 200SU, the first pen sensing electrode 230 may include four third sensing portions 231 and three third bridge portions 232. Among the four third sensing portions 231, two third sensing portions 231 may include an entire area of a rhombic shape, and the remaining two third sensing portions 231 may include a partial area corresponding to half of a rhombic shape (e.g., a half-rhombic shape). The total area of the third sensing portions 231 included in the first pen sensing electrode 230 in the one sensing unit 200SU may be equal to the sum of the areas of three third sensing portions 231 having a rhombic shape.

In the one sensing unit 200SU, the first pen sensing electrode 230 may be disposed between the two first divided touch electrodes 210dv1 and 210dv2. The third sensing portions 231 of the first pen sensing electrode 230, the first sensing portions 211 of one of the two first divided touch electrodes 210dv1 and 210dv2, and the first sensing portions 211 of the other one of the two first divided touch electrodes 210dv1 and 210dv2 may be arranged in the first direction DR1 so as to be spaced apart from each other.

The second bridge portions 222 of the second divided touch electrodes 220dv1, 220dv2, and 220dv3 may be included in the first conductive layer 202SU. The first sensing portions 211 and the first bridge portions 212 of the first divided touch electrodes 210dv1 and 210dv2, the second sensing portions 221 of the second divided touch electrodes 220dv1, 220dv2, and 220dv3, and the third sensing portions 231 and the third bridge portions 232 of the first pen sensing electrode 230 may be included in the second conductive layer 204SU. However, embodiments are not necessarily limited thereto. The second bridge portions 222 of the second divided touch electrodes 220dv1, 220dv2, and 220dv3 may be included in the second conductive layer 204SU, and the first divided touch electrodes 210dv1 and 210dv2, the second sensing portions 221 of the second divided touch electrodes 220dv1, 220dv2, and 220dv3, and the first pen sensing electrode 230 may be included in the first conductive layer 202SU.

The first divided touch electrodes 210dv1 and 210dv2 and the second divided touch electrodes 220dv1, 220dv2, and 220dv3 may cross each other at the first bridge portions 212 and the second bridge portions 222. The first bridge portions 212 and the second bridge portions 222 may be disposed on different layers. The first bridge portions 212 and the second bridge portions 222 may be insulated from each other. The first pen sensing electrode 230 and the second divided touch electrodes 220dv1, 220dv2, and 220dv3 may cross each other at the third bridge portions 232 and the second bridge portions 222. The third bridge portions 232 and the second bridge portions 222 may be disposed on different layers. The third bridge portions 232 and the second bridge portions 222 may be insulated from each other.

Referring to FIGS. 9A to 10B and 11A to 12, according to an embodiment of the present disclosure, by disposing the second pen sensing electrodes 310 in the lower conductive layer 300, the spatial degree of freedom and the design degree of freedom of the sensor layer 200 may be increased. In addition, since the first pen sensing electrodes 230 and the second pen sensing electrodes 310 are all provided in a loop form according to this embodiment, the first touch sensing electrodes 210 and the second touch sensing electrodes 220 may be driven to sense a touch input, and the first pen sensing electrodes 230 and the second pen sensing electrodes 310 may be driven to sense a pen input. Accordingly, for pen sensing driving, the touch sensing electrodes and the pen sensing electrodes might not be disposed to define a coupling capacitor. For example, the degree of freedom in the arrangement of the touch sensing electrodes and the pen sensing electrodes may be increased. Thus, the first touch sensing electrodes 210 and the first pen sensing electrodes 230 extending in the same direction may be designed to be relatively spaced apart from each other. For example, in the one sensing unit 200SU, the first touch sensing electrode 210 and the first pen sensing electrode 230 might not be disposed such that surfaces face each other. For example, the first sensing portions 211 having a rhombic shape and the third sensing portions 231 having a rhombic shape may be disposed such that vertexes are adjacent to each other. Accordingly, the separation distance between the first touch sensing electrode 210 and the first pen sensing electrode 230 may be relatively increased, and the capacitance between the first touch sensing electrode 210 and the first pen sensing electrode 230 may be reduced. Thus, the signal to noise ratio (SNR) of drive signals for sensing a touch input may be increased. As a result, the electronic device 1000 (refer to FIG. 1A) with increased touch sensing sensitivity may be provided. In addition, the occurrence of leakage current may be reduced while a pen input is being sensed, and the signal to noise ratio (SNR) of drive signals for sensing the pen input may be increased. As a result, the electronic device 1000 (refer to FIG. 1A) with increased pen sensing sensitivity may be provided.

Referring again to FIGS. 11A to 12, in an embodiment of the present disclosure, the sensor layer 200 (refer to FIG. 5) may further include floating patterns FLP. Each of the floating patterns FLP may be electrically floated. The floating patterns FLP may be disposed between the first touch sensing electrode 210 and the first pen sensing electrode 230 adjacent to each other.

The floating patterns FLP may be disposed between the first touch sensing electrode 210 and the second touch sensing electrode 220 and between the first pen sensing electrode 230 and the second touch sensing electrode 220 adjacent to each other in a first diagonal direction CDR1 or a second diagonal direction CDR2 in a plan view. The floating patterns FLP may extend in the first diagonal direction CDR1 or the second diagonal direction CDR2. The first diagonal direction CDR1 may be a direction crossing the first direction DR1 and the second direction DR2 in a plan view defined by the first direction DR1 and the second direction DR2. The second diagonal direction CDR2 may be a direction crossing the first direction DR1, the second direction DR2, and the first diagonal direction CDR1 in a plan view defined by the first direction DR1 and the second direction DR2.

The floating patterns FLP may be included in the second conductive layer 204SU. The floating patterns FLP may be disposed on the same layer as the first divided touch electrodes 210dv1 and 210dv2, the second sensing portions 221, and the first pen sensing electrode 230. However, embodiments are not necessarily limited thereto, and the floating patterns FLP may be included in the first conductive layer 202SU.

According to this embodiment, since the floating patterns FLP are disposed between the first touch sensing electrode 210 and the first pen sensing electrode 230, the first touch sensing electrode 210 and the first pen sensing electrode 230 might not directly face each other. Accordingly, the capacitance between the first touch sensing electrode 210 and the first pen sensing electrode 230 may be reduced.

Each of the first conductive layer 202SU and the second conductive layer 204SU may have a single-layer structure or a multi-layer structure. For example, the first touch sensing electrode 210, the second touch sensing electrode 220, the first pen sensing electrode 230, and the floating patterns FLP may each have a single-layer structure or a multi-layer structure.

In an embodiment, the pitch 200PH of sensing units 200SU of the sensor layer 200 may be about 4 mm. However, the pitch 200PH of the sensing units 200SU of the sensor layer 200 is not necessarily limited to any one embodiment.

In an embodiment, the first touch sensing electrodes 210 and the first pen sensing electrodes 230 may be provided such that the pitch that forms one sensing unit 200SU is the same. For example, the gap between the first sensing portions 211 may be substantially the same as the gap between the third sensing portions 231.

In an embodiment, the maximum width W21 of each of the first sensing portions 211 in the first direction DR1 may be substantially the same as the maximum width W23 of each of the third sensing portions 231 in the first direction DR1.

Figure 13A:
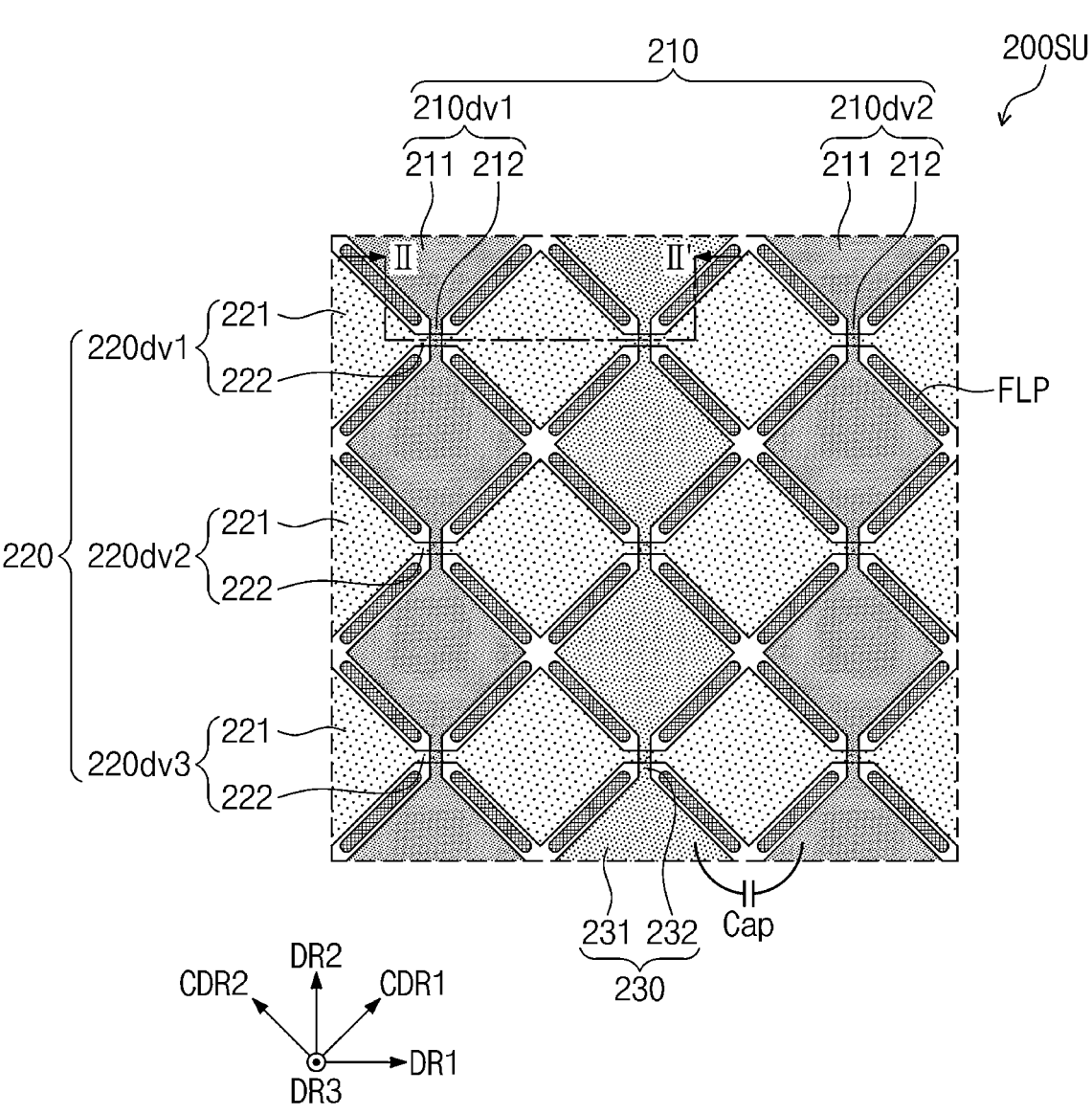
FIG. 13A is an enlarged plan view illustrating one sensing unit in the sensor layer according to an embodiment of the present disclosure.
Figure 13B:
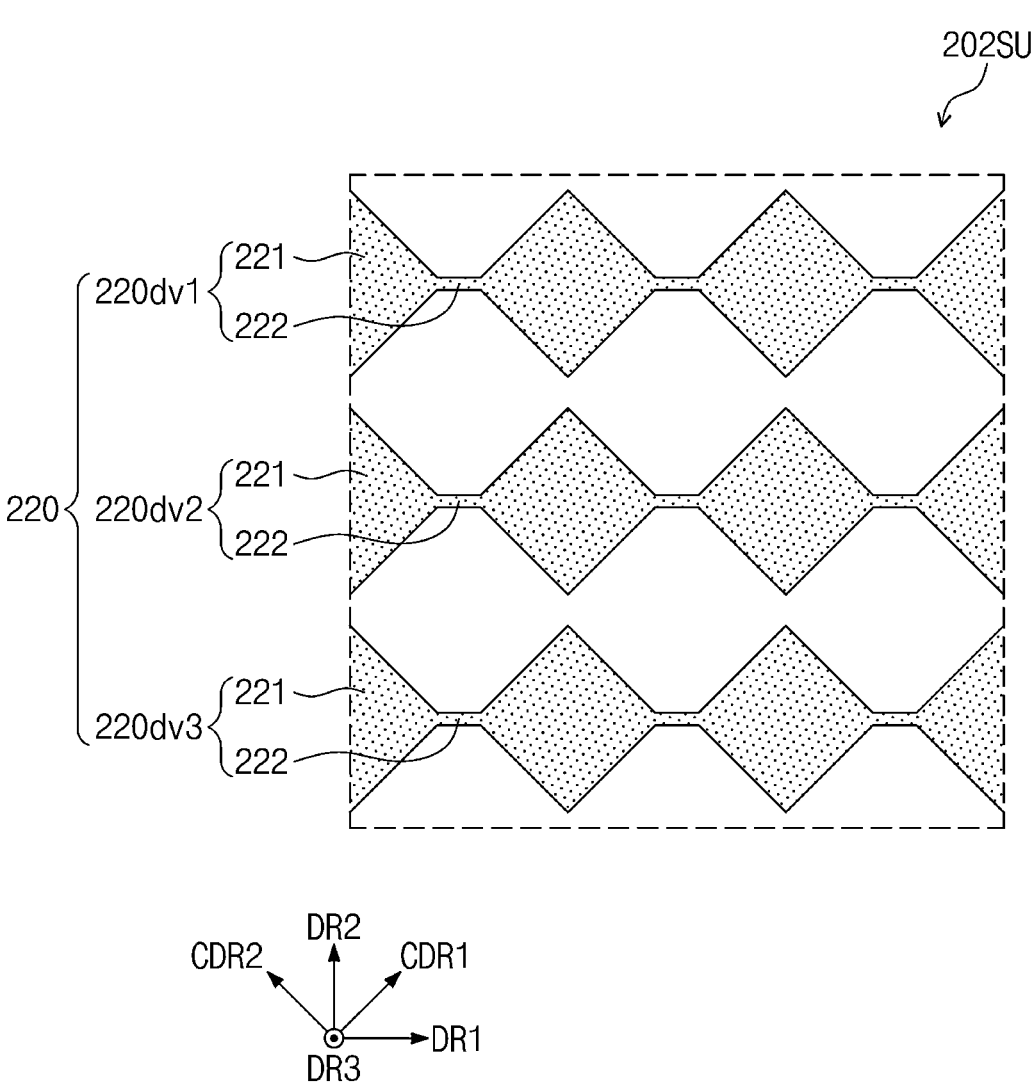
FIG. 13B is a plan view illustrating a first conductive layer of the sensing unit according to an embodiment of the present disclosure.
Figure 13C:
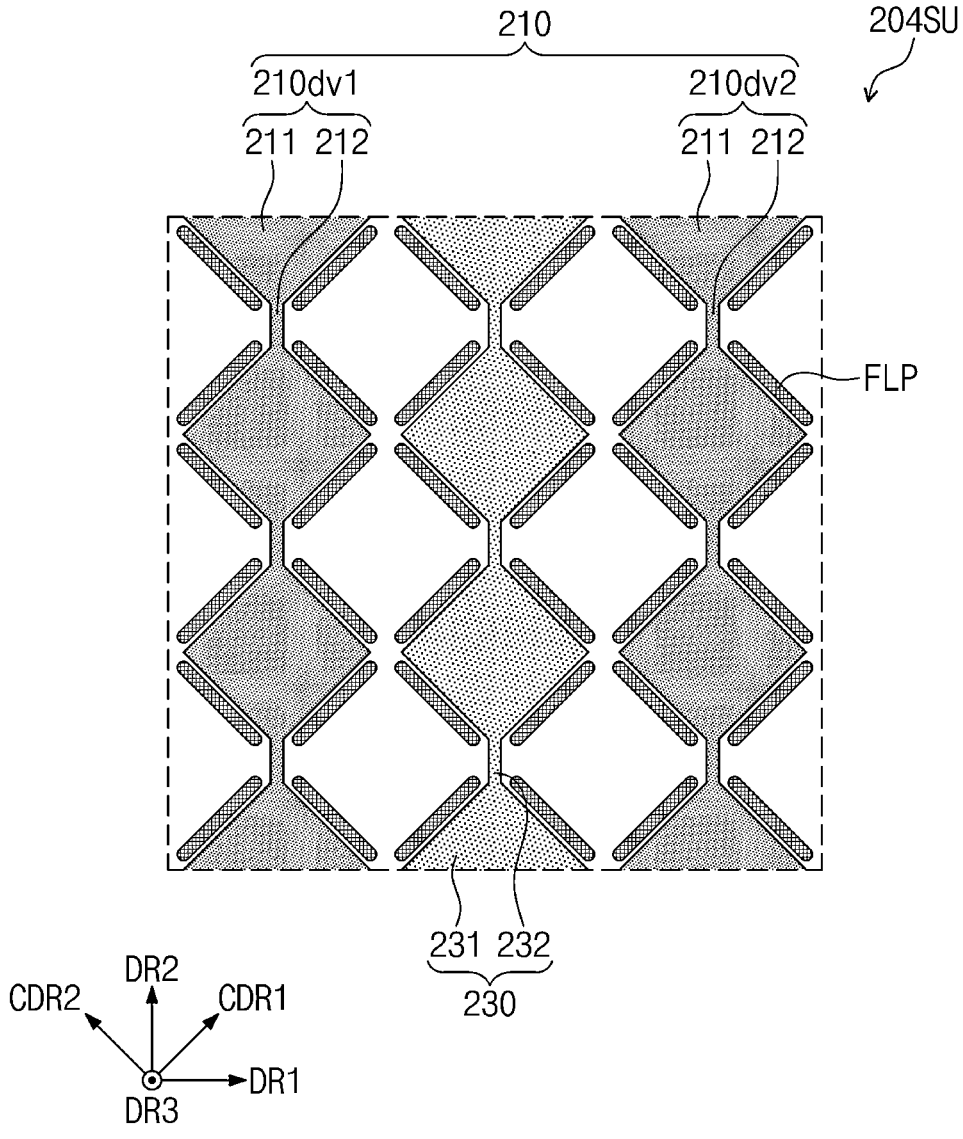
FIG. 13C is a plan view illustrating a second conductive layer of the sensing unit according to an embodiment of the present disclosure.
Figure 14:
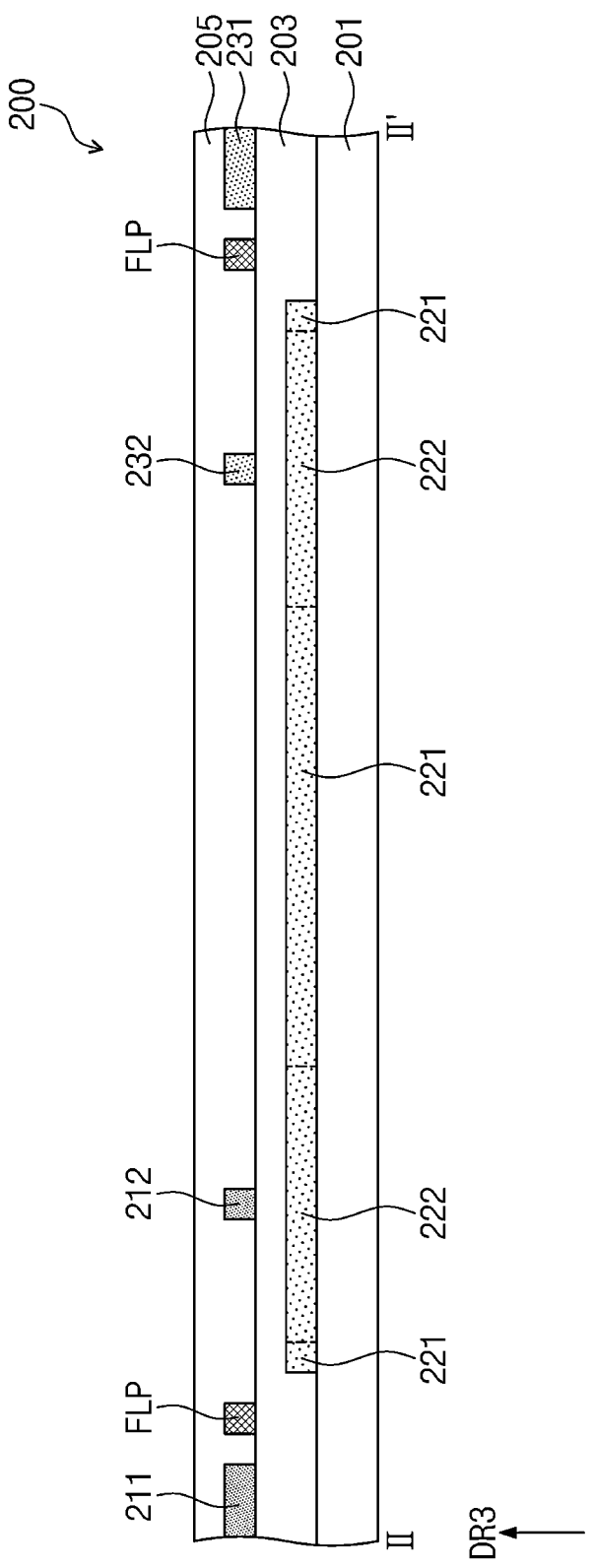
FIG. 14 is a cross-sectional view of the sensor layer taken along line II-II' illustrated in FIG. 13A according to an embodiment of the present disclosure.

FIG. 13A is an enlarged plan view illustrating one sensing unit 200SU in the sensor layer 200 (refer to FIG. 5) according to an embodiment of the present disclosure. FIG. 13B is a plan view illustrating a first conductive layer 202SU of the sensing unit 200SU according to an embodiment of the present disclosure. FIG. 13C is a plan view illustrating a second conductive layer 204SU of the sensing unit 200SU according to an embodiment of the present disclosure. FIG. 14 is a cross-sectional view of the sensor layer 200 taken along line II-II' illustrated in FIG. 13A according to an embodiment of the present disclosure.

Referring to FIGS. 13A to 14, in an embodiment, a second touch sensing electrode 220 may include three second divided touch electrodes 220dv1, 220dv2, and 220dv3 in the one sensing unit 200SU. Each of the second divided touch electrodes 220dv1, 220dv2, and 220dv3 may include second sensing portions 221 and second bridge portions 222.

In an embodiment, the second sensing portions 221 and the second bridge portions 222 included in the second divided touch electrode 220dv1, 220dv2, or 220dv3 may have a single-body shape. Each of the second divided touch electrodes 220dv1, 220dv2, and 220dv3 may be included in the first conductive layer 202SU. For example, the second sensing portions 221 and the second bridge portions 222 of the second divided touch electrodes 220dv1, 220dv2, and 220dv3 may all be included in the first conductive layer 202SU. First divided touch electrodes 210dv1 and 210dv2 and a first pen sensing electrode 230 may be disposed in the second conductive layer 204SU, and the second divided touch electrodes 220dv1, 220dv2, and 220dv3 may all be disposed on a layer different from the layer on which the first divided touch electrodes 210dv1 and 210dv2 and the first pen sensing electrode 230 are disposed.

Figure 15:
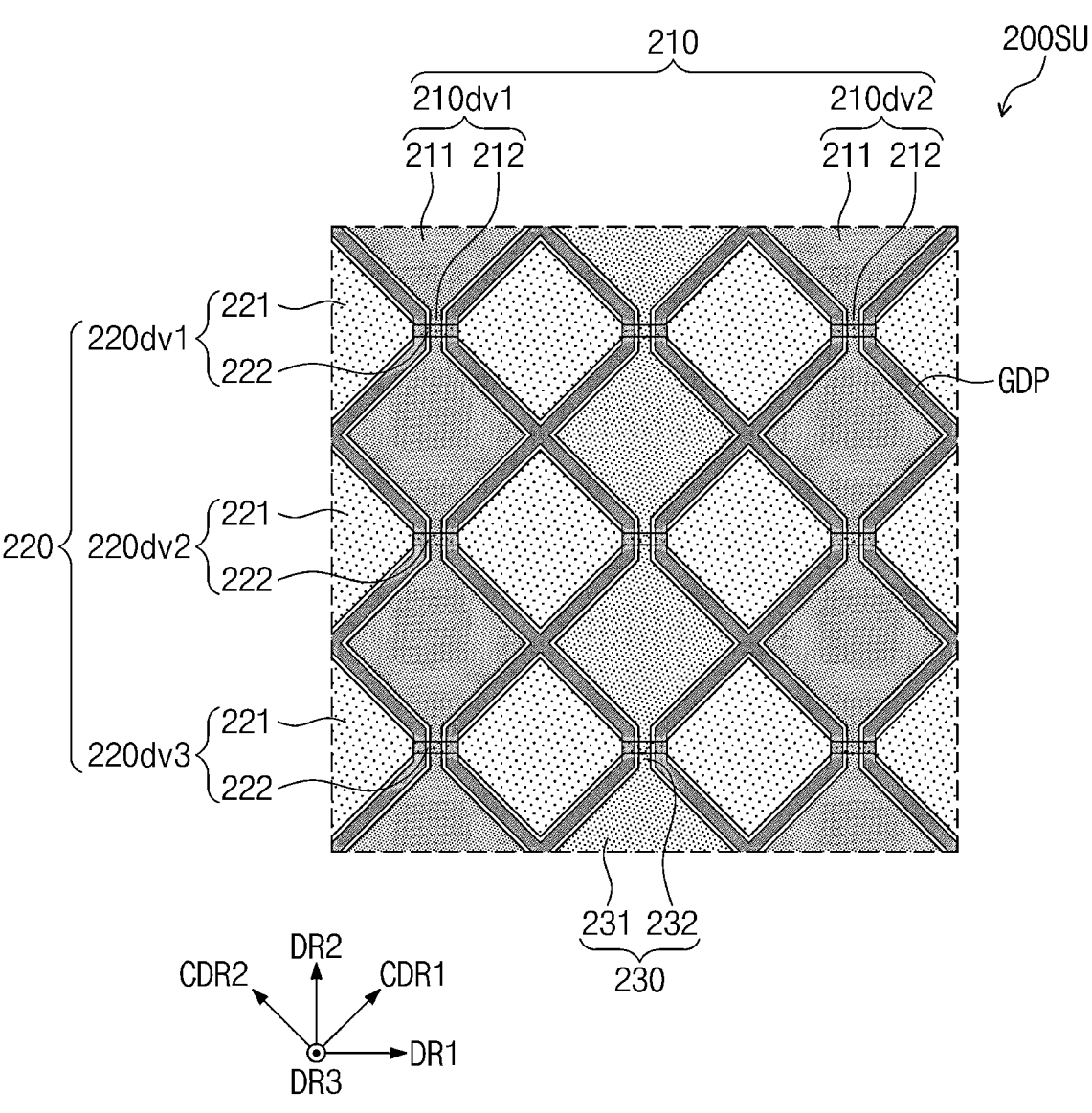
FIG. 15 is an enlarged plan view illustrating one sensing unit in the sensor layer according to an embodiment of the present disclosure.

FIG. 15 is an enlarged plan view illustrating one sensing unit 200SU in the sensor layer 200 (refer to FIG. 5) according to an embodiment of the present disclosure.

Referring to FIG. 15, the sensor layer 200 (refer to FIG. 5) may include a first touch sensing electrode 210, a second touch sensing electrode 220, and a first pen sensing electrode 230. The description given above with reference to FIGS. 11A to 12 or the description given above with reference to FIGS. 13A to 14 may be identically applied to the first touch sensing electrode 210, the second touch sensing electrode 220, and the first pen sensing electrode 230.

In an embodiment, the sensor layer 200 (refer to FIG. 5) may further include ground patterns GDP. Each of the ground patterns GDP may be grounded. For example, each of the ground patterns GDP may be regarded as being grounded. The ground patterns GDP may be disposed between the first touch sensing electrode 210 and the first pen sensing electrode 230 adjacent to each other.

The ground patterns GDP may be disposed between first divided touch electrodes 210dv1 and 210dv2 and second sensing portions 221 adjacent thereto and between the first pen sensing electrode 230 and second sensing portions 221 adjacent thereto. Some of the ground patterns GDP may extend along the edges of the first divided touch electrodes 210dv1 and 210dv2, and the other ground patterns GDP may extend along the edge of the first pen sensing electrode 230. The ground patterns GDP may be disposed on the same layer as the first touch sensing electrode 210 and the first pen sensing electrode 230. For example, the ground patterns GDP may be included in a second conductive layer 204SU.

According to this embodiment, since the ground patterns GDP are disposed between the first touch sensing electrode 210 and the first pen sensing electrode 230, the first touch sensing electrode 210 and the first pen sensing electrode 230 might not directly face each other. Accordingly, the capacitance between the first touch sensing electrode 210 and the first pen sensing electrode 230 may be reduced.

Figure 16:
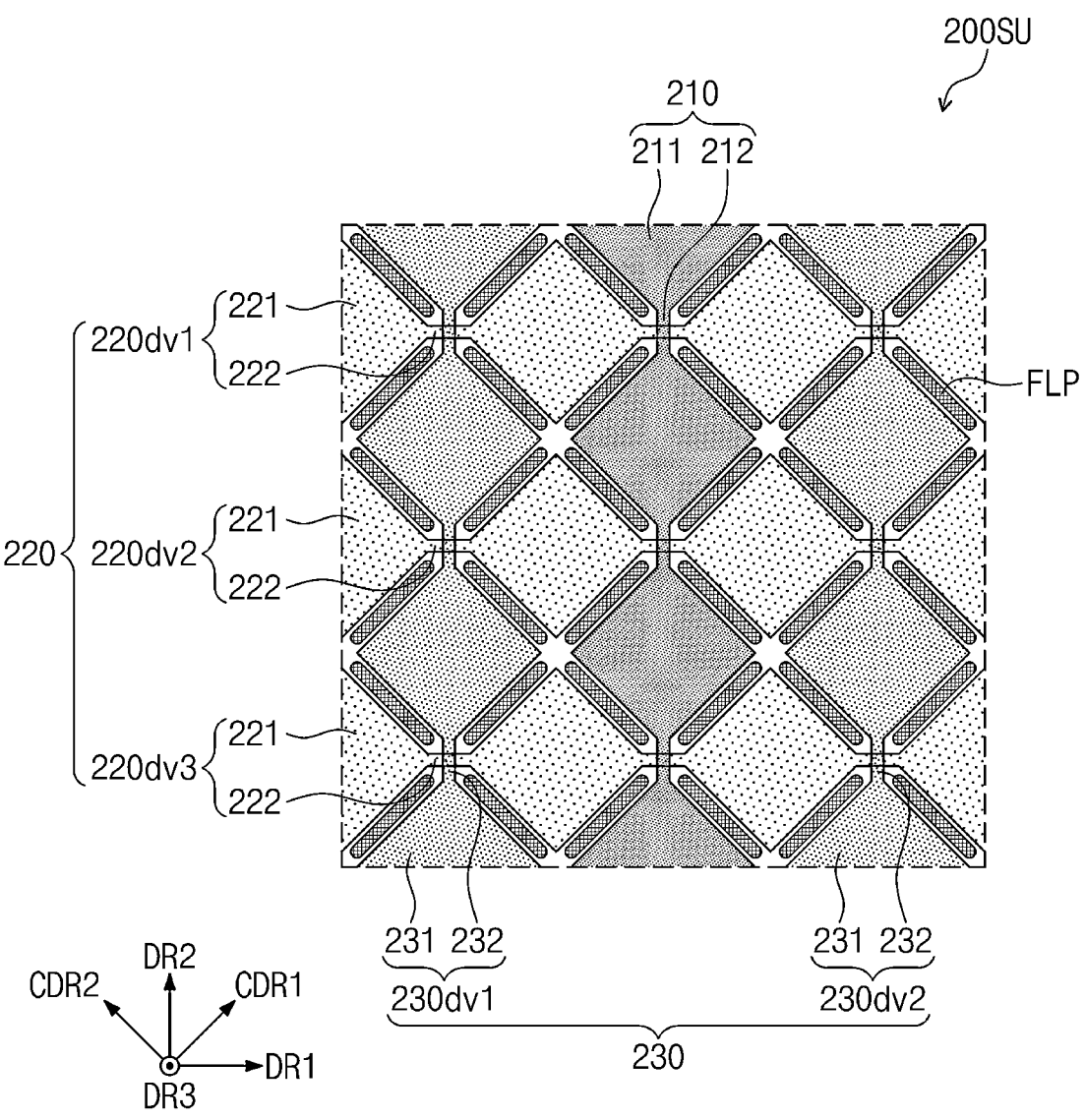
FIG. 16 is an enlarged plan view illustrating one sensing unit in the sensor layer according to an embodiment of the present disclosure.
Figure 17:
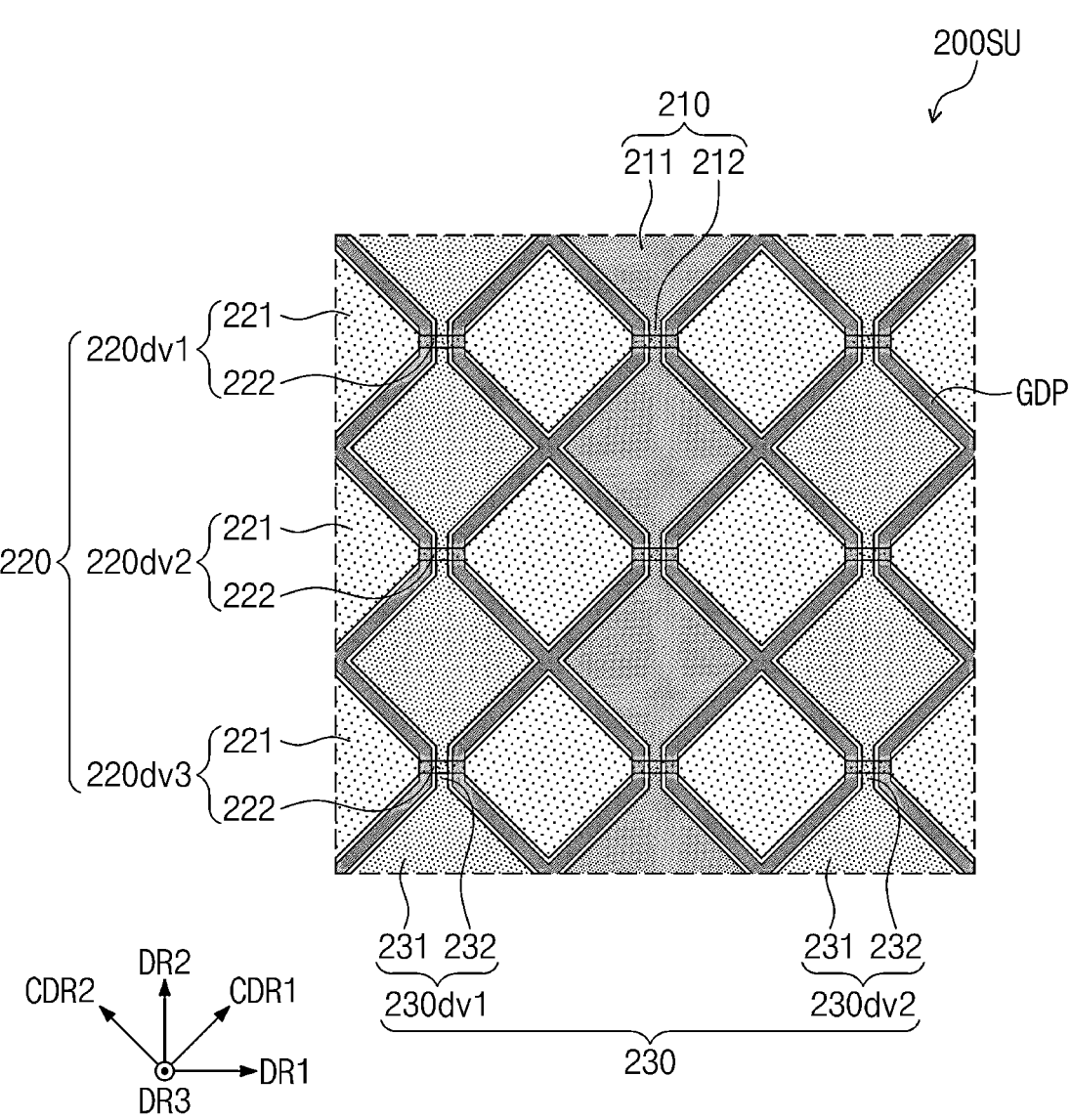
FIG. 17 is an enlarged plan view illustrating one sensing unit in the sensor layer according to an embodiment of the present disclosure.

FIG. 16 is an enlarged plan view illustrating one sensing unit 200SU in the sensor layer 200 (refer to FIG. 5) according to an embodiment of the present disclosure. FIG. 17 is an enlarged plan view illustrating one sensing unit 200SU in the sensor layer 200 (refer to FIG. 5) according to an embodiment of the present disclosure.

Referring to FIGS. 16 and 17, in an embodiment, a first touch sensing electrode 210 might not include separate divided electrodes in the one sensing unit 200SU and may be disposed as one electrode. The first touch sensing electrode 210 may include first sensing portions 211 and first bridge portions 212. A first pen sensing electrode 230 may include two first divided pen electrodes 230dv1 and 230dv2 in the one sensing unit 200SU. The two first divided pen electrodes 230dv1 and 230dv2 may be referred to as a third-first divided electrode 230dv1 and a third-second divided electrode 230dv2, respectively. Each of the first divided pen electrodes 230dv1 and 230dv2 may include third sensing portions 231 and third bridge portions 232.

In the one sensing unit 200SU, the first touch sensing electrode 210 may be disposed between the two first divided pen electrodes 230dv1 and 230dv2. The first sensing portions 211 of the first touch sensing electrode 210, the third sensing portions 231 of one of the two first divided pen electrodes 230dv1 and 230dv2, and the third sensing portions 231 of the other one of the two first divided pen electrodes 230dv1 and 230dv2 may be arranged in the first direction DR1 so as to be spaced apart from each other.

The description given above with reference to FIGS. 11A to 12 or the description given above with reference to FIGS. 13A to 14 may be identically applied to a second touch sensing electrode 220.

As illustrated in FIG. 16, the sensor layer 200 (refer to FIG. 5) according to an embodiment may further include floating patterns FLP. Alternatively, as illustrated in FIG. 17, the sensor layer 200 (refer to FIG. 5) according to an embodiment may further include ground patterns GDP.

Figure 18A:
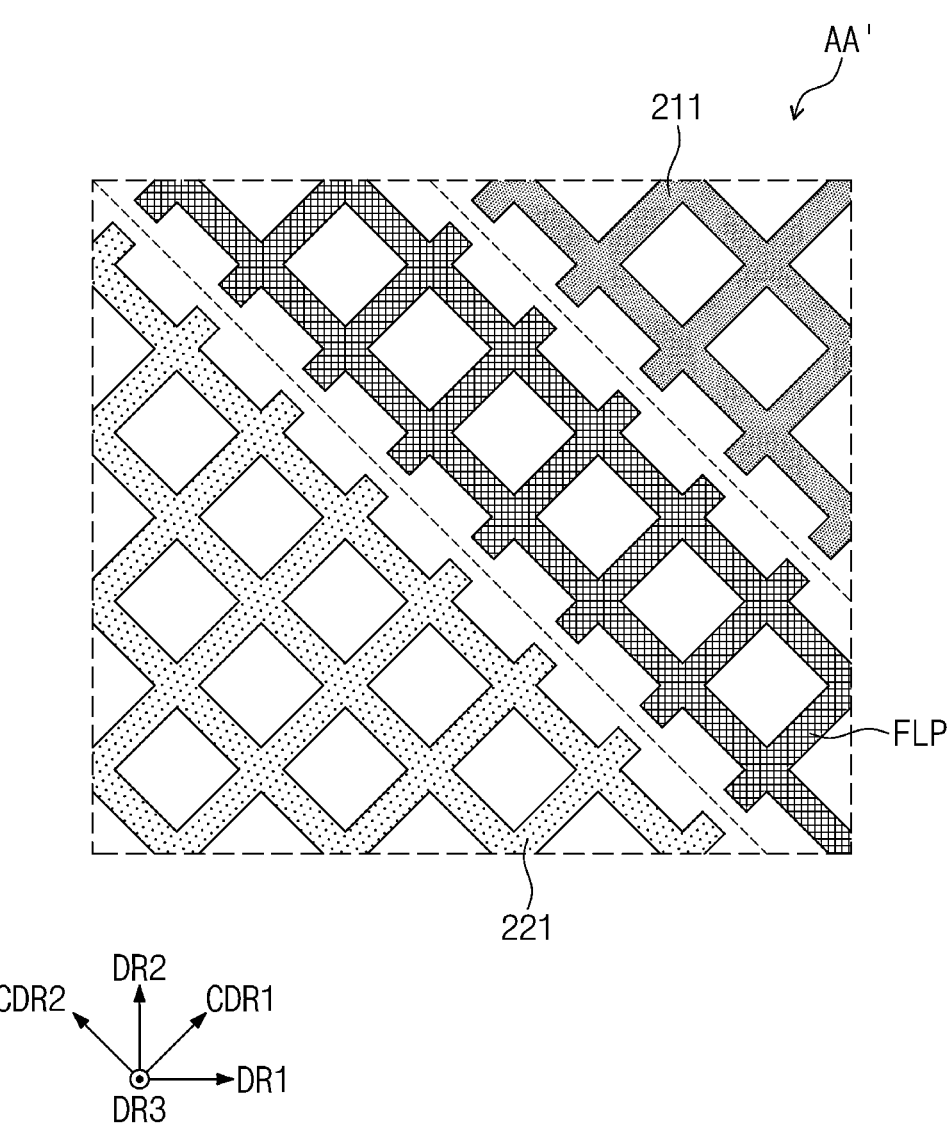
FIG. 18A is an enlarged plan view of area AA' illustrated in FIG. 11A.
Figure 18B:
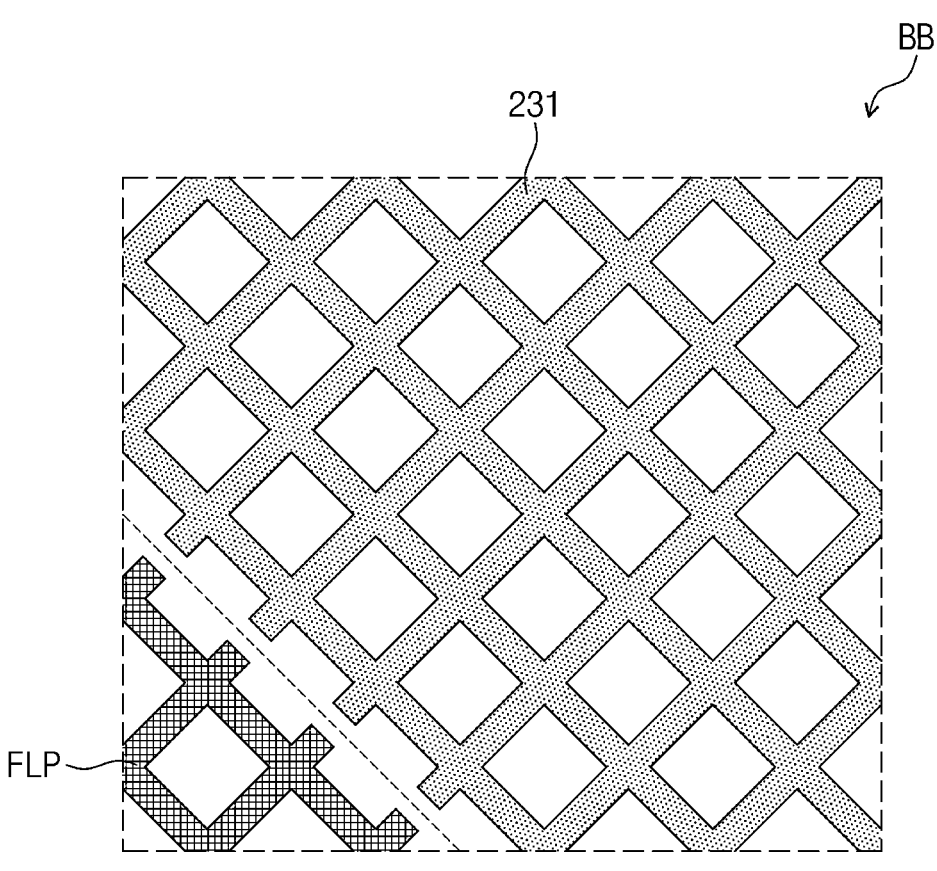
FIG. 18B is an enlarged plan view of area BB' illustrated in FIG. 11B.
Figure 18B:
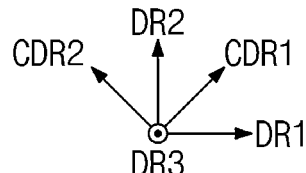

FIG. 18A is an enlarged plan view of area AA' illustrated in FIG. 11A. FIG. 18B is an enlarged plan view of area BB' illustrated in FIG. 11B.

Referring to FIGS. 11A, 11B, 18A, and 18B, in an embodiment, the first touch sensing electrode 210, the second touch sensing electrode 220, the first pen sensing electrode 230, and the floating patterns FLP may each have a mesh structure. The mesh structure may include a plurality of mesh lines. The plurality of mesh lines may have straight-line shapes extending in certain directions and may be connected together. Openings in which a mesh structure is not disposed may be defined (or, provided or formed) in each of the first touch sensing electrode 210, the second touch sensing electrode 220, the first pen sensing electrode 230, and the floating patterns FLP. Although FIGS. 18A and 18B illustrate an example that the first sensing portion 211 of the first touch sensing electrode 210, the second sensing portion 221 of the second touch sensing electrode 220, and the third sensing portion 231 of the first pen sensing electrode 230 have a mesh structure, the first bridge portion 212, the second bridge portion 222, and the third bridge portion 232 may also have a mesh structure.

FIGS. 18A and 18B illustrate an example that the mesh structure includes mesh lines extending in the first diagonal direction CDR1 that crosses the first direction DR1 and the second direction DR2 and mesh lines extending in the second diagonal direction CDR2 that crosses the first diagonal direction CDR1. However, the extension directions of the mesh lines constituting the mesh structure are not necessarily limited to those illustrated in FIGS. 18A and 18B. For example, the mesh structure may include mesh lines extending in the first direction DR1 and the second direction DR2, or may include mesh lines extending in the first direction DR1, the second direction DR2, the first diagonal direction CDR1, and the second diagonal direction CDR2. For example, the mesh structure may be modified in various forms.

However, embodiments are not necessarily limited thereto, and the first touch sensing electrode 210, the second touch sensing electrode 220, the first pen sensing electrode 230, and the floating patterns FLP may each be provided in a solid form in which openings are not defined (or, provided or formed).

Figure 19A:
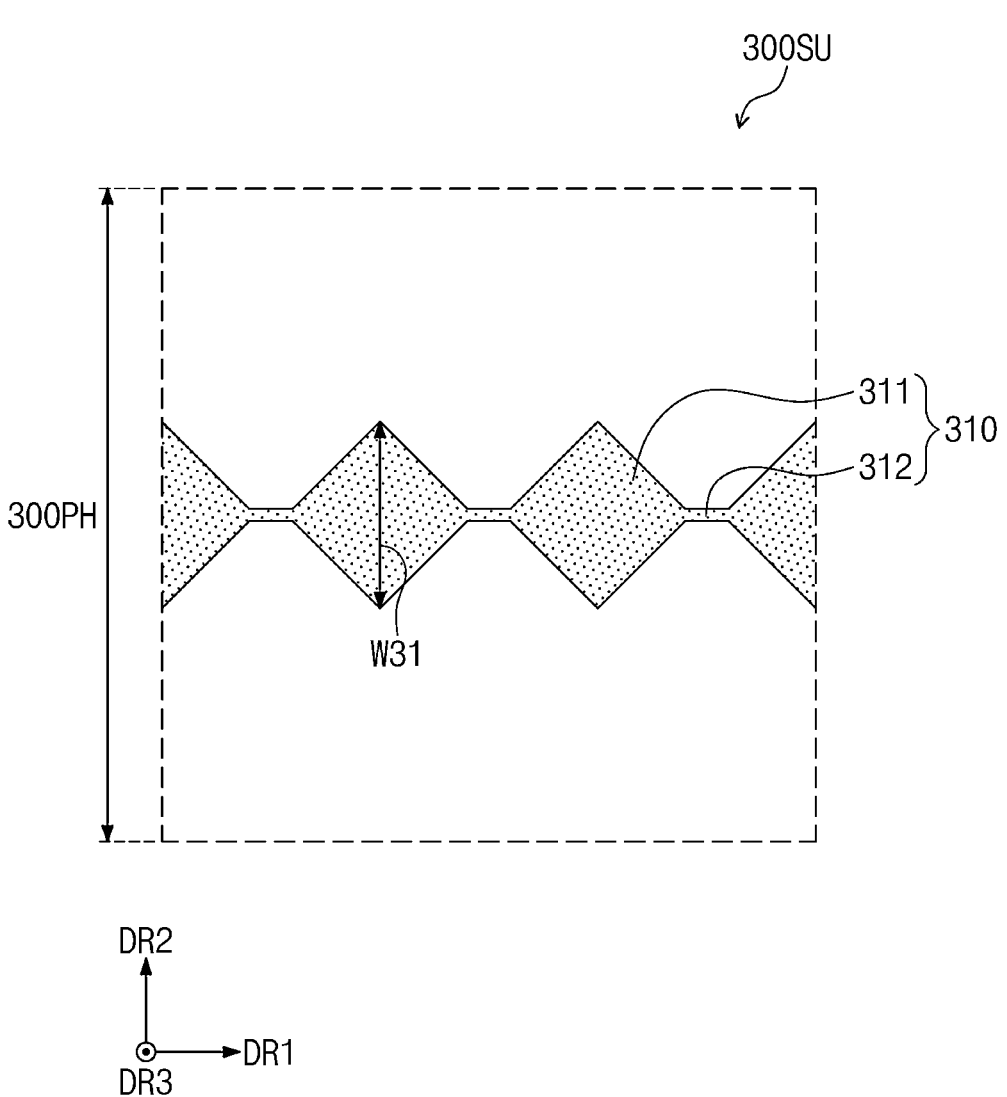
FIGS. 19A and 19B are plan views illustrating one sensing unit in the lower conductive layer according to an embodiment of the present disclosure.
Figure 19B:
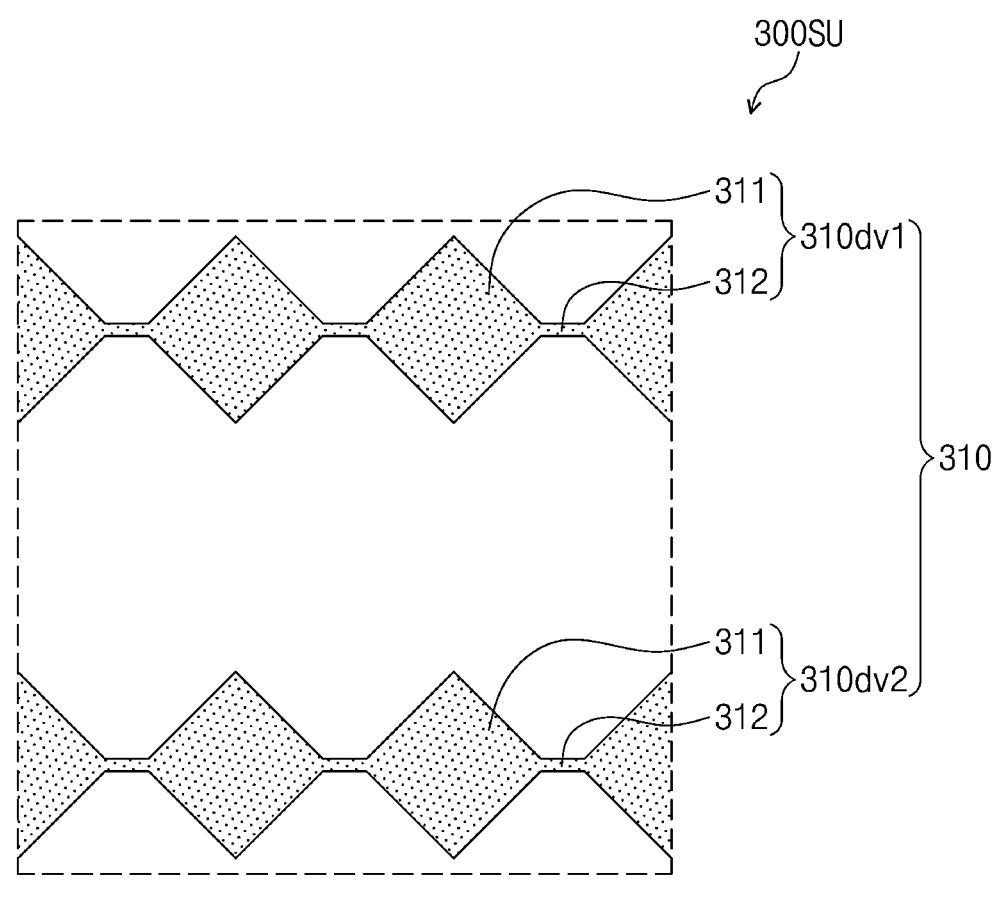
Figure 19B:
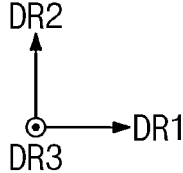

FIGS. 19A and 19B are plan views illustrating one sensing unit 300SU in the lower conductive layer 300 (refer to FIGS. 4A to 4D) according to an embodiment of the present disclosure.

Referring to FIG. 19A, in an embodiment, the lower conductive layer 300 (refer to FIGS. 4A to 4D) may include a second pen sensing electrode 310. In an embodiment, the second pen sensing electrode 310 might not include separate divided electrodes in the one sensing unit 300SU and may be disposed as one electrode. The one electrode may be disposed in a central portion of the sensing unit 300SU. The second pen sensing electrode 310 may include two portions having different shapes. The second pen sensing electrode 310 may include fourth sensing portions 311 and fourth bridge portions 312. Portions having a relatively large area may be defined as the fourth sensing portions 311, and portions having a relatively small area may be defined as the fourth bridge portions 312. The fourth sensing portions 311 may alternate with the fourth bridge portions 312 in the first direction DR1.

In an embodiment, the fourth sensing portions 311 and the fourth bridge portions 312 included in the second pen sensing electrode 310 may have a single-body shape. In an embodiment, the fourth sensing portions 311 may have a rhombic shape. The fourth bridge portions 312 may connect the fourth sensing portions 311 adjacent to each other and may have a bar shape extending in the first direction DR1.

In the one sensing unit 300SU, the second pen sensing electrode 310 may include four fourth sensing portions 311 and three fourth bridge portions 312. Among the four fourth sensing portions 311, two fourth sensing portions 311 may include an entire area of a rhombic shape, and the remaining two fourth sensing portions 311 may include a partial area corresponding to half of a rhombic shape (e.g., a half-rhombic shape). The total area of the fourth sensing portions 311 included in the second pen sensing electrode 310 in the one sensing unit 300SU may be equal to the sum of the areas of three fourth sensing portions 311 having a rhombic shape.

Referring to FIG. 19B, in an embodiment, the lower conductive layer 300 (refer to FIGS. 4A to 4D) may include the second pen sensing electrode 310. In an embodiment, the second pen sensing electrode 310 may include two second divided pen electrodes 310$dv$1 and 310$dv$2 in the one sensing unit 300SU. The two second divided pen electrodes 310$dv$1 and 310$dv$2 may be disposed in an upper edge portion and a lower edge portion of the sensing unit 300SU, respectively. Each of the second divided pen electrodes 310$dv$1 and 310$dv$2 may include fourth sensing portions 311 and fourth bridge portions 312.

Referring to FIGS. 11A and 19A, in an embodiment, the pitch 300PH of sensing units 300SU of the lower conductive layer 300 may range from "the pitch 200PH of the sensing units 200SU of the sensor layer 200 minus 10% of the pitch 200PH of the sensing units 200SU of the sensor layer 200" to "the pitch 200PH of the sensing units 200SU of the sensor layer 200 plus 10% of the pitch 200PH of the sensing units 200SU of the sensor layer 200". Accordingly, profile changes in the first direction DR1 and the second direction DR2 may be relatively the same during pen drawing, and pen linearity may be increased. For example, the pitch 300PH of the sensing units 300SU of the lower conductive layer 300 may be substantially the same as the pitch 200PH of the sensing units 200SU of the sensor layer 200.

Alternatively, in an embodiment of the present disclosure, the pitch 300PH of the sensing units 300SU of the lower conductive layer 300 may be an integer multiple of the pitch 200PH of the sensing units 200SU of the sensor layer 200. In another case, in an embodiment of the present disclosure, the pitch 200PH of the sensing units 200SU of the sensor layer 200 may be an integer multiple of the pitch 300PH of the sensing units 300SU of the lower conductive layer 300.

Figure 20A:
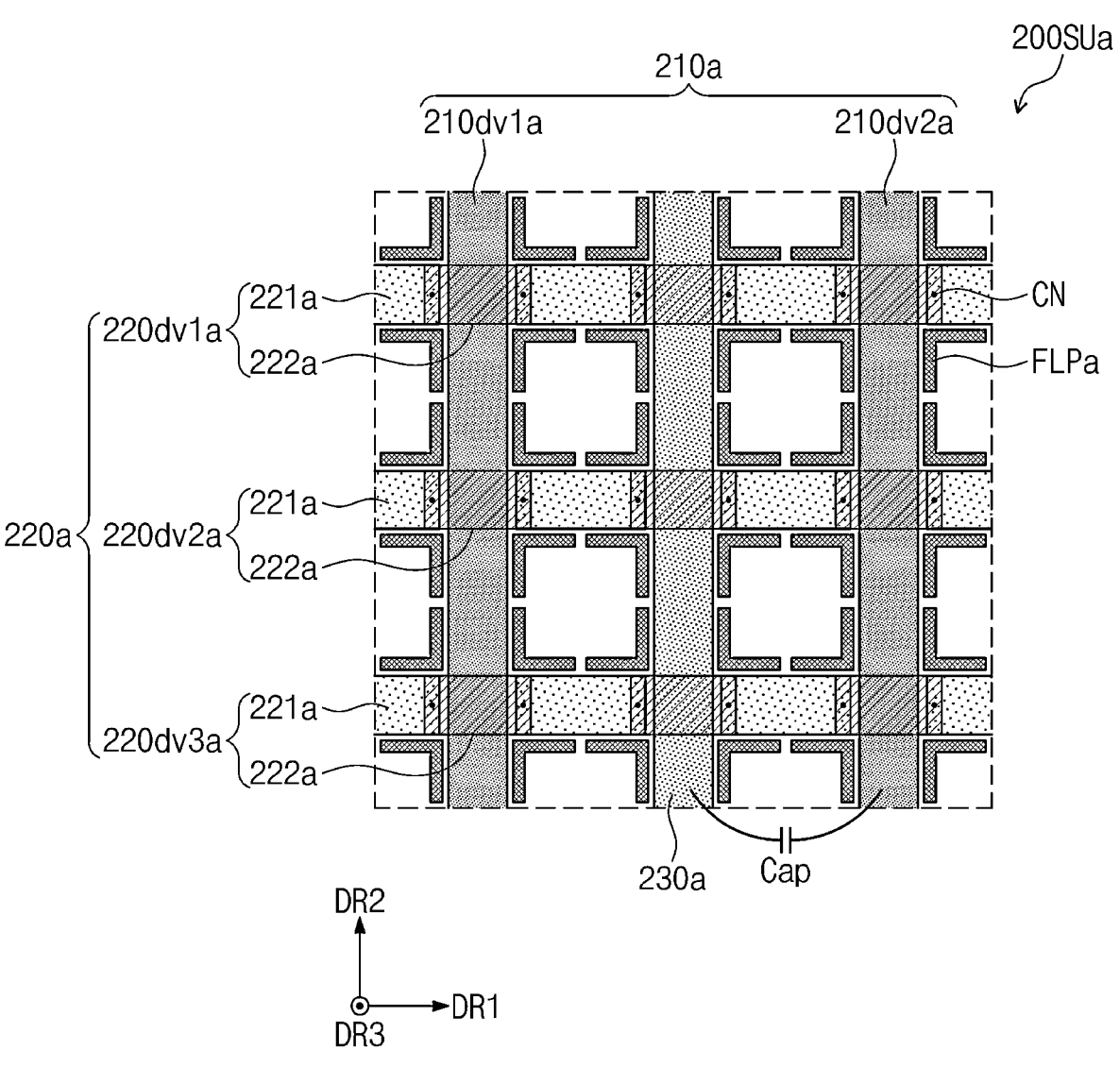
FIG. 20A is an enlarged plan view illustrating one sensing unit in the sensor layer according to an embodiment of the present disclosure.
Figure 20B:
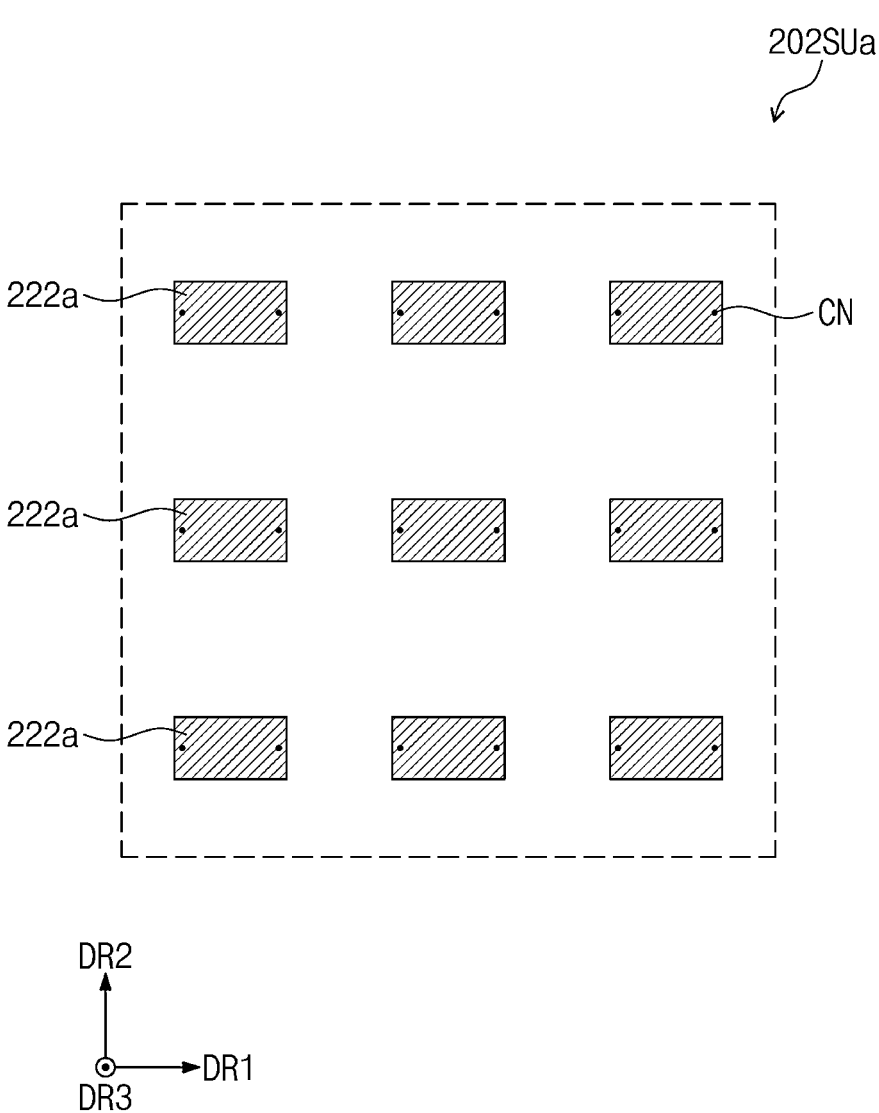
FIG. 20B is a plan view illustrating a first conductive layer of the sensing unit according to an embodiment of the present disclosure.
Figure 20C:
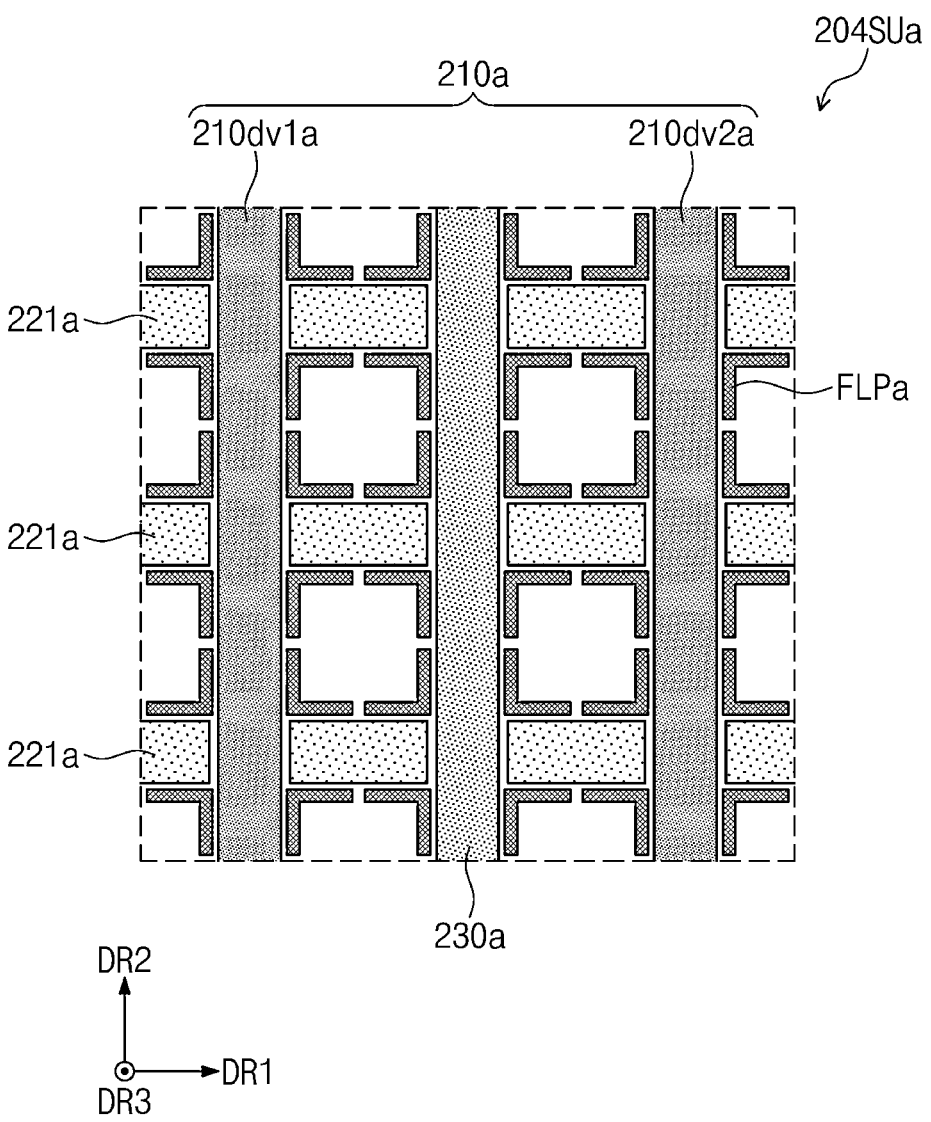
FIG. 20C is a plan view illustrating a second conductive layer of the sensing unit according to an embodiment of the present disclosure.

FIG. 20A is an enlarged plan view illustrating one sensing unit 200SUa in the sensor layer 200 (refer to FIG. 5) according to an embodiment of the present disclosure. FIG. 20B is a plan view illustrating a first conductive layer 202SUa of the sensing unit 200SUa according to an embodiment of the present disclosure. FIG. 20C is a plan view illustrating a second conductive layer 204SUa of the sensing unit 200SUa according to an embodiment of the present disclosure.

Referring to FIGS. 20A to 20C, the sensor layer 200 (refer to FIG. 5) may include a first touch sensing electrode 210$a$, a second touch sensing electrode 220$a$, and a first pen sensing electrode 230$a$.

In an embodiment, the first touch sensing electrode 210$a$ may include two first divided touch electrodes 210$dv$1$a$ and 210$dv$2$a$ in the one sensing unit 200SUa. Each of the first divided touch electrodes 210$dv$1$a$ and 210$dv$2$a$ may have a bar shape that has a substantially constant width in the first direction DR1. For example, each of the first divided touch electrodes 210$dv$1$a$ and 210$dv$2$a$ might not include portions having different shapes.

In an embodiment, the second touch sensing electrode 220$a$ may include three second divided touch electrodes 220$dv$1$a$, 220$dv$2$a$, and 220$dv$3$a$ in the one sensing unit 200SUa. Each of the second divided touch electrodes 220$dv$1$a$, 220$dv$2$a$, and 220$dv$3$a$ may include second sensing portions 221$a$ and second bridge portions 222$a$ disposed on different layers. The second sensing portions 221$a$ may alternate with the second bridge portions 222$a$ in the first direction DR1. The second sensing portions 221$a$ and the second bridge portions 222$a$ may each have a bar shape that has a substantially constant with in the second direction DR2. The second sensing portions 221$a$ adjacent to each other and the second bridge portion 222$a$ connecting the adjacent second sensing portions 221$a$ may be connected through a contact hole CN. The second sensing portions 221$a$ and the second bridge portions 222$a$ may be referred to as second sensing patterns and second bridge patterns, respectively.

In an embodiment, the first pen sensing electrode 230$a$ might not include separate divided electrodes in the one sensing unit 200SUa and may be disposed as one electrode. The first pen sensing electrode 230$a$ may have a bar shape that has a substantially constant width in the first direction DR1. For example, the first pen sensing electrode 230$a$ might not include portions having different shapes.

The second bridge portions 222$a$ of the second divided touch electrodes 220$dv$1$a$, 220$dv$2$a$, and 220$dv$3$a$ may be included in the first conductive layer 202SUa. The first divided touch electrodes 210$dv$1$a$ and 210$dv$2$a$ and the second sensing portions 221$a$ of the second divided touch electrodes 220$dv$1$a$, 220$dv$2$a$, and 220$dv$3$a$, and the first pen sensing electrode 230$a$ may be included in the second conductive layer 204SUa. However, embodiments are not necessarily limited thereto. The second bridge portions 222$a$ of the second divided touch electrodes 220$dv$1$a$, 220$dv$2$a$, and 220$dv$3$a$ may be included in the second conductive layer 204SUa, and the first divided touch electrodes 210$dv$1$a$ and 210$dv$2$a$, the second sensing portions 221$a$ of the second divided touch electrodes 220$dv$1$a$, 220$dv$2$a$, and 220$dv$3$a$, and the first pen sensing electrode 230$a$ may be included in the first conductive layer 202SUa.

The first divided touch electrodes 210$dv$1$a$ and 210$dv$2$a$ and the second divided touch electrodes 220$dv$1$a$, 220$dv$2$a$, and 220$dv$3$a$ may cross each other at the second bridge portions 222$a$. The first divided touch electrodes 210$dv$1$a$ and 210$dv$2$a$ and the second bridge portions 222$a$ may be disposed on different layers. The first divided touch electrodes 210$dv$1$a$ and 210$dv$2$a$ and the second bridge portions 222$a$ may be insulated from each other. The first pen sensing electrode 230$a$ and the second divided touch electrodes 220$dv$1$a$, 220$dv$2$a$, and 220$dv$3$a$ may cross each other at the second bridge portions 222$a$. The first pen sensing electrode 230$a$ and the second bridge portions 222$a$ may be disposed on different layers. The first pen sensing electrode 230$a$ and the second bridge portions 222$a$ may be insulated from each other.

In an embodiment, the sensor layer 200 (refer to FIG. 5) may further include floating patterns FLPa. The floating patterns FLPa may be disposed between the first touch sensing electrode 210*a* and the second touch sensing electrode 220*a* adjacent to each other in the first direction DR1 in a plan view and may be disposed between the second bridge portions 222*a* adjacent to each other in the second direction DR2 in a plan view. The floating patterns FLPa may extend in the first direction DR1 or the second direction DR2.

Figure 21A:
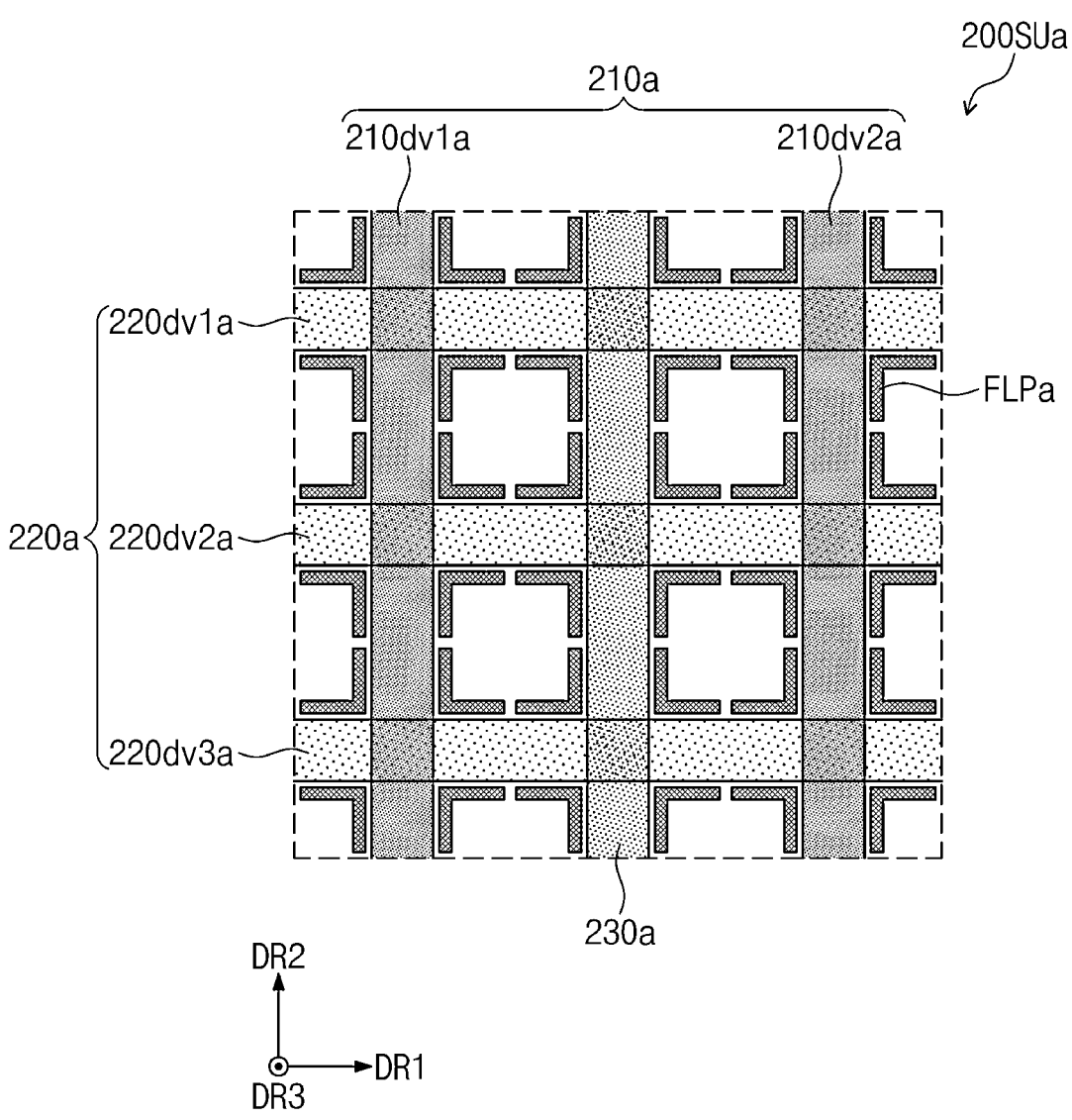
FIG. 21A is an enlarged plan view illustrating one sensing unit in the sensor layer according to an embodiment of the present disclosure.
Figure 21B:
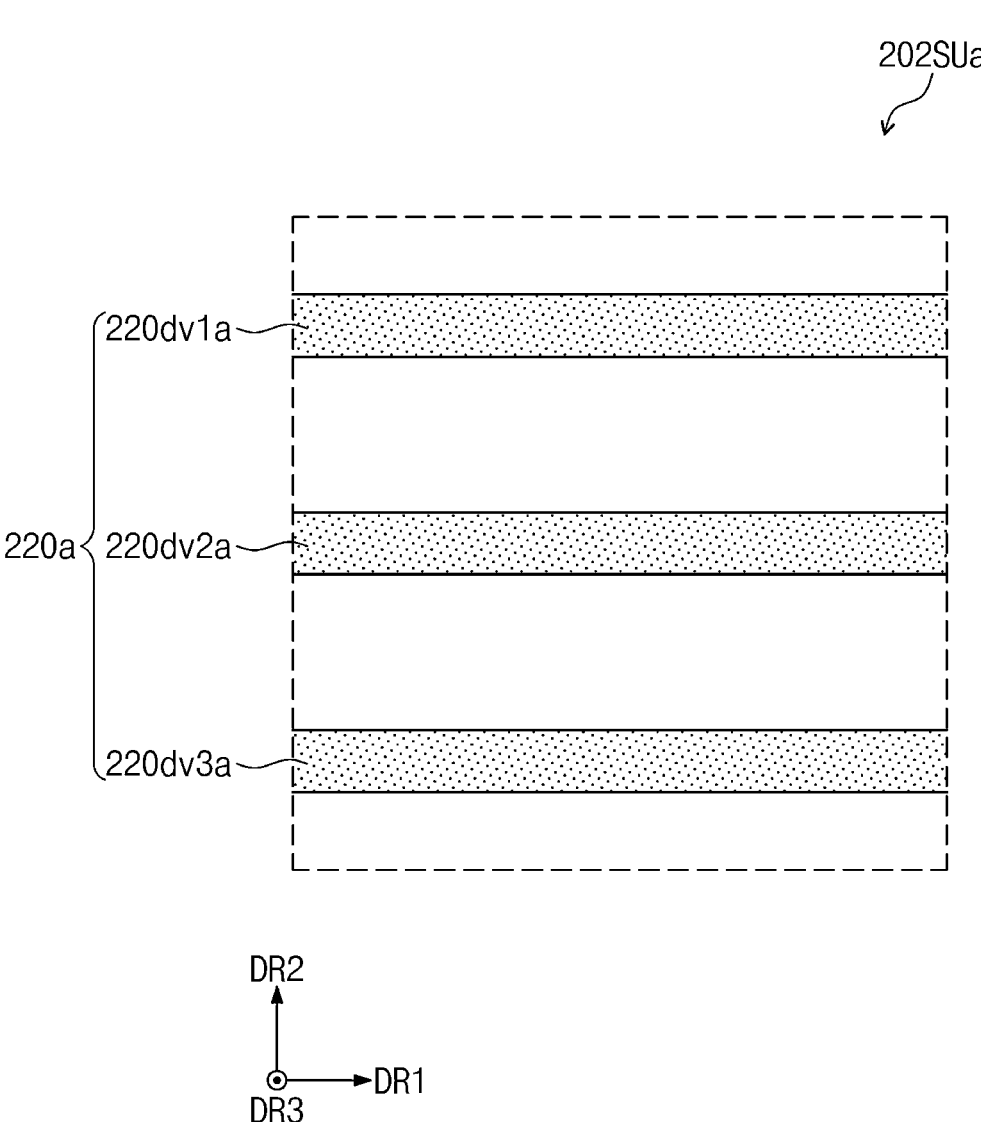
FIG. 21B is a plan view illustrating a first conductive layer of the sensing unit according to an embodiment of the present disclosure.
Figure 21C:
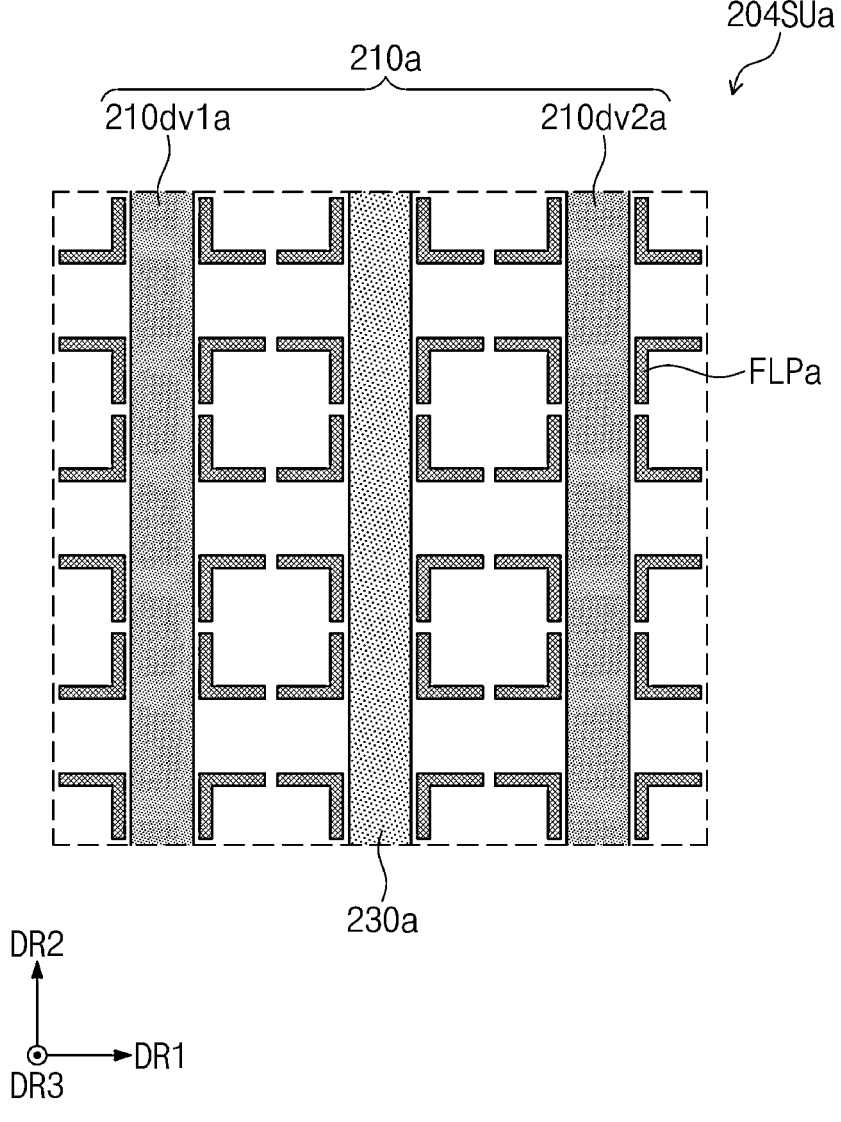
FIG. 21C is a plan view illustrating a second conductive layer of the sensing unit according to an embodiment of the present disclosure.

FIG. 21A is an enlarged plan view illustrating one sensing unit 200SUa in the sensor layer 200 (refer to FIG. 5) according to an embodiment of the present disclosure. FIG. 21B is a plan view illustrating a first conductive layer 202SUa of the sensing unit 200SUa according to an embodiment of the present disclosure. FIG. 21C is a plan view illustrating a second conductive layer 204SUa of the sensing unit 200SUa according to an embodiment of the present disclosure.

Referring to FIGS. 21A to 21C, in an embodiment, a second touch sensing electrode 220*a* may include three second divided touch electrodes 220*dv*1*a*, 220*dv*2*a*, and 220*dv*3*a* in the one sensing unit 200SUa. Each of the second divided touch electrodes 220*dv*1*a*, 220*dv*2*a*, and 220*dv*3*a* may have a bar shape that has a substantially constant width in the second direction DR2. For example, each of the second divided touch electrodes 220*dv*1*a*, 220*dv*2*a*, and 220*dv*3*a* might not include portions having different shapes.

Each of the second divided touch electrodes 220*dv*1*a*, 220*dv*2*a*, and 220*dv*3*a* may be included in the first conductive layer 202SUa. First divided touch electrodes 210*dv*1*a* and 210*dv*2*a* and a first pen sensing electrode 230*a* may be disposed in the second conductive layer 204SUa, and the second divided touch electrodes 220*dv*1*a*, 220*dv*2*a*, and 220*dv*3*a* may all be disposed on a layer different from the layer on which the first divided touch electrodes 210*dv*1*a* and 210*dv*2*a* and the first pen sensing electrode 230*a* are disposed.

Figure 22:
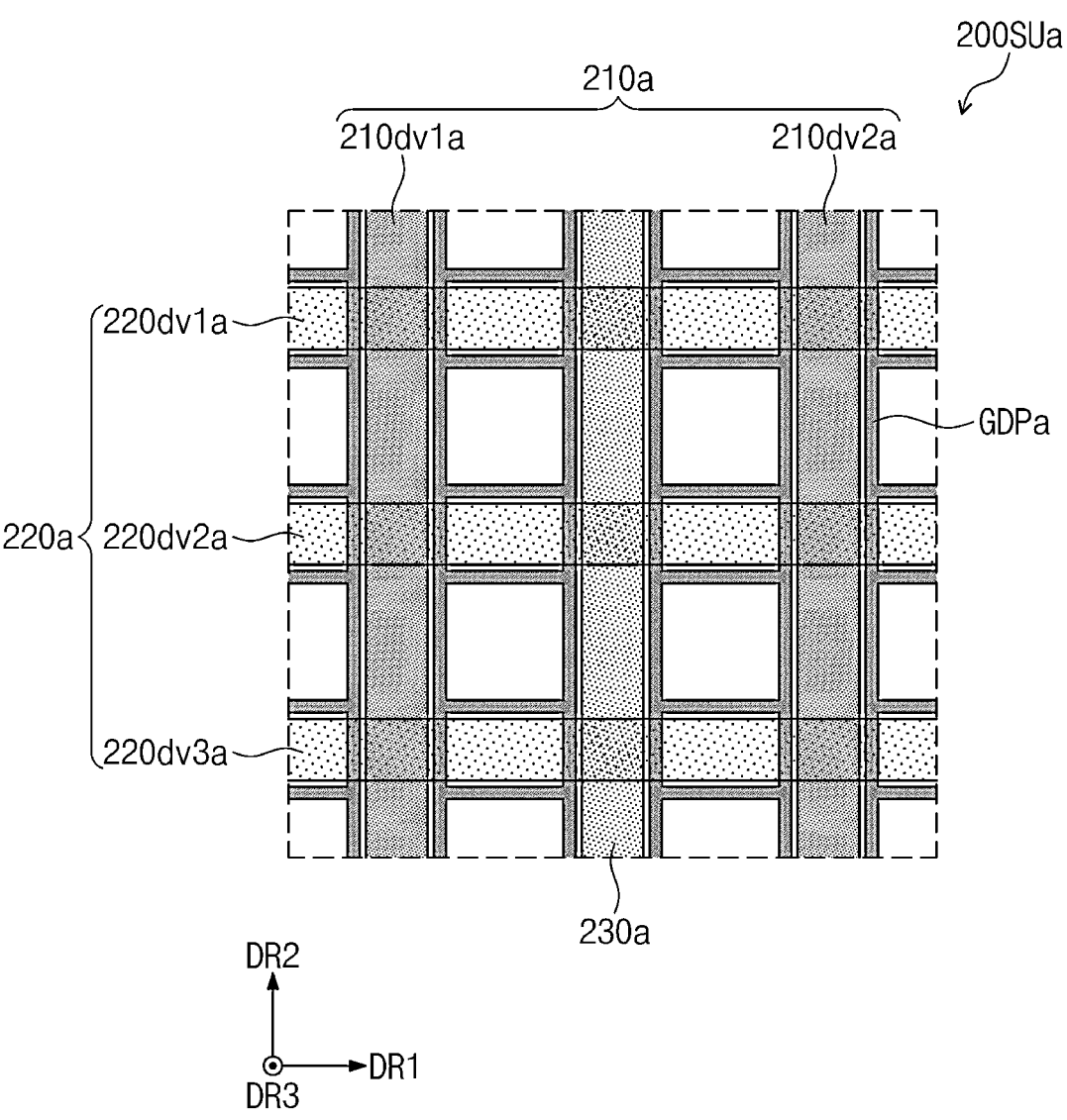
FIG. 22 is an enlarged plan view illustrating one sensing unit in the sensor layer according to an embodiment of the present disclosure.

FIG. 22 is an enlarged plan view illustrating one sensing unit 200SUa in the sensor layer 200 (refer to FIG. 5) according to an embodiment of the present disclosure.

Referring to FIG. 22, the sensor layer 200 (refer to FIG. 5) may include a first touch sensing electrode 210*a*, a second touch sensing electrode 220*a*, and a first pen sensing electrode 230*a*. The description given above with reference to FIGS. 20A to 20C or the description given above with reference to FIGS. 21A to 21C may be identically applied to the first touch sensing electrode 210*a*, the second touch sensing electrode 220*a*, and the first pen sensing electrode 230*a*.

In an embodiment, the sensor layer 200 (refer to FIG. 5) may further include ground patterns GDPa. Each of the ground patterns GDPa may be grounded. For example, each of the ground patterns GDPa may be regarded as being grounded. The ground patterns GDPa may be disposed between the first touch sensing electrode 210*a* (or the first divided touch electrodes 210*dv*1*a* and 210*dv*2*a*) and the second touch sensing electrode 220*a* adjacent to each other in the first direction DR1 in a plan view and may be disposed between the second touch sensing electrodes 220*a* (or the second divided touch electrodes 220*dv*1*a*, 220*dv*2*a*, and 220*dv*3*a*) adjacent to each other in the second direction DR2 in a plan view. Some of the ground patterns GDPa may extend in the second direction DR2 along the edges of first divided touch electrodes 210*dv*1*a* and 210*dv*2*a*, other ground patterns GDPa may extend in the second direction DR2 along the edge of the first pen sensing electrode 230*a*, and the other ground patterns GDPa may extend in the first direction DR1 along portions of the edges of second divided touch electrodes 220*dv*1*a*, 220*dv*2*a*, and 220*dv*3*a*. The ground patterns GDPa may be disposed on the same layer as the first touch sensing electrode 210*a* and the first pen sensing electrode 230*a*. For example, the ground patterns GDPa may be included in a second conductive layer 204SUa.

Figure 23:
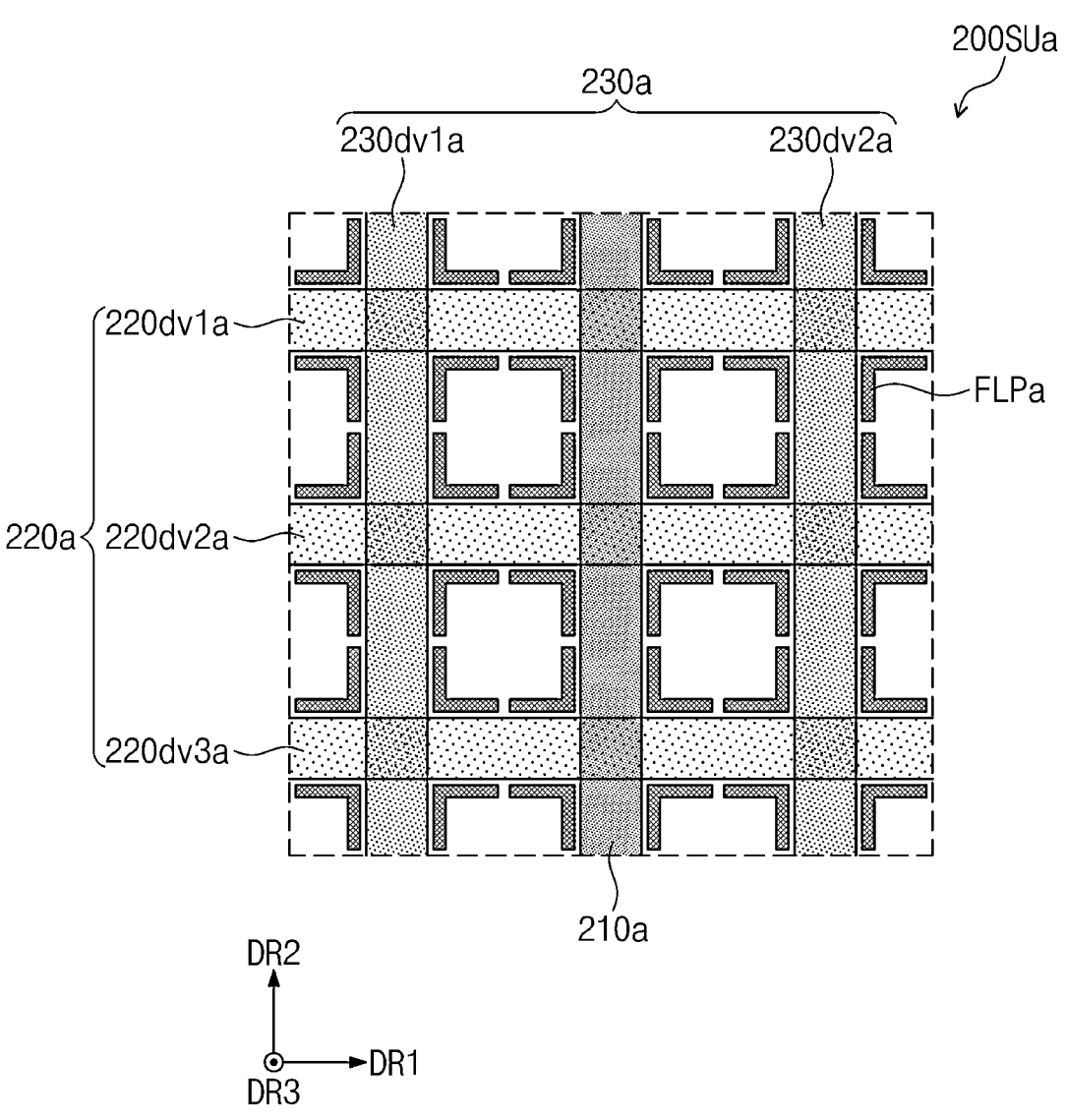
FIG. 23 is an enlarged plan view illustrating one sensing unit in the sensor layer according to an embodiment of the present disclosure.
Figure 24:
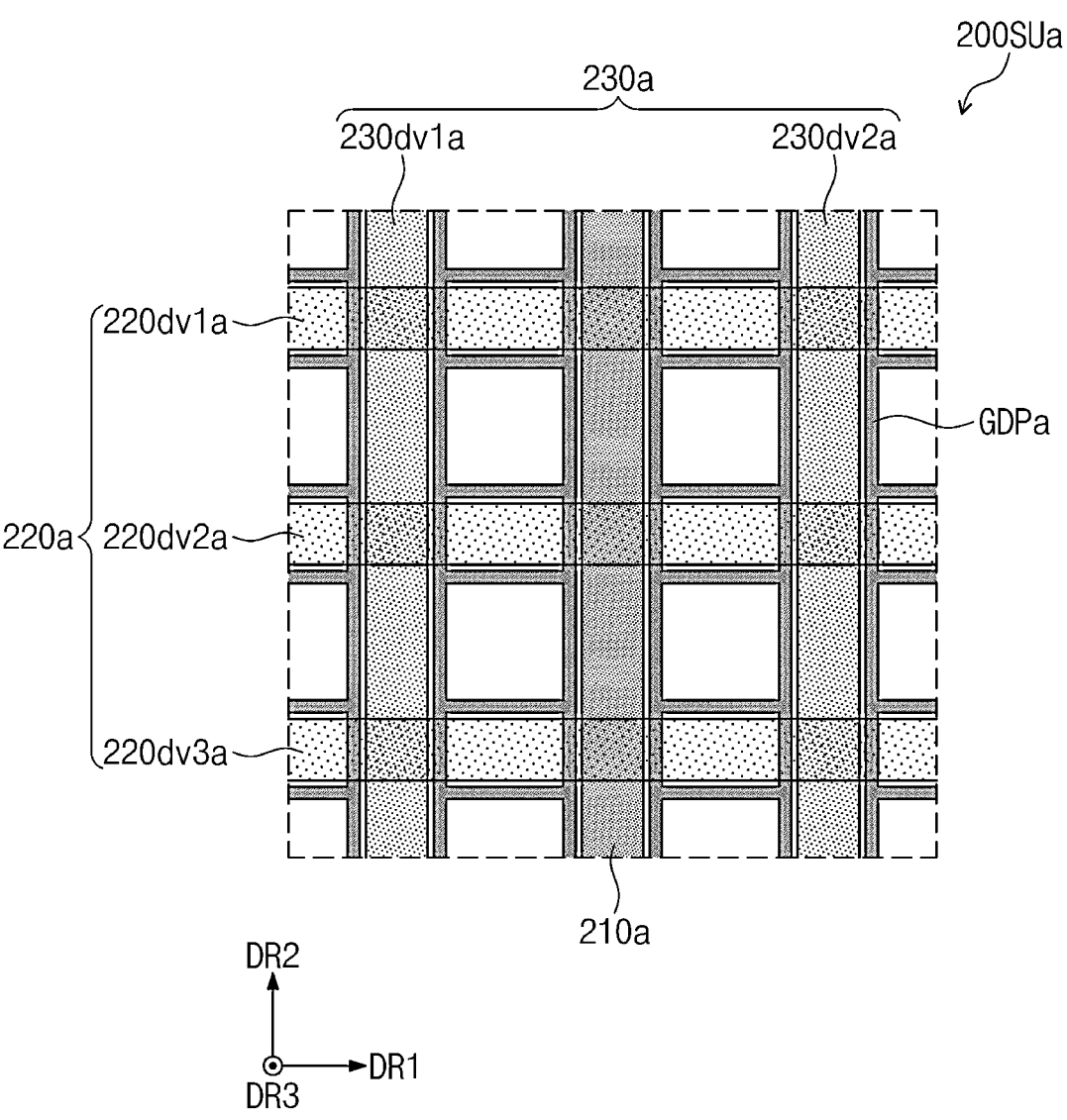
FIG. 24 is an enlarged plan view illustrating one sensing unit in the sensor layer according to an embodiment of the present disclosure.

FIG. 23 is an enlarged plan view illustrating one sensing unit 200SUa in the sensor layer 200 (refer to FIG. 5) according to an embodiment of the present disclosure. FIG. 24 is an enlarged plan view illustrating one sensing unit 200SUa in the sensor layer 200 (refer to FIG. 5) according to an embodiment of the present disclosure.

Referring to FIGS. 23 and 24, in an embodiment, a first touch sensing electrode 210*a* might not include separate divided electrodes in the one sensing unit 200SUa and may be disposed as one electrode. The first touch sensing electrode 210*a* may have a bar shape that has a substantially constant width in the first direction DR1. For example, the first touch sensing electrode 210*a* might not include portions having different shapes. A first pen sensing electrode 230*a* may include two first divided pen electrodes 230*dv*1*a* and 230*dv*2*a* in the one sensing unit 200SUa. Each of the first divided pen electrodes 230*dv*1*a* and 230*dv*2*a* may have a bar shape that has a substantially constant width in the first direction DR1. For example, each of the first divided pen electrodes 230*dv*1*a* and 230*dv*2*a* might not include portions having different shapes. In the one sensing unit 200SUa, the first touch sensing electrode 210*a* may be disposed between the two first divided pen electrodes 230*dv*1*a* and 230*dv*2*a*.

The description given above with reference to FIGS. 20A to 20C or the description given above with reference to FIGS. 21A to 21C may be identically applied to a second touch sensing electrode 220*a*.

As illustrated in FIG. 23, the sensor layer 200 (refer to FIG. 5) according to an embodiment may further include floating patterns FLPa. Alternatively, as illustrated in FIG. 24, the sensor layer 200 (refer to FIG. 5) according to an embodiment may further include ground patterns GDPa.

Figure 25A:
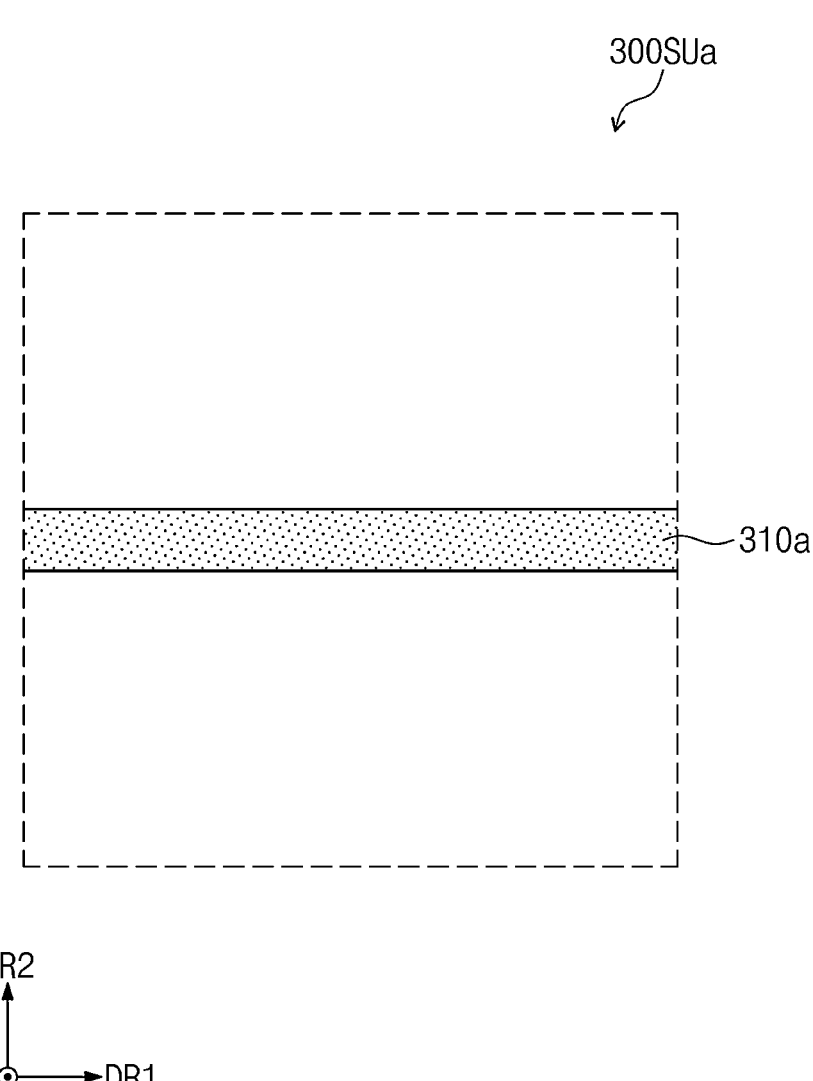
FIGS. 25A and 25B are plan views illustrating one sensing unit in the lower conductive layer according to an embodiment of the present disclosure.
Figure 25B:
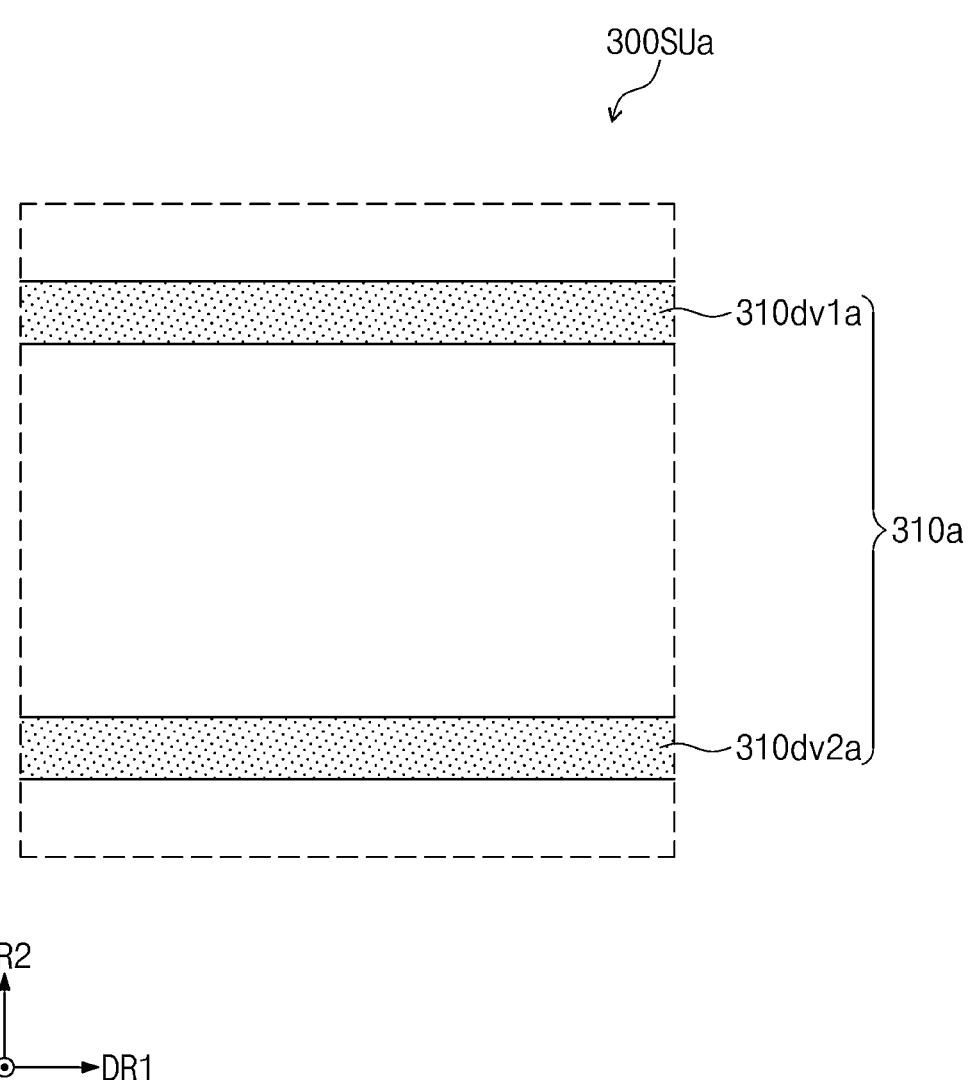

FIGS. 25A and 25B are plan views illustrating one sensing unit 300SUa in the lower conductive layer 300 (refer to FIGS. 4A to 4D) according to an embodiment of the present disclosure.

Referring to FIG. 25A, in an embodiment, the lower conductive layer 300 (refer to FIGS. 4A to 4D) may include a second pen sensing electrode 310*a*. In an embodiment, the second pen sensing electrode 310*a* might not include separate divided electrodes in the one sensing unit 300SUa and may be disposed as one electrode. The one electrode may be disposed in a central portion of the sensing unit 300SUa. The second pen sensing electrode 310*a* may have a bar shape that has a substantially constant width in the first direction DR1. For example, the second pen sensing electrode 310*a* might not include portions having different shapes.

Referring to FIG. 25B, in an embodiment, the lower conductive layer 300 (refer to FIGS. 4A to 4D) may include the second pen sensing electrode 310*a*. In an embodiment, the second pen sensing electrode 310*a* may include two second divided pen electrodes 310*dv*1*a* and 310*dv*2*a* in the one sensing unit 300SUa. The two second divided pen electrodes 310*dv*1*a* and 310*dv*2*a* may be disposed in an upper edge portion and a lower edge portion of the sensing unit 300SUa, respectively. Each of the second divided pen electrodes 310*dv*1*a* and 310*dv*2*a* may have a bar shape that has a substantially constant width in the first direction DR1. For example, each of the second divided pen electrodes 310*dv*1*a* and 310*dv*2*a* might not include portions having different shapes.

Figure 26:
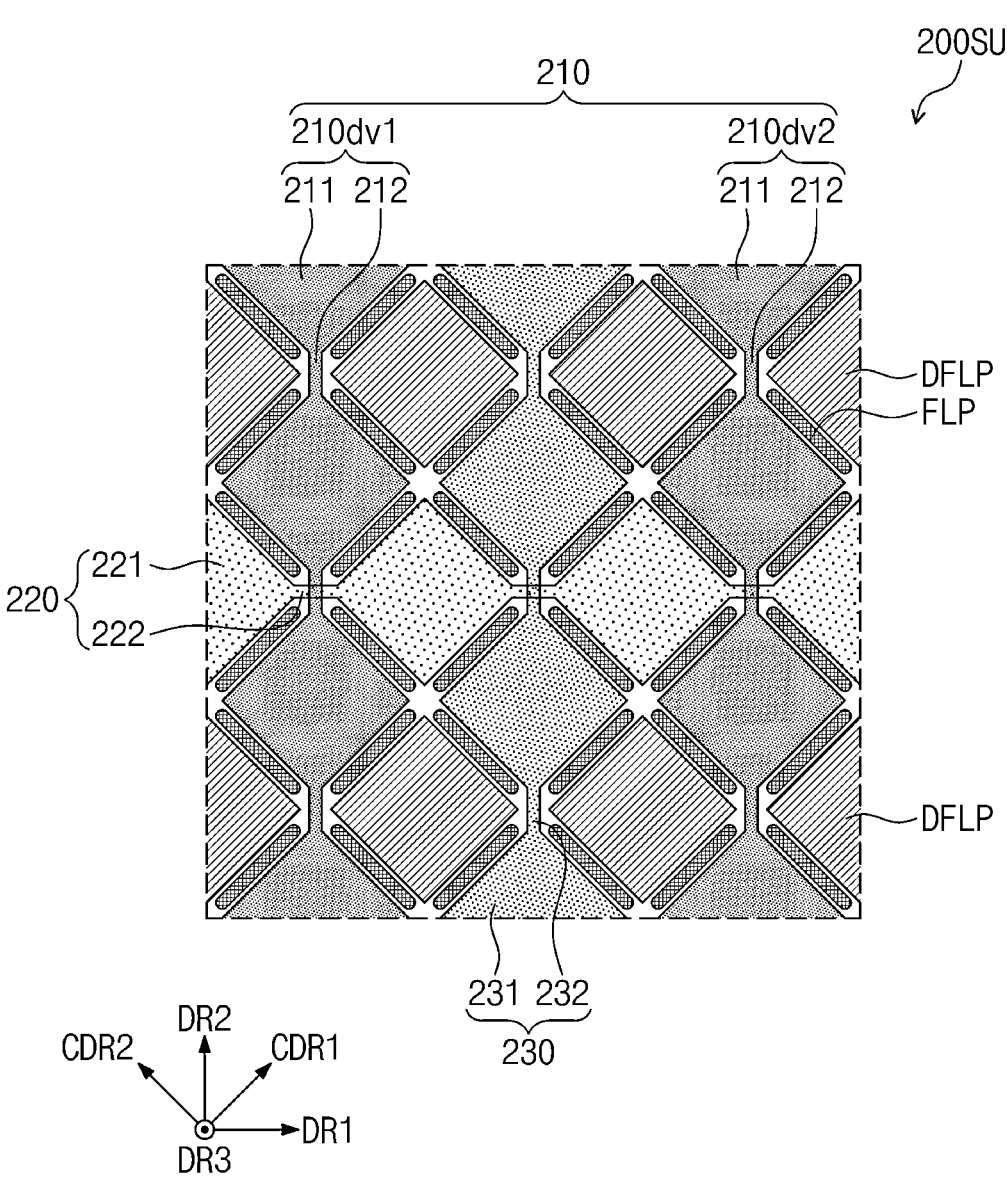
FIG. 26 is an enlarged plan view illustrating one sensing unit in the sensor layer according to an embodiment of the present disclosure.

FIG. 26 is an enlarged plan view illustrating one sensing unit 200SU in the sensor layer 200 (refer to FIG. 5) according to an embodiment of the present disclosure.

Referring to FIG. 26, in an embodiment, a first touch sensing electrode 210 may include two first divided touch electrodes 210*dv*1 and 210*dv*2 in the one sensing unit 200SU. A first pen sensing electrode 230 might not include separate divided electrodes in the one sensing unit 200SU and may be disposed as one electrode.

A second touch sensing electrode 220 might not include separate divided electrodes in the one sensing unit 200SU and may be disposed as one electrode. The second touch sensing electrode 220 may include two portions having different shapes. The second touch sensing electrode 220 may include second sensing portions 221 and second bridge portions 222. Although FIG. 26 illustrates an example that the second sensing portions 221 and the second bridge portions 222 have a single-body shape, the present disclosure is not necessarily limited thereto. For example, the second sensing portions 221 and the second bridge portions 222 may be disposed on different layers and may be connected with each other through a contact hole CN.

In an embodiment of the present disclosure, the sensor layer 200 (refer to FIG. 5) may further include floating patterns FLP and dummy patterns DFLP. Each of the floating patterns FLP may be electrically floated. Each of the dummy patterns DFLP may be electrically floated. However, without necessarily being limited thereto, each of the dummy patterns DFLP may be grounded.

The dummy patterns DFLP may be arranged in the first direction DR1 so as to be spaced apart from each other. Some of the dummy patterns DFLP may be spaced apart from the second touch sensing electrode 220 in the second direction DR2, and the other dummy patterns DFLP may be spaced apart from the second touch sensing electrode 220 in the direction opposite to the second direction DR2. Each of the dummy patterns DFLP may have a rhombic shape. In the one sensing unit 200SU, four dummy patterns DFLP may be spaced apart from the second touch sensing electrode 220 in the second direction DR2. Among the four dummy patterns DFLP, two dummy patterns DFLP may include an entire area of a rhombic shape, and the remaining two dummy patterns DFLP may include a partial area corresponding to half of a rhombic shape (e.g., a half-rhombic shape). Four other dummy patterns DFLP may be spaced apart from the second touch sensing electrode 220 in the direction opposite to the second direction DR2. Among the four other dummy patterns DFLP, two dummy patterns DFLP may include an entire area of a rhombic shape, and the remaining two dummy patterns DFLP may include a partial area corresponding to half of a rhombic shape (e.g., a half-rhombic shape).

The floating patterns FLP may be disposed between the first touch sensing electrode 210 and the second touch sensing electrode 220, between the first pen sensing electrode 230 and the second touch sensing electrode 220, between the first touch sensing electrode 210 and the dummy pattern DFLP, and between the first pen sensing electrode 230 and the dummy pattern DFLP adjacent to each other in the first diagonal direction CDR1 or the second diagonal direction CDR2 in a plan view. The floating patterns FLP may extend in the first diagonal direction CDR1 or the second diagonal direction CDR2.

Some of the second divided touch electrodes 220*dv*1, 220*dv*2, and 220*dv*3 (refer to FIG. 11A or 13A) included in the one second touch sensing electrode 220 in the embodiment described above with reference to FIG. 11A or 13A may be omitted, and the dummy patterns DFLP may be disposed in the areas where the some of the second divided touch electrodes 220*dv*1, 220*dv*2, and 220*dv*3 are omitted. The embodiment illustrated in FIG. 26 may be the same as the case in which in the embodiments described with reference to FIGS. 11A to 14, the two second divided touch electrodes 220*dv*1 and 220*dv*3 (refer to FIG. 11A or 13A) disposed in the upper and lower edge portions among the three second divided touch electrodes 220*dv*1, 220*dv*2, and 220*dv*3 (refer to FIG. 11A or 13A) are omitted and the dummy patterns DFLP are disposed to correspond to the second sensing portions 221 of the omitted two second divided touch electrodes 220*dv*1 and 220*dv*3 (refer to FIG. 11A or 13A). However, embodiments are not necessarily limited thereto. Some of the second divided touch electrodes 220*dv*1, 220*dv*2, and 220*dv*3 (refer to FIG. 11A or 13A) may be omitted, and separate electrodes might not be disposed in the areas where the some of the second divided touch electrodes 220*dv*1, 220*dv*2, and 220*dv*3 are omitted.

Referring to FIGS. 19B and 26, the second touch sensing electrode 220 and the second pen sensing electrode 310 may be disposed so as not to overlap each other. In an embodiment, the second touch sensing electrode 220 may be disposed in the central portion, one second divided pen electrode 310*dv*1 may be disposed in the upper edge portion, and the other second divided pen electrode 310*dv*2 may be disposed in the lower edge portion. Since the second touch sensing electrode 220 and the second pen sensing electrode 310 are disposed so as not to overlap each other, a coupling capacitor might not be defined between the second touch sensing electrode 220 and the second pen sensing electrode 310. Accordingly, leakage current in the pen sensing drive mode may be reduced, and the signal to noise ratio (SNR) may be increased. Thus, the electronic device with increased sensing sensitivity may be provided. However, embodiments are not necessarily limited thereto, and through a combination of FIGS. 19A and 26, the second touch sensing electrode 220 and the second pen sensing electrode 310 may be disposed to overlap each other.

Figure 27:
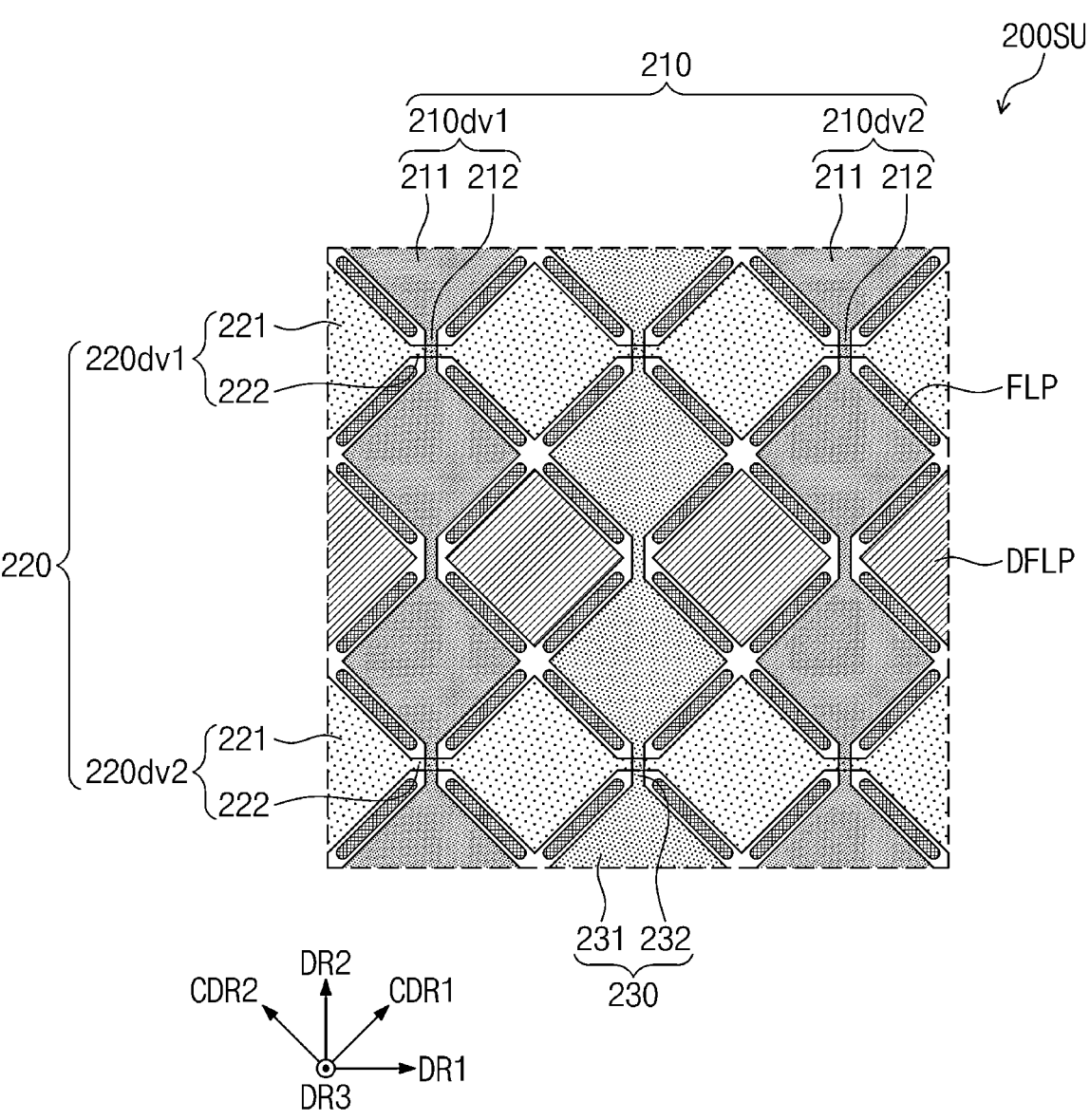
FIG. 27 is an enlarged plan view illustrating one sensing unit in the sensor layer according to an embodiment of the present disclosure.

FIG. 27 is an enlarged plan view illustrating one sensing unit 200SU in the sensor layer 200 (refer to FIG. 5) according to an embodiment of the present disclosure.

Referring to FIG. 27, in an embodiment, a first touch sensing electrode 210 may include two first divided touch electrodes 210*dv*1 and 210*dv*2 in the one sensing unit 200SU. A first pen sensing electrode 230 might not include separate divided electrodes in the one sensing unit 200SU and may be disposed as one electrode.

A second touch sensing electrode 220 may include two second divided touch electrodes 220*dv*1 and 220*dv*2 in the one sensing unit 200SU. The two second divided touch electrodes 220*dv*1 and 220*dv*2 may be disposed in an upper edge portion and a lower edge portion of the sensing unit 200SU, respectively. Each of the two second divided touch electrodes 220*dv*1 and 220*dv*2 may include second sensing portions 221 and second bridge portions 222.

In an embodiment of the present disclosure, the sensor layer 200 (refer to FIG. 5) may further include floating patterns FLP and dummy patterns DFLP. The floating patterns FLP and the dummy patterns DFLP may each be electrically floated.

The dummy patterns DFLP may be arranged in the first direction DR1 so as to be spaced apart from each other. The dummy patterns DFLP may be disposed between the two second divided touch electrodes 220*dv*1 and 220*dv*2. For example, the dummy patterns DFLP may be disposed in the central portion of the sensing unit 200SU. Each of the dummy patterns DFLP may have a rhombic shape. Four dummy patterns DFLP may be disposed in the one sensing unit 200SU. Among the four dummy patterns DFLP, two dummy patterns DFLP may include an entire area of a rhombic shape, and the remaining two dummy patterns DFLP may include a partial area corresponding to half of a rhombic shape (e.g., a half-rhombic shape).

The embodiment illustrated in FIG. 27 may be the same as the case in which in the embodiments described with reference to FIGS. 11A to 14, the second divided touch electrode 220dv2 (refer to FIG. 11A or 13A) disposed in the central portion among the three second divided touch electrodes 220dv1, 220dv2, and 220dv3 (refer to FIG. 11A or 13A) is omitted and the dummy patterns DFLP are disposed to correspond to the second sensing portions 221 of the omitted second divided touch electrode 220dv2 (refer to FIG. 11A or 13A).

Referring to FIGS. 19A and 27, the second touch sensing electrode 220 and the second pen sensing electrode 310 may be disposed so as not to overlap each other. In an embodiment, the second pen sensing electrode 310 may be disposed in the central portion, one second divided pen electrode 310dv1 may be disposed in the upper edge portion, and the other second divided pen electrode 310dv2 may be disposed in the lower edge portion. Since the second touch sensing electrode 220 and the second pen sensing electrode 310 are disposed so as not to overlap each other, a coupling capacitor might not be defined between the second touch sensing electrode 220 and the second pen sensing electrode 310. Accordingly, leakage current in the pen sensing drive mode may be reduced, and the signal to noise ratio (SNR) may be increased. Thus, the electronic device with increased sensing sensitivity may be provided. However, embodiments are not necessarily limited thereto, and through a combination of FIGS. 19A and 27, the second touch sensing electrode 220 and the second pen sensing electrode 310 may be disposed to overlap each other.

Figure 28A:
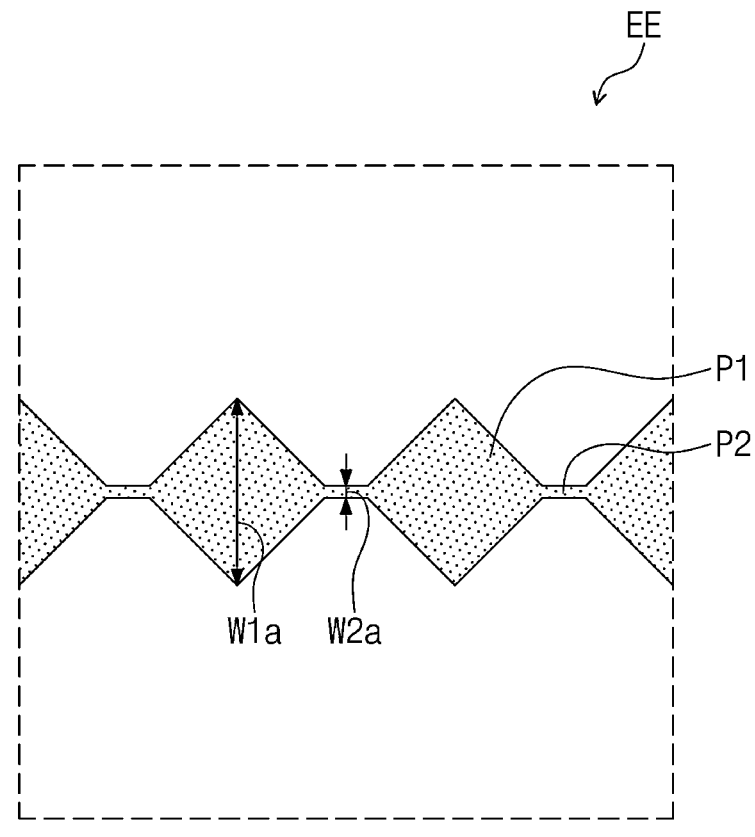
FIGS. 28A to 28C are enlarged plan views illustrating one electrode according to an embodiment of the present disclosure.
Figure 28A:
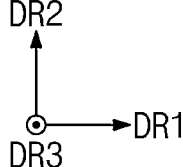
Figure 28B:
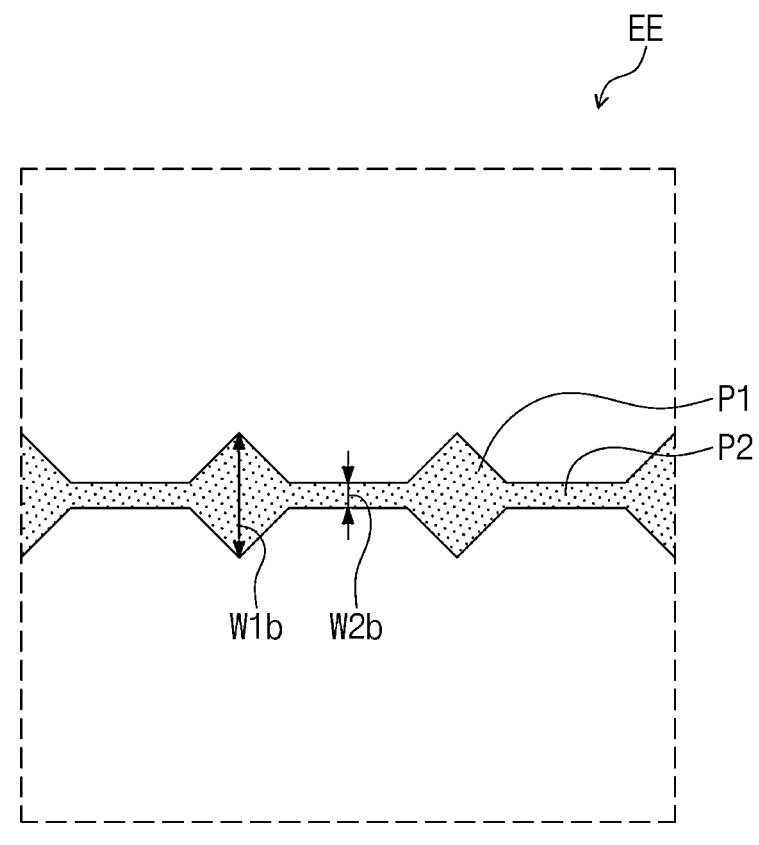
Figure 28B:
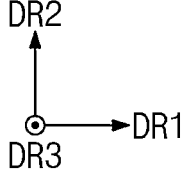
Figure 28C:
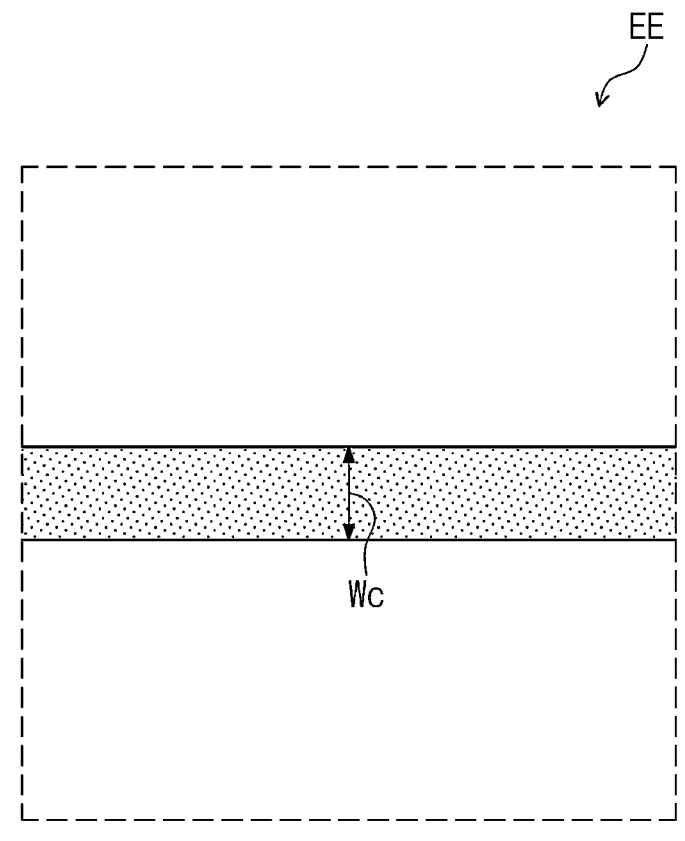
Figure 28C:
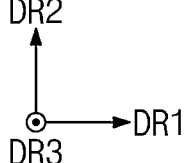

FIGS. 28A to 28C are enlarged plan views illustrating one electrode EE according to an embodiment of the present disclosure. The electrode EE illustrated in FIGS. 28A to 28C may correspond to one of the first touch sensing electrode 210 (or, the first divided touch electrodes 210dv1 and 210dv2), the second touch sensing electrode 220 (or, the second divided touch electrodes 220dv1, 220dv2, and 220dv3), the first pen sensing electrode 230 (or, the first divided pen electrodes 230dv1 and 230dv2), and the second pen sensing electrode 310 (or, the second divided pen electrodes 310dv1 and 310dv2).

Referring to FIGS. 28A and 28B, in an embodiment, the electrode EE may include two portions having different shapes. The electrode EE may include sensing portions P1 and bridge portions P2. Portions having a relatively large area may be defined as the sensing portions P1, and portions having a relatively small area may be defined as the bridge portions P2. The maximum width W1a or W1b of the sensing portion P1 in the second direction DR2 (or, in a direction perpendicular to the extension direction of the electrode EE) may be greater than the width W2a or W2b of the bridge portion P2 in the second direction DR2 (or, in the direction perpendicular to the extension direction of the electrode EE). The sensing portions P1 may alternate with the bridge portions P2 in the second direction DR2 (or, in the extension direction of the electrode EE).

The maximum width W1a or W1b of the sensing portion P1 in the second direction DR2 and the width W2a or W2b of the bridge portion P2 in the second direction DR2 may be diversely designed. As illustrated in FIG. 28A, the maximum width W1a of the sensing portion P1 in the second direction DR2 and the width W2a of the bridge portion P2 in the second direction DR2 may be designed such that the difference therebetween is relatively large, and as illustrated in FIG. 28B, the maximum width W1b of the sensing portion P1 in the second direction DR2 and the width W2b of the bridge portion P2 in the second direction DR2 may be designed such that the difference therebetween is relatively small.

Referring to FIG. 28C, in an embodiment, the electrode EE may have a bar shape in which the width Wc in the second direction DR2 (or, in the direction perpendicular to the extension direction of the electrode EE) is substantially constant. For example, the electrode EE might not include portions having different shapes.

Figure 29A:
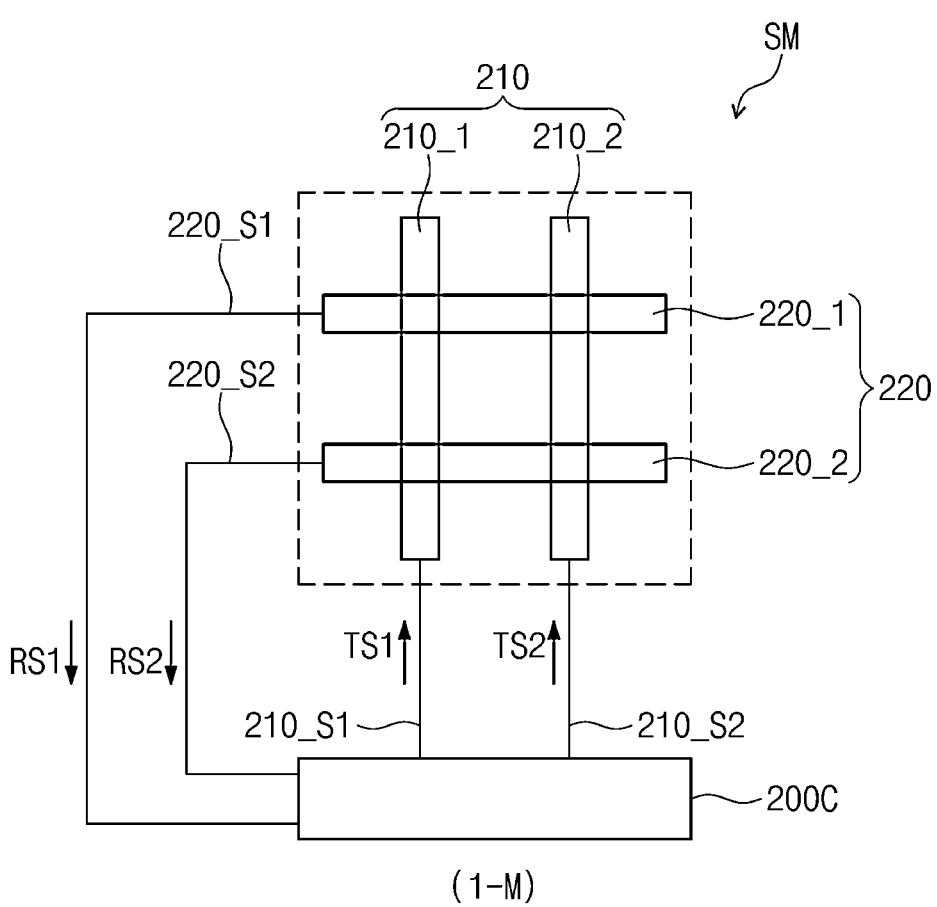
FIGS. 29A and 29B illustrate operation of the sensing module in a first mode according to an embodiment of the present disclosure.
Figure 29B:
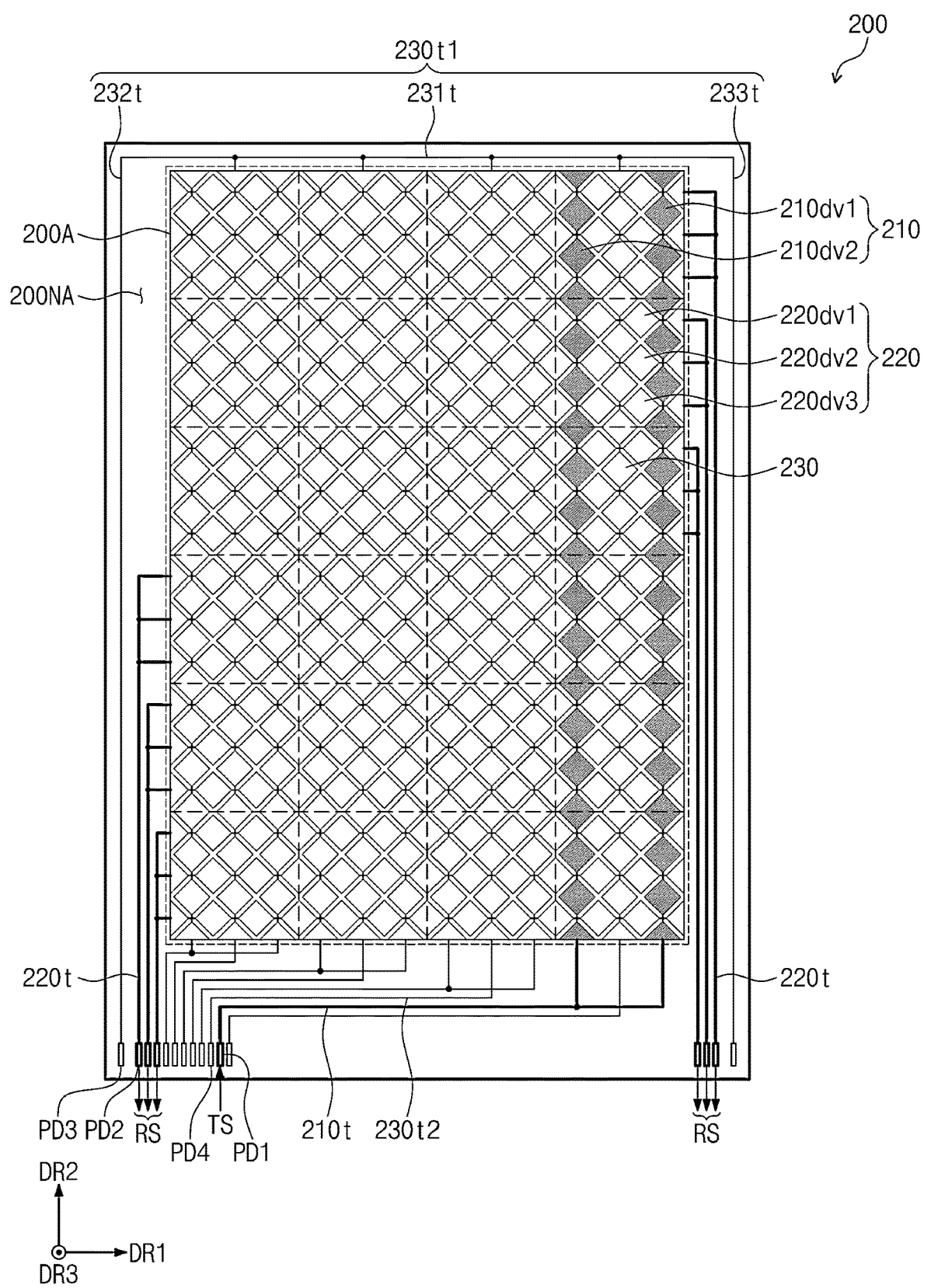

FIG. 29A illustrates operation of the sensing module SM in a first mode 1-M according to an embodiment of the present disclosure. FIG. 29B illustrates operation of the sensor layer 200 in the first mode 1-M according to an embodiment of the present disclosure.

Referring to FIG. 29A, the sensing module SM may include the first touch sensing electrodes 210 and the second touch sensing electrodes 220 that are insulated from each other and that cross each other. In FIG. 29A, two first touch sensing electrodes 210_1 and 210_2 among the plurality of first touch sensing electrodes 210 and two second touch sensing electrodes 220_1 and 220_2 among the plurality of second touch sensing electrodes 220 are illustrated. In addition, signal lines 210_S1 and 210_S2 that connect the sensor driver 200C and the two first touch sensing electrodes 210_1 and 210_2 and signal lines 220_S1 and 220_S2 that connect the sensor driver 200C and the two second touch sensing electrodes 220_1 and 220_2 are illustrated.

In the first mode 1-M, one of the first touch sensing electrodes 210 and the second touch sensing electrodes 220 may operate as transmitter electrodes, and the other one of the first touch sensing electrodes 210 and the second touch sensing electrodes 220 may operate as receiver electrodes. In FIG. 29A, the first touch sensing electrodes 210 are illustrated as transmitter electrodes, and the second touch sensing electrodes 220 are illustrated as receiver electrodes. Drive signals TS1 and TS2 may be provided to first ends of the first touch sensing electrodes 210, and the sensor driver 200C may receive sensing signals RS1 and RS2 from the second touch sensing electrodes 220. The sensor driver 200C may sense the first input 2000 (refer to FIGS. 6A and 6B) by sensing a change in the capacitance formed between the first touch sensing electrodes 210 and the second touch sensing electrodes 220.

Referring to FIGS. 29A and 29B, in an embodiment, the first mode 1-M may include a mutual capacitance detection mode. The sensor driver 200C may sequentially provide a transmission signal TS to the first touch sensing electrodes 210 and may detect the coordinates for the first input 2000 (refer to FIGS. 6A and 6B) using a reception signal RS detected through the second touch sensing electrodes 220. For example, the sensor driver 200C may be configured to sense a change in the mutual capacitance between the first touch sensing electrodes 210 and the second touch sensing electrodes 220 and calculate input coordinates.

FIG. 29B illustrates an example that the transmission signal TS is provided to one first touch sensing electrode 210 and the reception signal RS is output from the second touch sensing electrodes 220. In FIG. 29B, to clarify the expression of the signal, hatching is drawn on one first touch sensing electrode 210 to which the transmission signal TS is provided. The sensor driver 200C may detect the input coordinates for the first input 2000 (refer to FIGS. 6A and 6B) by sensing a change in the capacitance between the first touch sensing electrode 210 and the second touch sensing electrodes 220.

According to an embodiment of the present disclosure, in the mutual capacitance detection mode, the first pen sensing electrodes 230 and the second pen sensing electrodes 310 (refer to FIG. 8A) may all be grounded. Accordingly, noise might not be introduced through the first pen sensing electrodes 230 and the second pen sensing electrodes 310 (refer to FIG. 8A). In an embodiment of the present disclosure, a reference potential may be applied to the first pen sensing electrodes 230 and the second pen sensing electrodes 310 (refer to FIG. 8A). In an embodiment of the present disclosure, a signal in phase with the transmission signal TS may be applied to the first pen sensing electrodes 230 and the second pen sensing electrodes 310 (refer to FIG. 8A). In this case, noise might not be introduced through the first pen sensing electrodes 230 and the second pen sensing electrodes 310 (refer to FIG. 8A).

Figure 30A:
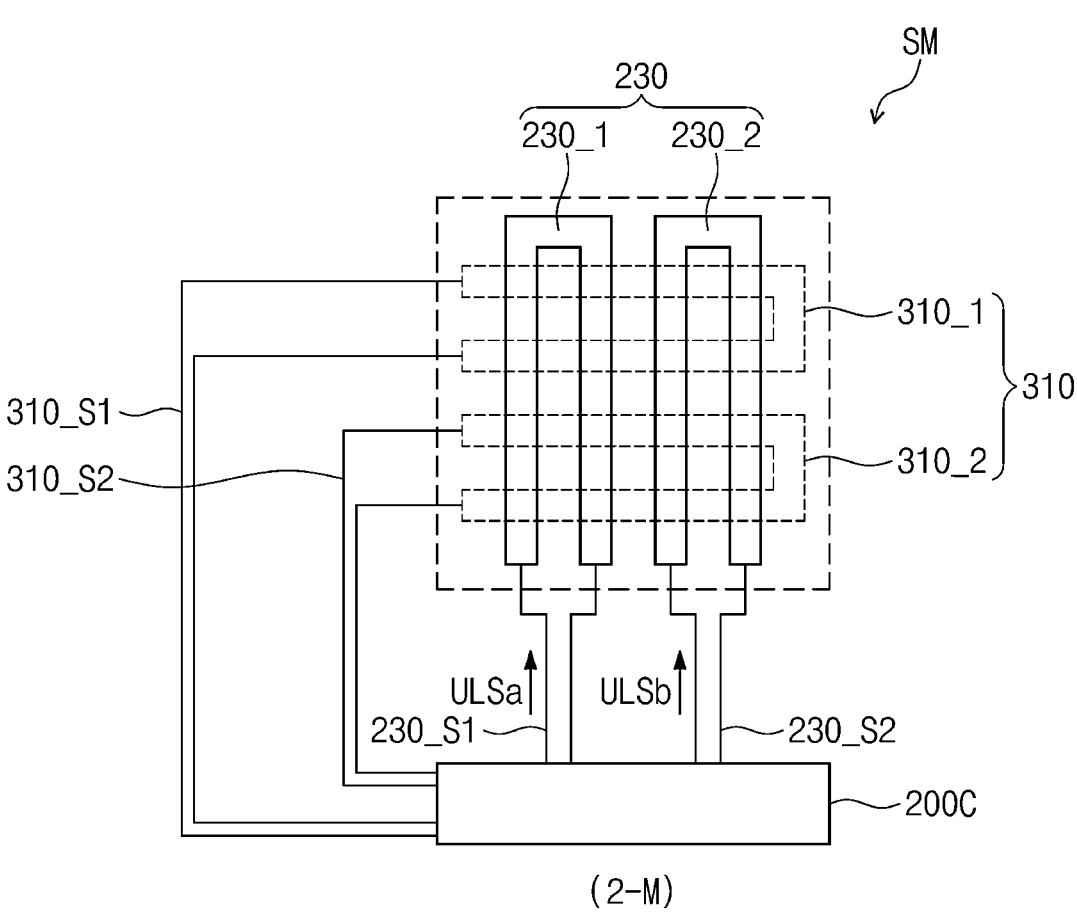
FIGS. 30A and 30B illustrate operation of the sensing module in a second mode according to an embodiment of the present disclosure.
Figure 30B:
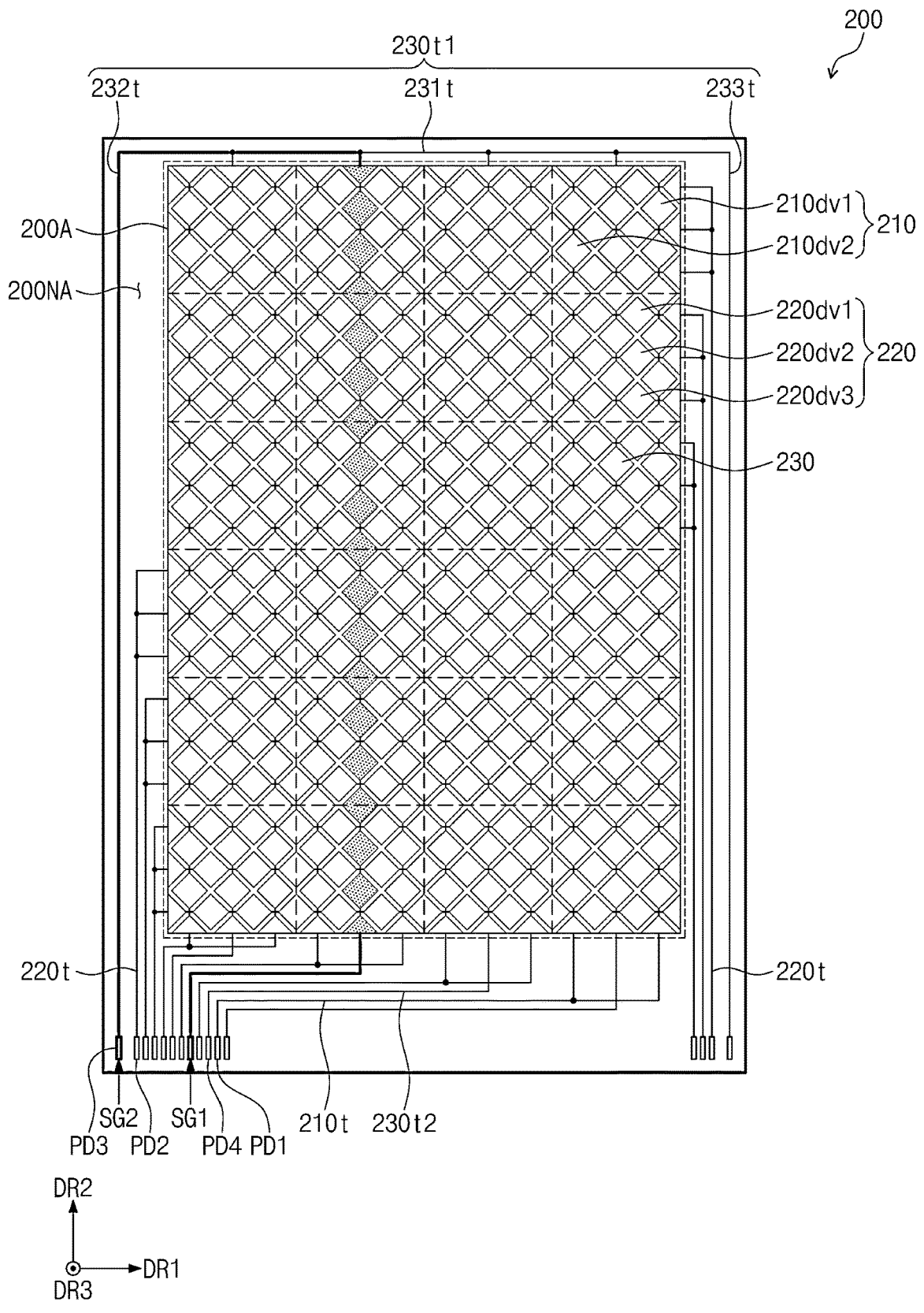
Figure 31A:
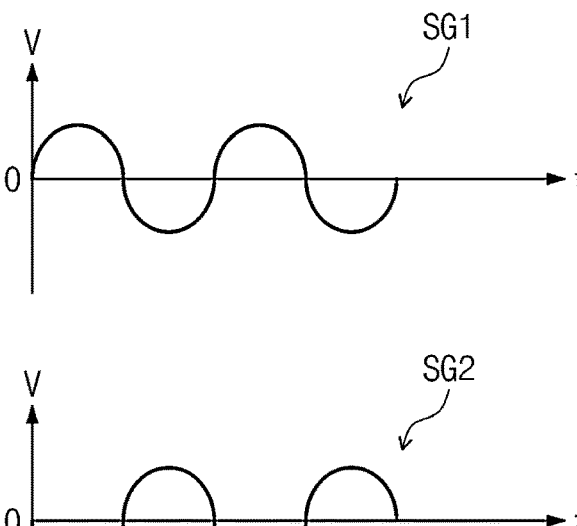
FIG. 31A illustrates graphs depicting the waveforms of a first signal and a second signal according to an embodiment of the present disclosure.
Figure 31B:
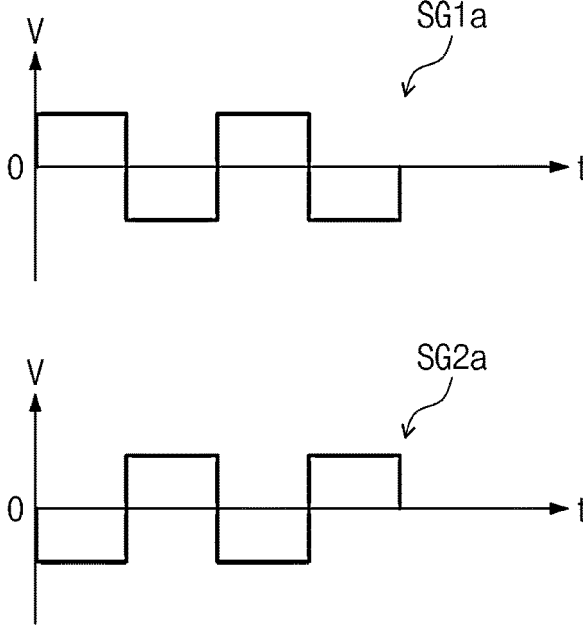
FIG. 31B illustrates graphs depicting the waveforms of a first signal and a second signal according to an embodiment of the present disclosure.
Figure 31C:
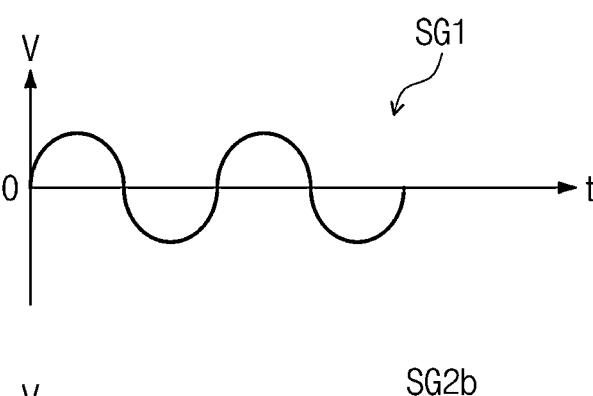
FIG. 31C illustrates graphs depicting the waveforms of a first signal and a second signal according to an embodiment of the present disclosure.
Figure 31C:
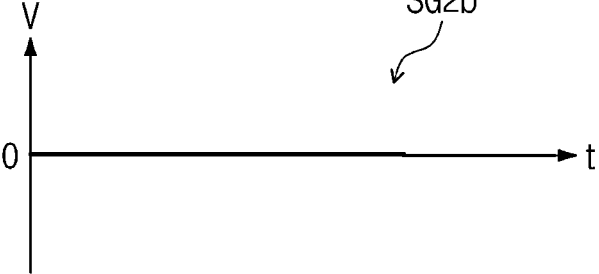

FIG. 30A illustrates operation of the sensing module SM in a second mode 2-M according to an embodiment of the present disclosure. FIG. 30B illustrates operation of the sensor layer 200 in the second mode 2-M according to an embodiment of the present disclosure. FIG. 31A illustrates graphs depicting the waveforms of a first signal SG1 and a second signal SG2 according to an embodiment of the present disclosure. FIG. 31B illustrates graphs depicting the waveforms of a first signal SG1a and a second signal SG2a according to an embodiment of the present disclosure. FIG. 31C illustrates graphs depicting the waveforms of a first signal SG1 and a second signal SG2b according to an embodiment of the present disclosure.

Referring to FIG. 30A, the sensing module SM may include the first pen sensing electrodes 230 and the second pen sensing electrodes 310 that are insulated from each other and that cross each other. The first pen sensing electrodes 230 may be included in the sensor layer 200 (refer to FIGS. 6A and 6B), and the second pen sensing electrodes 310 may be included in the lower conductive layer 300 (refer to FIGS. 6A and 6B). In FIG. 30A, two first pen sensing electrodes 230_1 and 230_2 among the plurality of first pen sensing electrodes 230 and two second pen sensing electrodes 310_1 and 310_2 among the plurality of second pen sensing electrodes 310 are illustrated. In addition, signal lines 230_S1 and 230_S2 that connect the sensor driver 200C and the two first pen sensing electrodes 230_1 and 230_2 and signal lines 310_S1 and 310_S2 that connect the sensor driver 200C and the two second pen sensing electrodes 310_1 and 310_2 are illustrated.

The second mode 2-M may include a charging drive mode and a pen sensing drive mode. FIG. 30A is a view for explaining the charging drive mode. According to an embodiment, during the charging drive mode, the first pen sensing electrodes 230 may receive uplink signals ULSa and ULSb from the sensor driver 200C and may perform charging driving.

Referring to FIGS. 30B and 31A, the second mode 2-M may include the charging drive mode and the pen sensing drive mode. FIG. 30B is a view for explaining the charging drive mode.

In the charging drive mode according to an embodiment, the sensor driver 200C may apply the first signal SG1 to at least one pad among the third pads PD3 and the fourth pads PD4 and may apply the second signal SG2 to at least one other pad. The second signal SG2 may be an inverse signal of the first signal SG1. For example, the first signal SG1 may be a sinusoidal signal.

Although FIG. 30B illustrates an example that the first signal SG1 is applied to one pad and the second signal SG2 is applied to another pad, the present disclosure is not necessarily limited thereto. For example, the first signal SG1 may be applied to two or more pads, and the second signal SG2 may be applied to two or more other pads.

Since the first signal SG1 and the second signal SG2 are applied to at least two pads, electric current may have a current path flowing through at least one pad to at least one other pad. In addition, since the first signal SG1 and the second signal SG2 are sinusoidal signals having an inverse phase relationship, the direction of the electric current may be periodically varied.

Referring to FIGS. 30B and 31B, the first signal SG1a and the second signal SG2a may be square-wave signals. The second signal SG2a may be an inverse signal of the first signal SG1a. Since the first signal SG1a and the second signal SG2a are applied to at least two pads, electric current may have a current path flowing through at least one pad to at least one other pad. In addition, since the first signal SG1a and the second signal SG2a are square-wave signals having an inverse phase relationship, the direction of the electric current RFS may be periodically varied.

The first signal SG1 or SG1a illustrated in FIGS. 31A and 31B has an inverse relationship with the second signal SG2 or SG2a. Accordingly, noise caused in the display layer 100 (refer to FIG. 5) by the first signal SG1 or SG1a may cancel out noise caused by the second signal SG2 or SG2a. Accordingly, a flicker phenomenon might not occur in the display layer 100 (refer to FIG. 5), and the display quality of the display layer 100 (refer to FIG. 5) may be increased.

Referring to FIGS. 30B and 31C, the first signal SG1 may be a sinusoidal signal. However, without necessarily being limited thereto, the first signal SG1 may be a square-wave signal. The second signal SG2b may have a certain constant voltage. For example, the second signal SG2b may be a ground voltage. For example, a pad to which the second signal SG2b is applied may be regarded as being grounded. Even in this case, electric current may flow from at least one pad to at least one other pad. In addition, even though the at least one other pad is grounded, the direction of the electric current may be periodically varied because the first signal SG1 is a sinusoidal signal or a square-wave signal.

Referring again to FIG. 30B, the second signal SG2 may be provided to one third pad PD3 connected with one third trace line 230t1, and the first signal SG1 may be provided to one fourth pad PD4 connected with the first pen sensing electrode 230. Electric current may flow along a current path defined by the fourth pad PD4, the fourth trace line 230t2 connected to the fourth pad PD4, the first pen sensing electrode 230, a portion of the third trace line 230t1 connected to the third pad PD3, and the third pad PD3. The current path may have the form of a coil. Accordingly, in the charging drive mode of the second mode 2-M, the resonance circuit of the pen PN (refer to FIGS. 6A and 6B) may be charged by the current path.

According to an embodiment of the present disclosure, in the charging drive mode, the first touch sensing electrodes 210, the second touch sensing electrodes 220, and the second pen sensing electrodes 310 may be grounded or electrically floated, or may have a constant voltage applied thereto. For example, the first touch sensing electrodes 210, the second touch sensing electrodes 220, and the second pen sensing electrodes 310 may be floated. In this case, electric current might not flow to the first touch sensing electrodes 210, the second touch sensing electrodes 220, and the second pen sensing electrodes 310.

Figure 32:
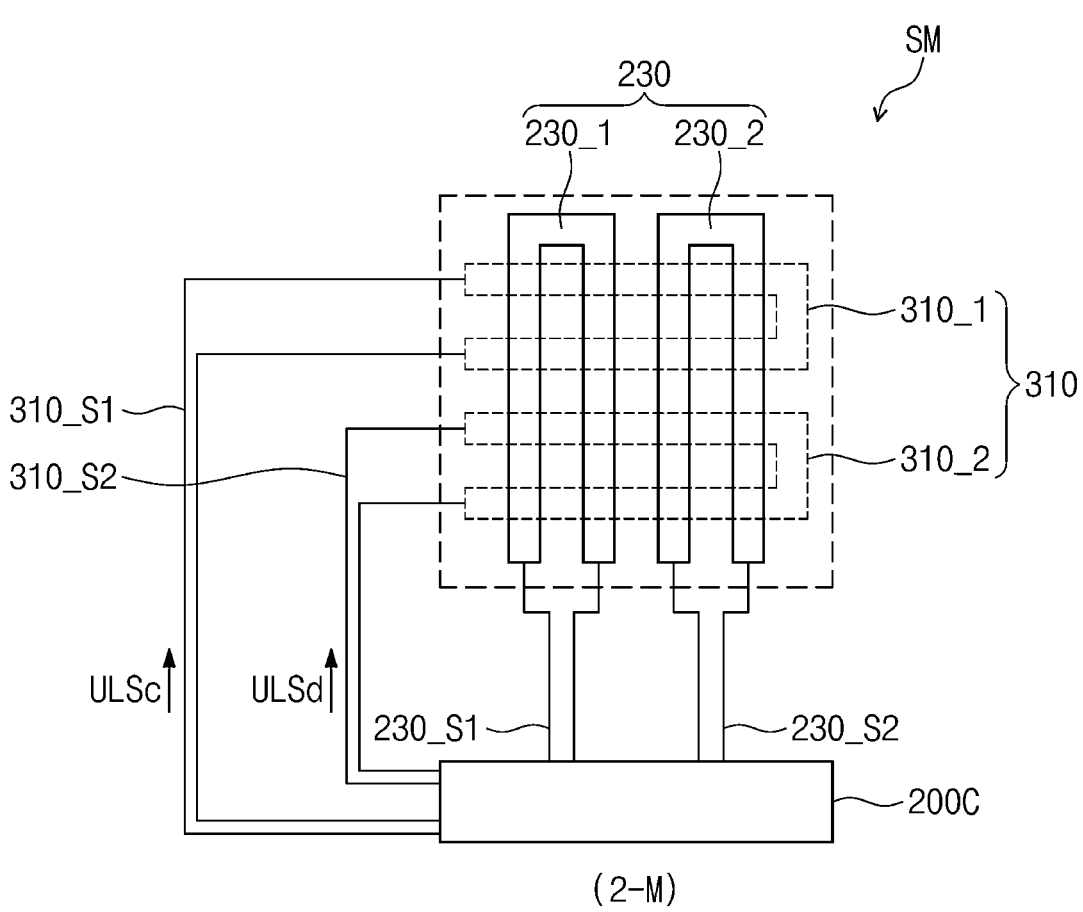
FIG. 32 illustrates operation of the sensing module in the second mode according to an embodiment of the present disclosure.

FIG. 32 illustrates operation of the sensing module SM in the second mode 2-M according to an embodiment of the present disclosure.

Referring to FIG. 32, the sensing module SM may include the first pen sensing electrodes 230 and the second pen sensing electrodes 310 that are insulated from each other and that cross each other. The first pen sensing electrodes 230 may be included in the sensor layer 200 (refer to FIGS. 6A and 6B), and the second pen sensing electrodes 310 may be included in the lower conductive layer 300 (refer to FIGS. 6A and 6B).

According to an embodiment, during the charging drive mode, the second pen sensing electrodes 310 may receive uplink signals ULSc and ULSd from the sensor driver 200C and may perform charging driving. For example, the charging driving may be performed through pen sensing electrodes (e.g., the first pen sensing electrodes 230) disposed in the sensor layer 200 (refer to FIGS. 6A and 6B), or may be performed through pen sensing electrodes (e.g., the second pen sensing electrodes 310) disposed in the lower conductive layer 300 (refer to FIGS. 6A and 6B).

Figure 33A:
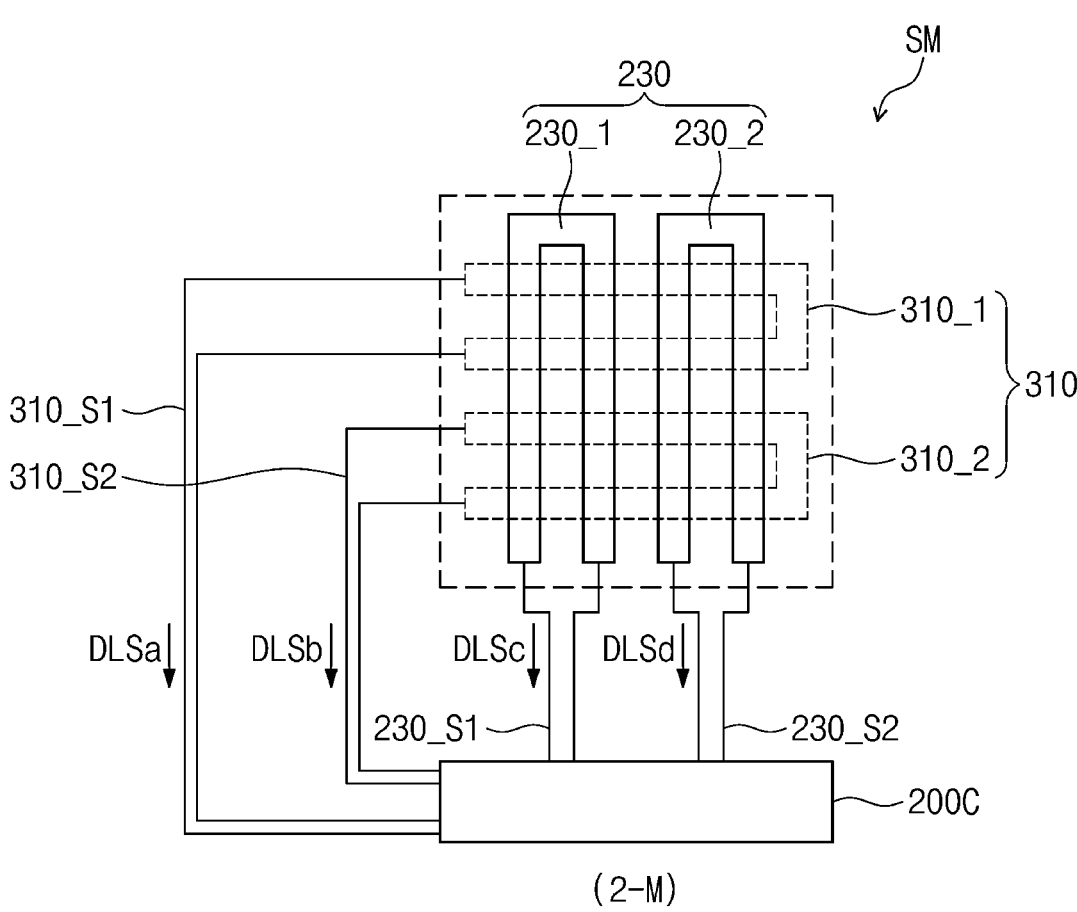
FIGS. 33A and 33B illustrate operation of the sensing module in the second mode according to an embodiment of the present disclosure.
Figure 33B:
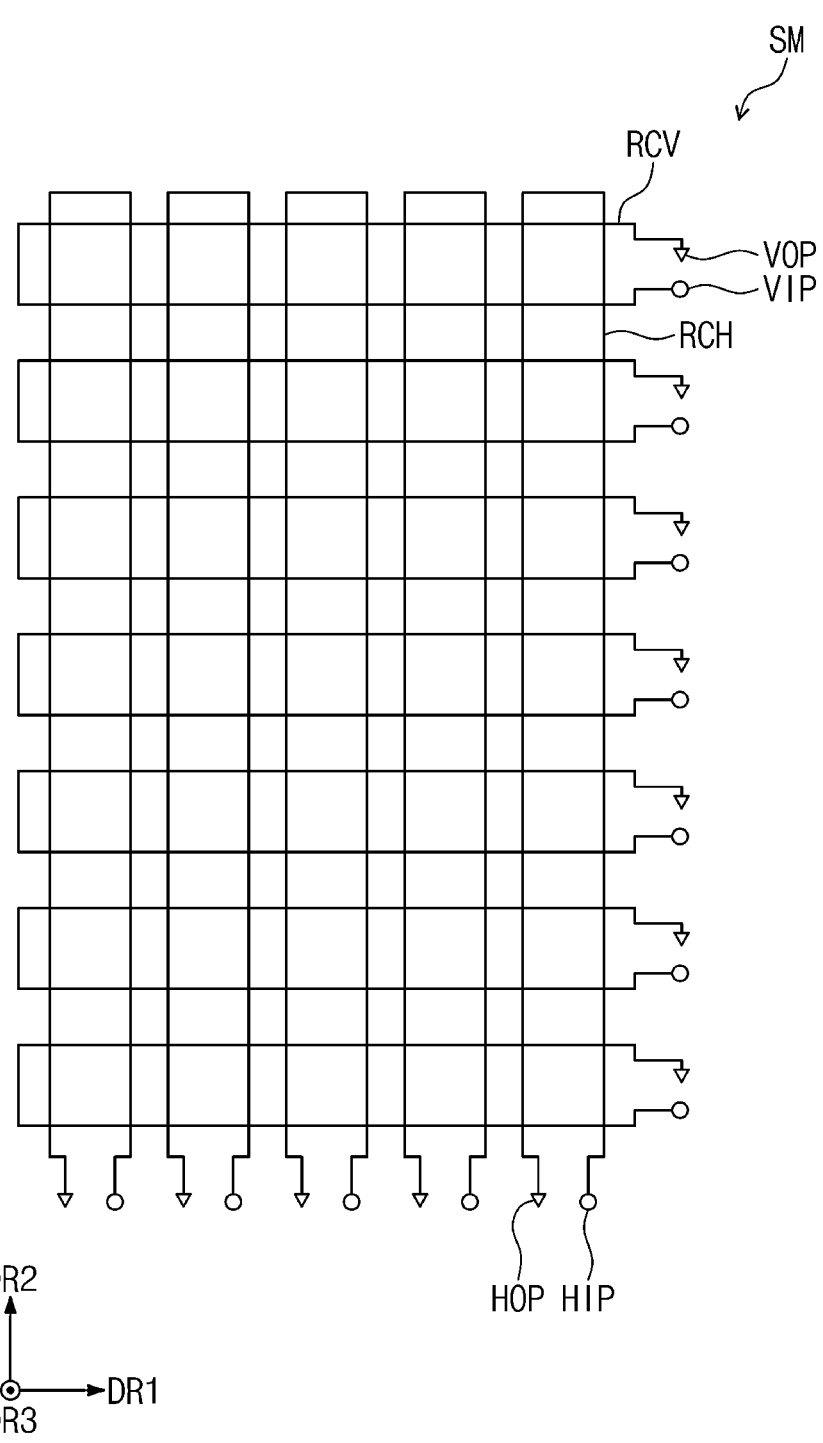

FIGS. 33A and 33B illustrate operation of the sensing module SM in the second mode 2-M according to an embodiment of the present disclosure.

Referring to FIGS. 33A and 33B, the second mode 2-M may include the charging drive mode and the pen sensing drive mode. FIGS. 33A and 33B are illustrations for explaining the pen sensing drive mode.

During a pen sensing period, the first pen sensing electrodes 230 and the second pen sensing electrodes 310 may receive downlink signals DLSa, DLSb, DLSc, and DLSd provided from the sensor driver 200C and may perform pen sensing driving.

First ends of the first pen sensing electrodes 230 and the second pen sensing electrodes 310 may be connected through the third trace line 230*t*1 (refer to FIGS. 9A and 9B) and the fifth trace line 310*t*1 (refer to FIGS. 10A and 10B), and the first pen sensing electrodes 230 and the second pen sensing electrodes 310 may be provided or driven in the form of a loop coil. First coils RCH may be provided through the first pen sensing electrodes 230, and second coils RCV may be provided through the second pen sensing electrodes 310. The first coils RCH may be referred to as driving coils, and the second coils RCV may be referred to as sensing coils.

First ends of the first coils RCH are connected to input terminals HIP, and second ends of the first coils RCH are connected to output terminals HOP. An alternating current signal may be sequentially provided to the input terminals HIP, and the output terminals HOP may have a constant voltage, for example, may be grounded. Accordingly, the first coils RCH may be formed in a closed-curve shape, and when electric current flows through the first coils RCH, magnetic force lines may be induced between the first coils RCH and the second coils RCV.

First ends of the second coils RCV are connected to input terminals VIP, and second ends of the second coils RCV are connected to output terminals VOP. The output terminals VOP may have a certain voltage, for example, may be grounded. Accordingly, the second coils RCV may be formed in a closed-curve shape, and the second coils RCV may output, to the output terminals VOP of the second coils RCV, a signal obtained by detecting an induced electromagnetic force emitted from an electromagnetic pen.

The arrangement relationship between the first coils RCH and the second coils RCV is not necessarily limited to that illustrated in FIG. 33B and may be modified in various ways.

Figure 34:
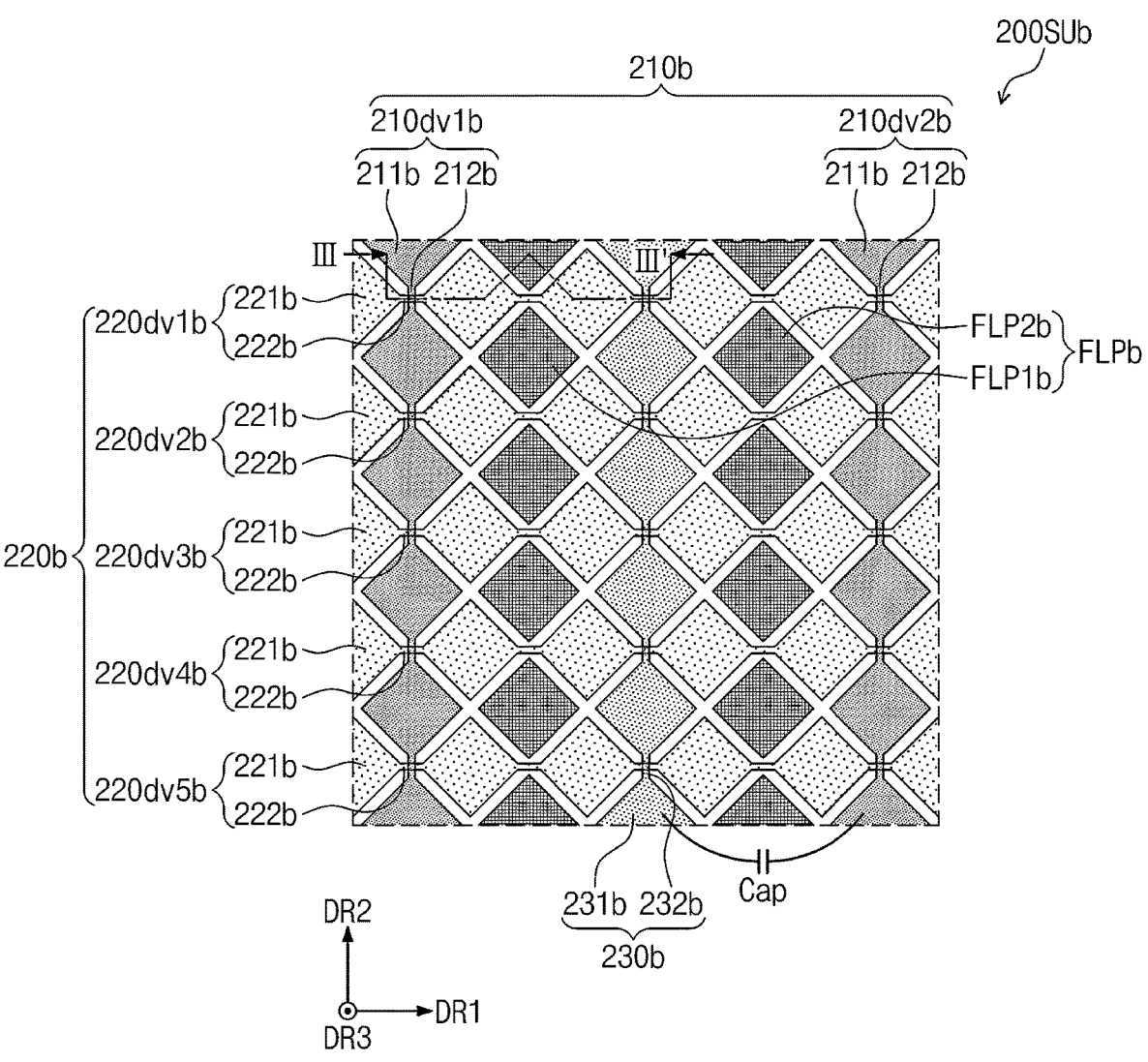
FIG. 34 is an enlarged plan view illustrating one sensing unit in the sensor layer according to an embodiment of the present disclosure.
Figure 35A:
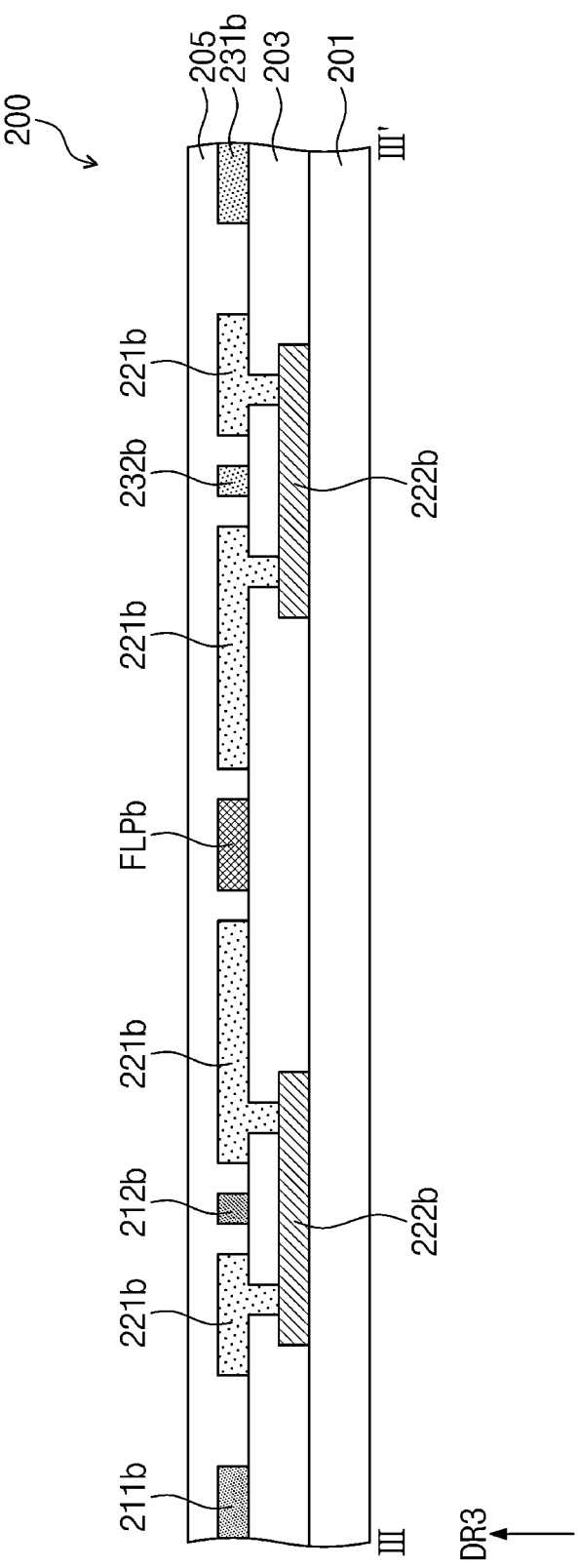
FIGS. 35A and 35B are cross-sectional views of the sensor layer taken along line III-III' illustrated in FIG. 34 according to an embodiment of the present disclosure.
Figure 35B:
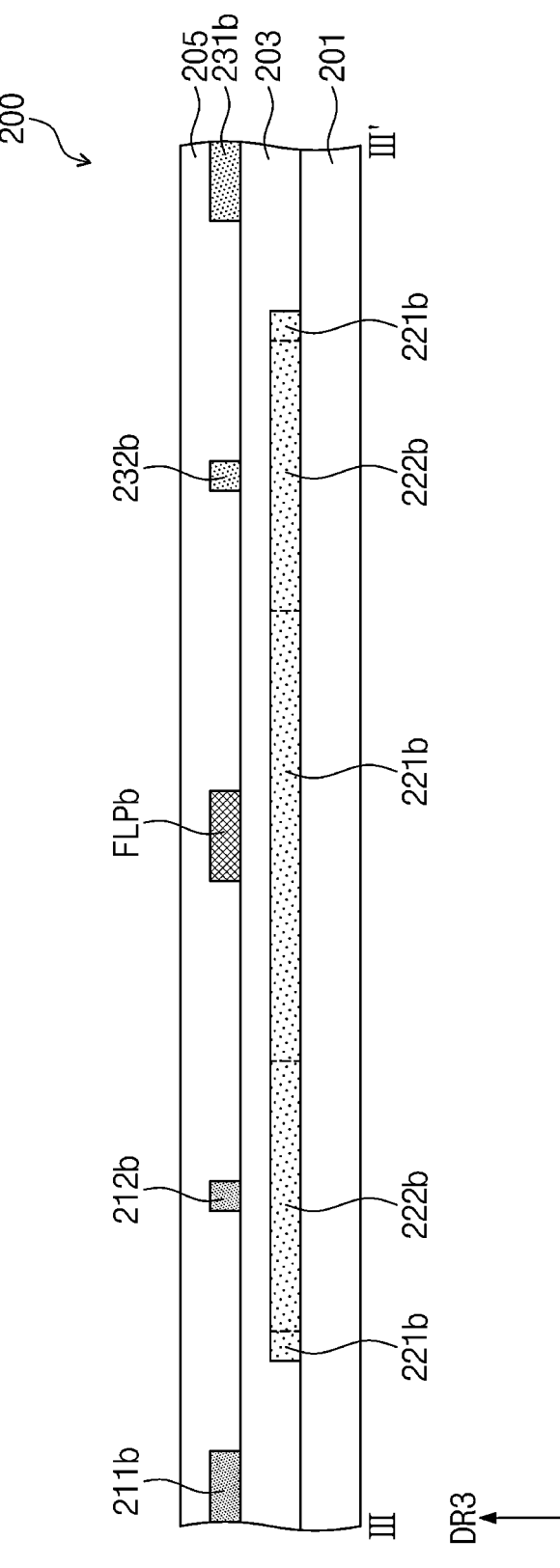

FIG. 34 is an enlarged plan view illustrating one sensing unit 200SUb in the sensor layer 200 (refer to FIG. 5) according to an embodiment of the present disclosure. FIGS. 35A and 35B are cross-sectional views of the sensor layer 200 taken along line III-III' illustrated in FIG. 34 according to an embodiment of the present disclosure.

Referring to FIGS. 34 to 35B, in an embodiment, a first touch sensing electrode 210*b* may include two first divided touch electrodes 210*dv*1*b* and 210*dv*2*b* in the one sensing unit 200SUb. Each of the first divided sensing electrodes 210*dv*1*b* and 210*dv*2*b* may include two portions having different shapes. Each of the first divided sensing electrodes 210*dv*1*b* and 210*dv*2*b* may include first sensing portions 211*b* and first bridge portions 212*b*.

In an embodiment, the first sensing portions 211*b* and the first bridge portions 212*b* included in the first divided touch electrode 210*dv*1*b* or 210*dv*2*b* may have a single-body shape. In an embodiment, the first sensing portions 211*b* may have a rhombic shape. Each of the first bridge portions 212*b* may connect the first sensing portions 211*b* adjacent to each other and may have a bar shape extending in the second direction DR2.

In the one sensing unit 200SUb, each of the first divided sensing electrodes 210*dv*1*b* and 210*dv*2*b* may include six first sensing portions 211*b* and five first bridge portions 212*b*. Among the six first sensing portions 211*b*, four first sensing portions 211*b* may include an entire area of a rhombic shape, and the remaining two first sensing portions 211*b* may include a partial area corresponding to half of a rhombic shape (e.g., a half-rhombic shape). The total area of the first sensing portions 211*b* included in the first divided sensing electrode 210*dv*1*b* or 210*dv*2*b* in the one sensing unit 200SUb may be equal to the sum of the areas of five first sensing portions 211*b* having a rhombic shape.

In an embodiment, a second touch sensing electrode 220*b* may include five second divided touch electrodes 220*dv*1*b*, 220*dv*2*b*, 220*dv*3*b*, 220*dv*4*b*, and 220*dv*5*b* in the one sensing unit 200SUb. The five second divided touch electrodes 220*dv*1*b*, 220*dv*2*b*, 220*dv*3*b*, 220*dv*4*b*, and 220*dv*5*b* may be referred to as the second-first divided electrode 220*dv*1*b*, the second-second divided electrode 220*dv*2*b*, the second-third divided electrode 220*dv*3*b*, the second-fourth divided electrode 220*dv*4*b*, and the second-fifth divided electrode 220*dv*5*b*. Each of the second divided touch electrodes 220*dv*1*b*, 220*dv*2*b*, 220*dv*3*b*, 220*dv*4*b*, and 220*dv*5*b* may include two portions having different shapes. Each of the second divided touch electrodes 220*dv*1*b*, 220*dv*2*b*, 220*dv*3*b*, 220*dv*4*b*, and 220*dv*5*b* may include second sensing portions 221*b* and second bridge portions 222*b*.

In an embodiment, each of the second sensing portions 221*b* may have a rhombic shape. Each of the second bridge portions 222*b* may connect the second sensing portions 221*b* adjacent to each other and may have a bar shape extending in the second direction DR2.

In the one sensing unit 200SU, each of the second divided touch electrodes 220*dv*1*b*, 220*dv*2*b*, 220*dv*3*b*, 220*dv*4*b*, and 220*dv*5*b* may include six second sensing portions 221*b* and five second bridge portions 222*b*. Among the six second sensing portions 221*b*, four second sensing portions 221*b* may include an entire area of a rhombic shape, and the remaining two second sensing portions 221*b* may include a partial area corresponding to half of a rhombic shape (e.g., a half-rhombic shape). The total area of the second sensing portions 221*b* included in the second divided touch electrode 220$dv1b$, 220$dv2b$, 220$dv3b$, 220$dv4b$, or 220$dv5b$ in the one sensing unit 200SUb may be equal to the sum of the areas of five second sensing portions 221$b$ having a rhombic shape.

In an embodiment, a first pen sensing electrode 230$b$ might not include separate divided electrodes in the one sensing unit 200SUb and may be disposed as one electrode. The first pen sensing electrode 230$b$ may include two portions having different shapes. The first pen sensing electrode 230$b$ may include third sensing portions 231$b$ and third bridge portions 232$b$.

In an embodiment, the third sensing portions 231$b$ and the third bridge portions 231$b$ included in the first pen sensing electrode 230$b$ may have a single-body shape. In an embodiment, the third sensing portions 231$b$ may have a rhombic shape. Each of the third bridge portions 232$b$ may connect the third sensing portions 231$b$ adjacent to each other and may have a bar shape extending in the second direction DR2.

In the one sensing unit 200SUb, the first pen sensing electrode 230$b$ may include six third sensing portions 231$b$ and five third bridge portions 232$b$. Among the six third sensing portions 231$b$, four third sensing portions 231$b$ may include an entire area of a rhombic shape, and the remaining two third sensing portions 231$b$ may include a partial area corresponding to half of a rhombic shape (e.g., a half-rhombic shape). The total area of the third sensing portions 231$b$ included in the first pen sensing electrode 230$b$ in the one sensing unit 200SUb may be equal to the sum of the areas of five third sensing portions 231$b$ having a rhombic shape.

In the one sensing unit 200SUb, the first pen sensing electrode 230$b$ may be disposed between the two first divided touch electrodes 210$dv1b$ and 210$dv2b$. The third sensing portions 231$b$ of the first pen sensing electrode 230$b$, the first sensing portions 211$b$ of one of the two first divided touch electrodes 210$dv1b$ and 210$dv2b$, and the first sensing portions 211$b$ of the other one of the two first divided touch electrodes 210$dv1b$ and 210$dv2b$ may be arranged in the first direction DR1 so as to be spaced apart from each other.

As illustrated in FIG. 35A, in an embodiment, the second sensing portions 221$b$ and the second bridge portions 222$b$ may be disposed on different layers. The second sensing portions 221$b$ adjacent to each other and the second bridge portion 222$b$ connecting the adjacent second sensing portions 221$b$ may be connected through a contact hole CN. The second sensing portions 221$b$ and the second bridge portions 222$b$ may be referred to as second sensing patterns and second bridge patterns, respectively. For example, the second bridge portions 222$b$ of the second divided touch electrodes 220$dv1b$, 220$dv2b$, 220$dv3b$, 220$dv4b$, and 220$dv5b$ may be included in the first conductive layer 202 (refer to FIG. 7). The first sensing portions 211$b$ and the first bridge portions 212$b$ of the first divided touch electrodes 210$dv1b$ and 210$dv2b$, the second sensing portions 221$b$ of the second divided touch electrodes 220$dv1b$, 220$dv2b$, 220$dv3b$, 220$dv4b$, and 220$dv5b$, and the third sensing portions 231$b$ and the third bridge portions 232$b$ of the first pen sensing electrode 230$b$ may be included in the second conductive layer 204 (refer to FIG. 7).

Alternatively, as illustrated in FIG. 35B, in an embodiment, the second sensing portions 221$b$ and the second bridge portions 222$b$ included in the second divided touch electrode 220$dv1b$, 220$dv2b$, 220$dv3b$, 220$dv4b$, or 220$dv5b$ may have a single-body shape. The second sensing portions 221$b$ and the second bridge portions 222$b$ of the second divided touch electrodes 220$dv1b$, 220$dv2b$, 220$dv3b$, 220$dv4b$, and 220$dv5b$ may all be included in the first conductive layer 202 (refer to FIG. 7). The first divided touch electrodes 210$dv1b$ and 210$dv2b$ and the first pen sensing electrode 230$b$ may be disposed in the second conductive layer 204 (refer to FIG. 7), and the second divided touch electrodes 220$dv1b$, 220$dv2b$, 220$dv3b$, 220$dv4b$, and 220$dv5b$ may all be disposed on a layer different from the layer on which the first divided touch electrodes 210$dv1b$ and 210$dv2b$ and the first pen sensing electrode 230$b$ are disposed.

Referring again to FIG. 34, the first divided touch electrodes 210$dv1b$ and 210$dv2b$ and the second divided touch electrodes 220$dv1b$, 220$dv2b$, 220$dv3b$, 220$dv4b$, and 220$dv5b$ may cross each other at the first bridge portions 212$b$ and the second bridge portions 222$b$. The first bridge portions 212$b$ and the second bridge portions 222$b$ may be disposed on different layers. The first bridge portions 212$b$ and the second bridge portions 222$b$ may be insulated from each other. The first pen sensing electrode 230$b$ and the second divided touch electrodes 220$dv1b$, 220$dv2b$, 220$dv3b$, 220$dv4b$, and 220$dv5b$ may cross each other at the third bridge portions 232$b$ and the second bridge portions 222$b$. The third bridge portions 232$b$ and the second bridge portions 222$b$ may be disposed on different layers. The third bridge portions 232$b$ and the second bridge portions 222$b$ may be insulated from each other.

In an embodiment of the present disclosure, the sensor layer 200 may further include floating patterns FLPb. Each of the floating patterns FLPb may be electrically floated.

In the one sensing unit 200SUb, the floating patterns FLPb may include first group patterns FLP1$b$ and second group patterns FLP2$b$. The first group patterns FLP1$b$ may be disposed between the first pen sensing electrode 230$b$ and the first divided touch electrode 210$dv1b$. The second group patterns FLP2$b$ may be disposed between the first pen sensing electrode 230$b$ and the first divided touch electrode 210$dv2b$.

The first group patterns FLP1$b$ may be arranged in the second direction DR2 so as to be spaced apart from each other. The second group patterns FLP2$b$ may be arranged in the second direction DR2 so as to be spaced apart from each other. The first group patterns FLP1$b$ and the second group patterns FLP2$b$ may be spaced apart from each other in the first direction DR1 with the first pen sensing electrode 230$b$ disposed therebetween. More specifically, each of the floating patterns FLPb may be disposed between the first sensing portion 211$b$ and the third sensing portion 213$b$ adjacent to each other.

Each of the first group patterns FLP1$b$ may have a rhombic shape. In the one sensing unit 200SUb, the first group patterns FLP1$b$ may include six patterns. Among the six patterns, four patterns may include an entire area of a rhombic shape, and the remaining two patterns may include a partial area corresponding to half of a rhombic shape (e.g., a half-rhombic shape). In the one sensing unit 200SUb, the second group patterns FLP2$b$ may have the same form as the first group patterns FLP1$b$.

The rhombic shape of the floating patterns FLPb or the shape of a partial area corresponding to half of the rhombic shape (e.g., a half-rhombic shape) may be substantially the same as the shape of the first sensing portions 211$b$ and/or the third sensing portions 231$b$.

In an embodiment, the floating patterns FLPb may be disposed on the same layer as the first touch sensing electrode 210$b$ and the first pen sensing electrode 230$b$. The floating patterns FLPb may be included in the second conductive layer 204 (refer to FIG. 7). However, embodiments are not necessarily limited thereto, and the floating patterns FLPb may be included in the first conductive layer 202 (refer to FIG. 7).

Figure 36:
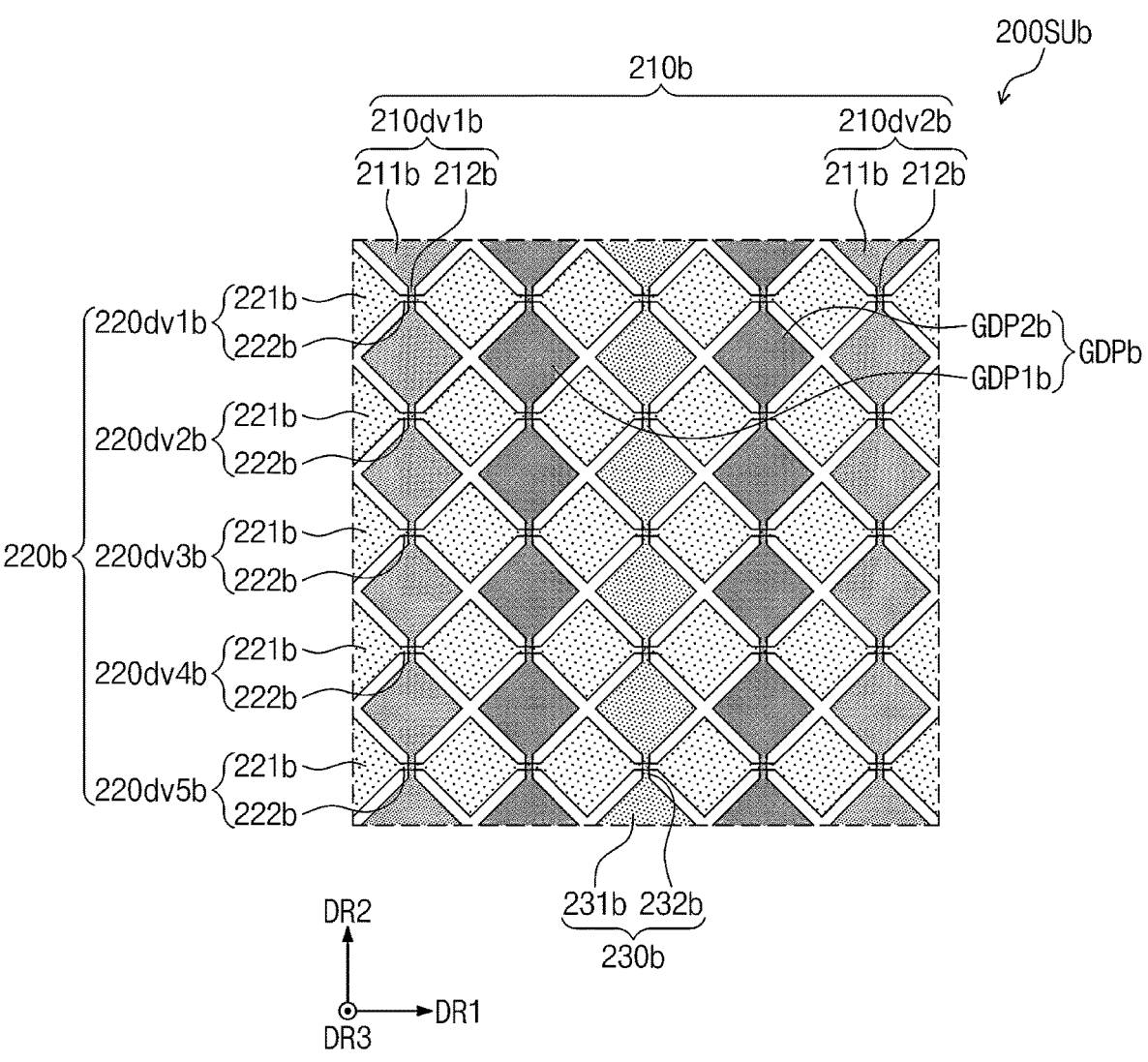
FIGS. 36 to 38 are enlarged plan views illustrating one sensing unit in the sensor layer according to an embodiment of the present disclosure.

FIG. 36 is an enlarged plan view illustrating one sensing unit 200SUb in the sensor layer 200 (refer to FIG. 5) according to an embodiment of the present disclosure.

Referring to FIG. 36, the sensor layer 200 (refer to FIG. 5) may include a first touch sensing electrode 210*b*, a second touch sensing electrode 220*b*, and a first pen sensing electrode 230*b*. The description given above with reference to FIGS. 35 to 36B may be identically applied to the first touch sensing electrode 210*b*, the second touch sensing electrode 220*b*, and the first pen sensing electrode 230*b*.

In an embodiment, the sensor layer 200 (refer to FIG. 5) may further include ground patterns GDPb. Each of the ground patterns GDPb may be grounded. For example, each of the ground patterns GDPb may be regarded as being grounded.

In the one sensing unit 200SUb, the ground patterns GDPb may include a first group pattern GDP1*b* and a second group pattern GDP2*b*. The first ground pattern GDP1*b* may be disposed between the first pen sensing electrode 230*b* and a first divided touch electrode 210*dv*1*b*. The second ground pattern GDP2*b* may be disposed between the first pen sensing electrode 230*b* and a first divided touch electrode 210*dv*2*b*.

The first ground pattern GDP1*b* and the second ground pattern GDP2*b* may each extend in the second direction DR2. The first ground pattern GDP1*b* and the second ground pattern GDP2*b* may be spaced apart from each other in the first direction DR1 with the first pen sensing electrode 230*b* disposed therebetween.

For example, each of the first ground pattern GDP1*b* and the second ground pattern GDP2*b* may have substantially the same shape as the first divided touch electrodes 210*dv*1*b* and 210*dv*2*b* and/or the first pen sensing electrode 230*b*. Each of the first ground pattern GDP1*b* and the second ground pattern GDP2*b* may include two portions having different shapes. Each of the first ground pattern GDP1*b* and the second ground pattern GDP2*b* may portions that have a rhombic shape and portions that have a bar shape extending in the second direction DR2.

Figure 37:
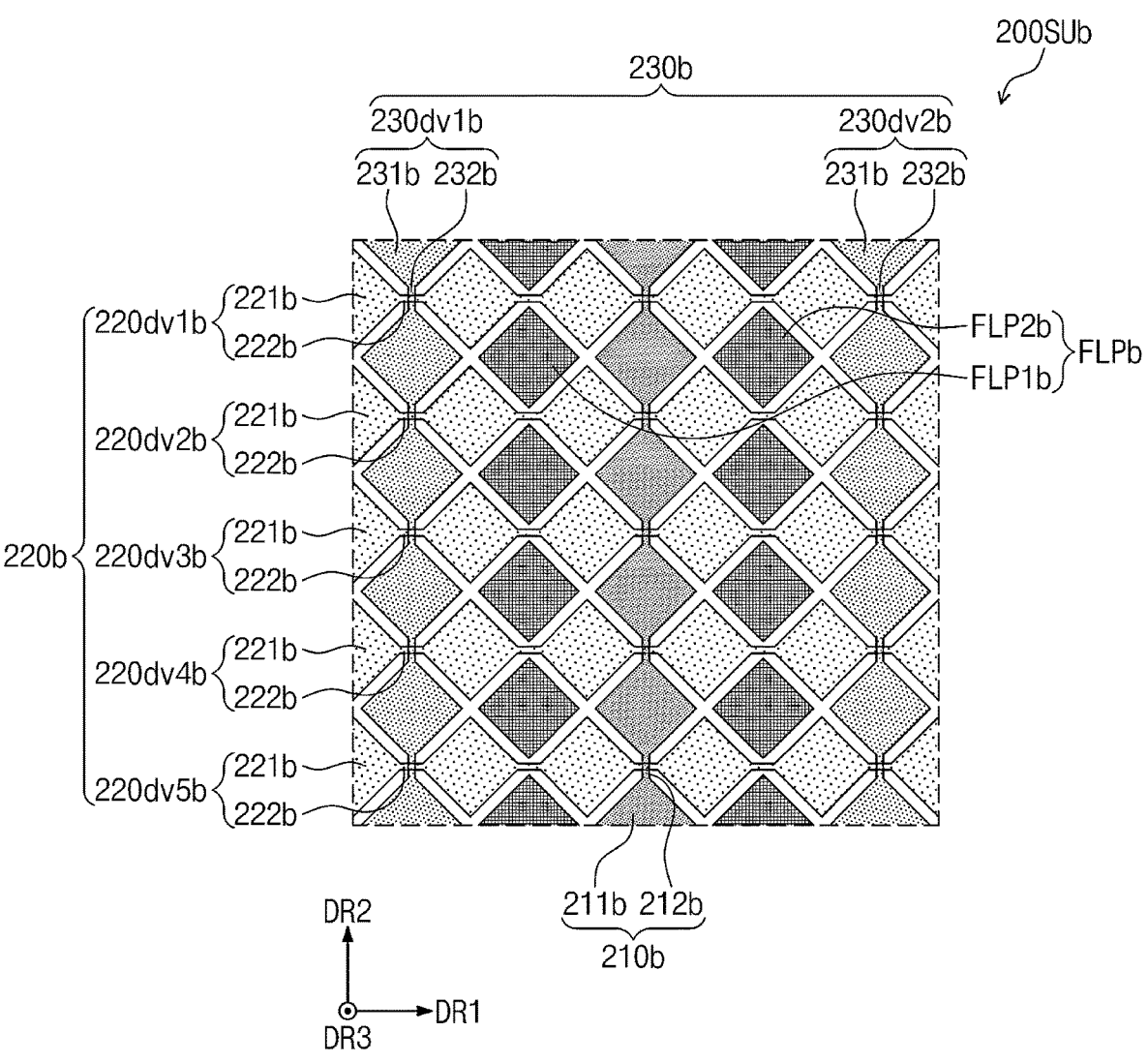
Figure 38:
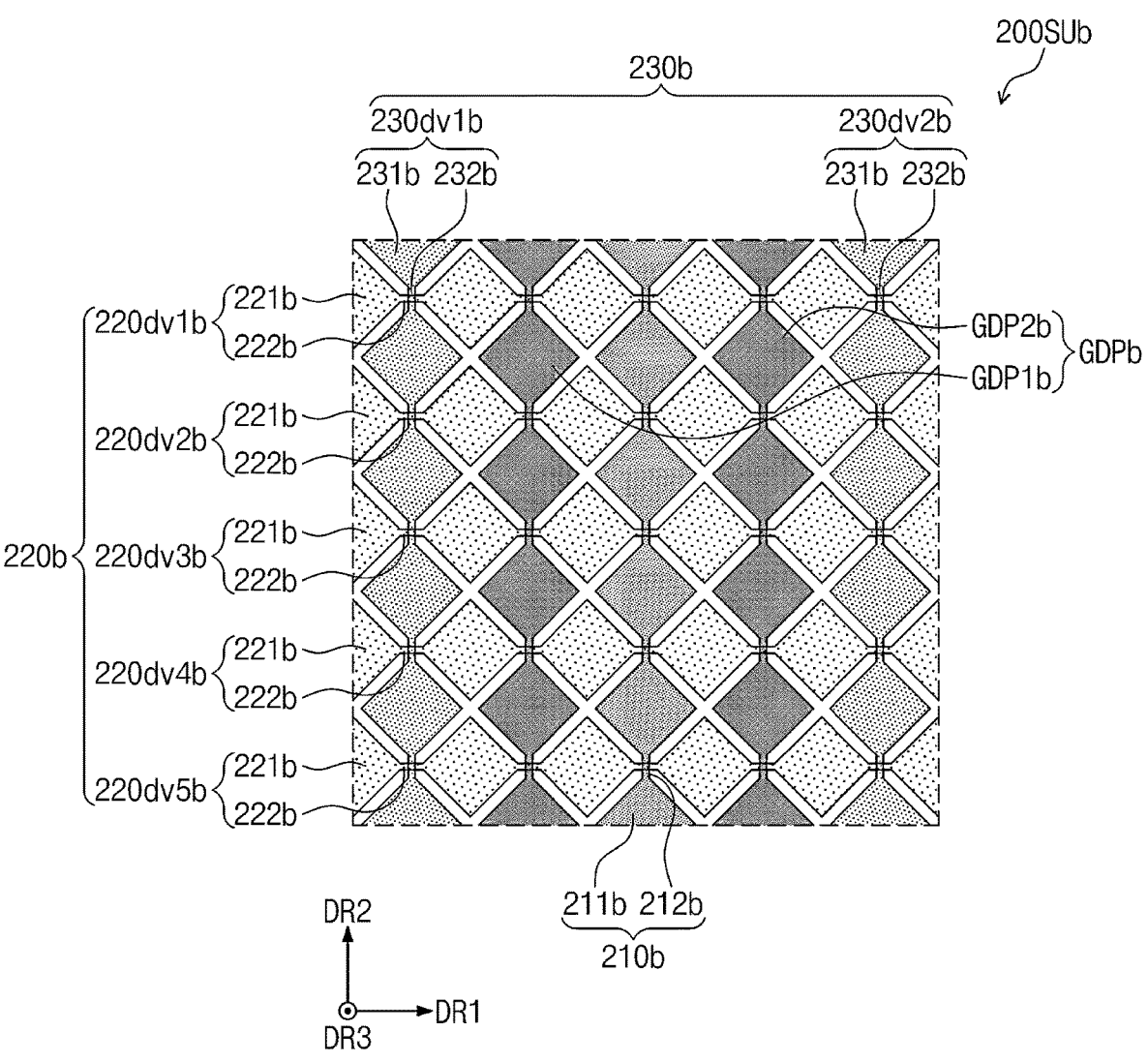

FIGS. 37 and 38 are enlarged plan views illustrating one sensing unit 200SUb in the sensor layer 200 (refer to FIG. 5) according to an embodiment of the present disclosure.

Referring to FIGS. 37 and 38, in an embodiment, a first touch sensing electrode 210*b* might not include separate divided electrodes in the one sensing unit 200SUb and may be disposed as one electrode. The first touch sensing electrode 210*b* may include first sensing portions 211*b* and first bridge portions 212*b*. A first pen sensing electrode 230*b* may include two first divided pen electrodes 230*dv*1*b* and 230*dv*2*b* in the one sensing unit 200SUb. Each of the first divided pen electrodes 230*dv*1*b* and 230*dv*2*b* may include third sensing portions 231*b* and third bridge portions 232*b*.

In the one sensing unit 200SUb, the first touch sensing electrode 210*b* may be disposed between the two first divided pen electrodes 230*dv*1*b* and 230*dv*2*b*. The first sensing portions 211*b* of the first touch sensing electrode 210*b*, the third sensing portions 231*b* of one of the two first divided pen electrodes 230*dv*1*b* and 230*dv*2*b*, and the third sensing portions 231*b* of the other one of the two first divided pen electrodes 230*dv*1*b* and 230*dv*2*b* may be arranged in the first direction DR1 so as to be spaced apart from each other.

The description given above with reference to FIGS. 34 to 35B may be identically applied to a second touch sensing electrode 220*b*.

As illustrated in FIG. 37, the sensor layer 200 (refer to FIG. 5) according to an embodiment may further include floating patterns FLPb. Alternatively, as illustrated in FIG. 38, the sensor layer 200 (refer to FIG. 5) according to an embodiment may further include ground patterns GDPb.

Figure 39A:
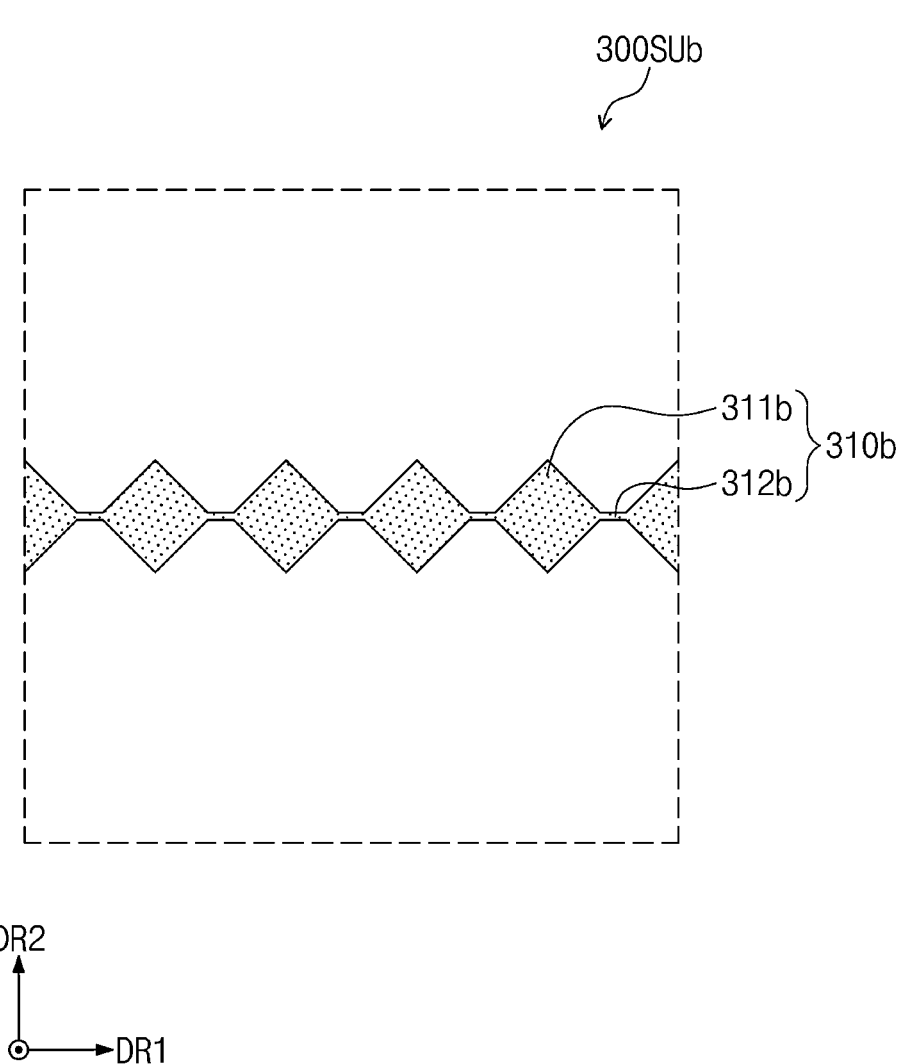
FIGS. 39A and 39B are plan views illustrating one sensing unit in the lower conductive layer according to an embodiment of the present disclosure.
Figure 39B:
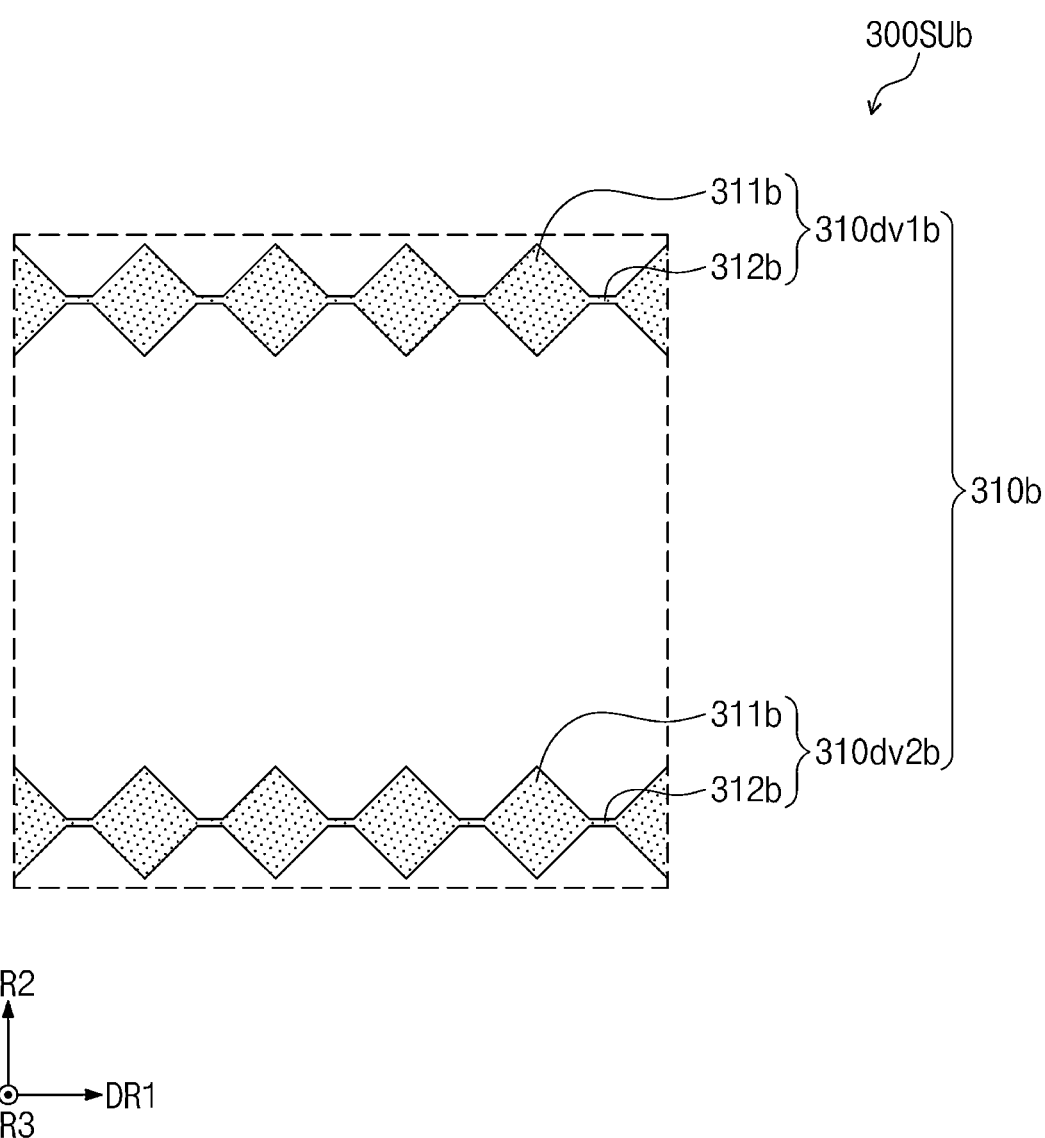

FIGS. 39A and 39B are plan views illustrating one sensing unit 300SUb in the lower conductive layer 300 (refer to FIGS. 4A to 4D) according to an embodiment of the present disclosure.

Referring to FIG. 39A, in an embodiment, the lower conductive layer 300 (refer to FIGS. 4A to 4D) may include a second pen sensing electrode 310*b*. In an embodiment, the second pen sensing electrode 310*b* might not include separate divided electrodes in the one sensing unit 300SUb and may be disposed as one electrode. The one electrode may be disposed in a central portion of the sensing unit 300SUb. The second pen sensing electrode 310*b* may include two portions having different shapes. The second pen sensing electrode 310*b* may include fourth sensing portions 311*b* and fourth bridge portions 312*b*.

In an embodiment, the fourth sensing portions 311*b* and the fourth bridge portions 312*b* included in the second pen sensing electrode 310*b* may have a single-body shape. In an embodiment, the fourth sensing portions 311*b* may have a rhombic shape. The fourth bridge portions 312*b* may connect the fourth sensing portions 311*b* adjacent to each other and may have a bar shape extending in the first direction DR1.

In the one sensing unit 300SUb, the second pen sensing electrode 310*b* may include six fourth sensing portions 311*b* and five four bridge portions 312*b*. Among the six fourth sensing portions 311*b*, four fourth sensing portions 311*b* may include an entire area of a rhombic shape, and the remaining two fourth sensing portions 311*b* may include a partial area corresponding to half of a rhombic shape. The total area of the fourth sensing portions 311*b* included in the second pen sensing electrode 310*b* in the one sensing unit 300SUb may be equal to the sum of the areas of five fourth sensing portions 311*b* having a rhombic shape.

Referring to FIG. 39B, in an embodiment, the lower conductive layer 300 (refer to FIGS. 4A to 4D) may include the second pen sensing electrode 310*b*. In an embodiment, the second pen sensing electrode 310*b* may include two second divided pen electrodes 310*dv*1*b* and 310*dv*2*b* in the one sensing unit 300SUb. The two second divided pen electrodes 310*dv*1*b* and 310*dv*2*b* may be disposed in an upper edge portion and a lower edge portion of the sensing unit 300SUb, respectively. Each of the second divided pen electrodes 310*dv*1*b* and 310*dv*2*b* may include fourth sensing portions 311*b* and fourth bridge portions 312*b*.

Figure 40:
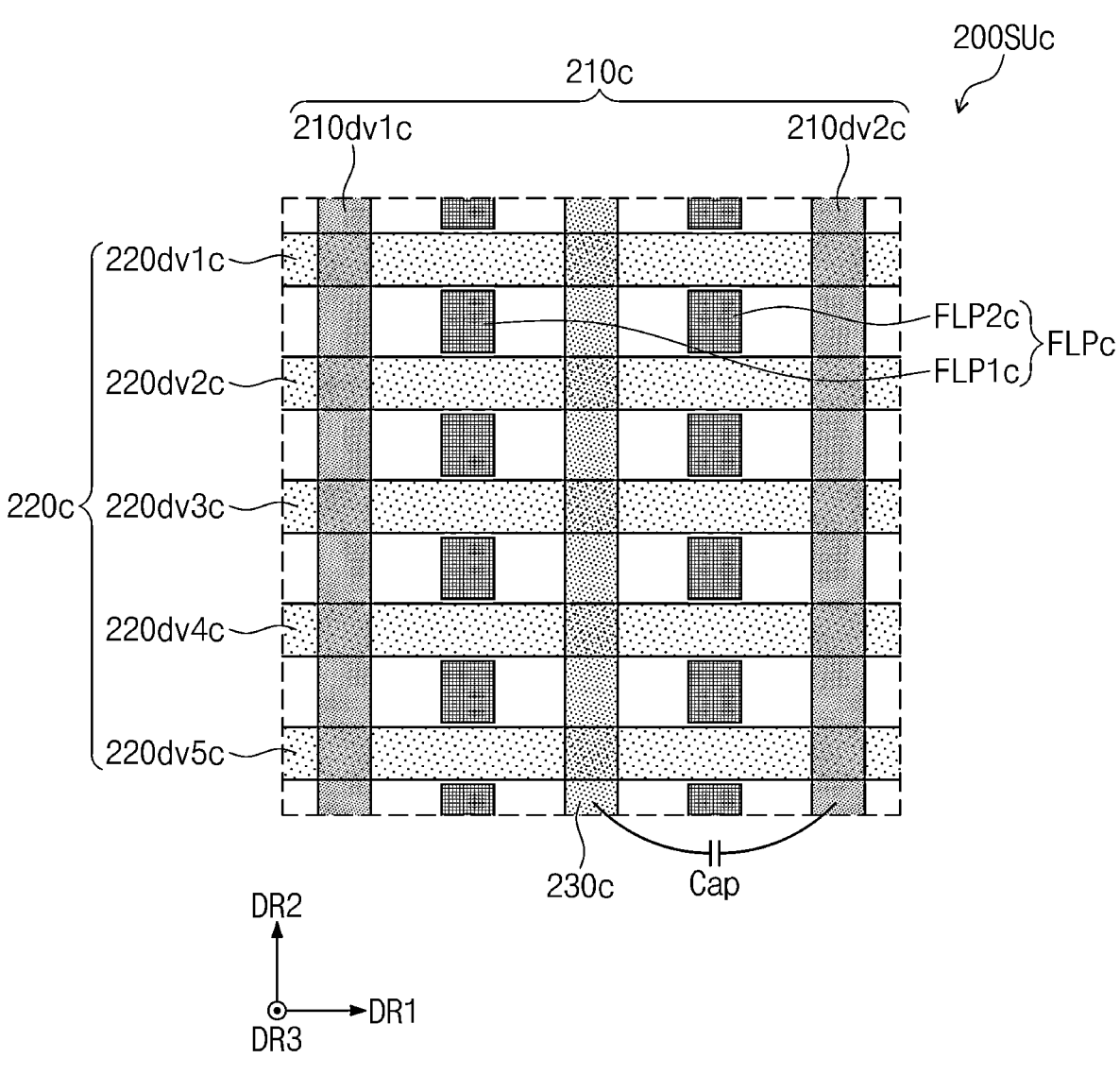
FIGS. 40 to 43 are enlarged plan views illustrating one sensing unit in the sensor layer according to an embodiment of the present disclosure.

FIG. 40 is an enlarged plan view illustrating one sensing unit 200SUc in the sensor layer 200 (refer to FIG. 5) according to an embodiment of the present disclosure.

Referring to FIG. 40, the sensor layer 200 (refer to FIG. 5) may include a first touch sensing electrode 210*c*, a second touch sensing electrode 220*c*, and a first pen sensing electrode 230*c*.

The first touch sensing electrode 210*c* may include two first divided touch electrodes 210*dv*1*c* and 210*dv*2*c* in the one sensing unit 200SUc. Each of the first divided touch electrodes 210*dv*1*c* and 210*dv*2*c* may have a bar shape that has a substantially constant width in the first direction DR1.

For example, each of the first divided touch electrodes 210$dv$1$c$ and 210$dv$2$c$ might not include portions having different shapes.

The second touch sensing electrode 220$c$ may include five second divided touch electrodes 220$dv$1$c$, 220$dv$2$c$, 220$dv$3$c$, 220$dv$4$c$, and 220$dv$5$c$ in the one sensing unit 200SUc.

According to an embodiment of the present disclosure, each of the second divided touch electrodes 220$dv$1$c$, 220$dv$2$c$, 220$dv$3$c$, 220$dv$4$c$, and 220$dv$5$c$ may have a bar shape having a substantially constant width in the second direction DR2. For example, each of the second divided touch electrodes 220$dv$1$c$, 220$dv$2$c$, 220$dv$3$c$, 220$dv$4$c$, and 220$dv$5$c$ might not include portions having different shapes. Each of the second divided touch electrodes 220$dv$1$c$, 220$dv$2$c$, 220$dv$3$c$, 220$dv$4$c$, and 220$dv$5$c$ may be disposed on a layer different from the layer on which the first divided touch electrodes 210$dv$1$c$ and 210$dv$2$c$ and the first pen sensing electrode 230$c$ are disposed.

According to an embodiment of the present disclosure, each of the second divided touch electrodes 220$dv$1$c$, 220$dv$2$c$, 220$dv$3$c$, 220$dv$4$c$, and 220$dv$5$c$ may include second sensing portions 221$c$ and second bridge portions 222$c$ disposed on different layers. Each of the second sensing portions 221$c$ and the second bridge portions 222$c$ may have a bar shape that has a substantially constant with in the second direction DR2. The second sensing portions 22$cl$ may alternate with the second bridge portions 222$c$ in the first direction DR1. The first divided touch electrodes 210$dv$1$c$ and 210$dv$2$c$ and the first pen sensing electrode 230$c$ may be insulated from the second bridge portions 222$c$ of the second divided touch electrodes 220$dv$1$c$, 220$dv$2$c$, 220$dv$3$c$, 220$dv$4$c$, and 220$dv$5$c$ and may cross the second bridge portions 222$c$ of the second divided touch electrodes 220$dv$1$c$, 220$dv$2$c$, 220$dv$3$c$, 220$dv$4$c$, and 220$dv$5$c$. The second bridge portions 222$c$ may be disposed on a layer different from the layer on which the first divided touch electrodes 210$dv$1$c$ and 210$dv$2$c$ and the first pen sensing electrode 230$c$ are disposed.

The first pen sensing electrode 230$c$ might not include separate divided electrodes in the one sensing unit 200SUc and may be disposed as one electrode. The first pen sensing electrode 230$c$ may have a bar shape that has a substantially constant width in the first direction DR1. For example, the first pen sensing electrode 230$c$ might not include portions having different shapes.

In an embodiment, the sensor layer 200 (refer to FIG. 5) may further include floating patterns FLPc. In the one sensing unit 200SUc, the floating patterns FLPc may include first group patterns FLP1$c$ and second group patterns FLP2$c$. The first group patterns FLP1$c$ may be disposed between the first pen sensing electrode 230$c$ and the first divided touch electrode 210$dv$1$c$. In addition, the first group patterns FLP1$c$ may be disposed between the second divided touch electrodes 220$dv$1$c$, 220$dv$2$c$, 220$dv$3$c$, 220$dv$4$c$, and 220$dv$5$c$ adjacent to each other. The second group patterns FLP2$c$ may be disposed between the first pen sensing electrode 230$c$ and the first divided touch electrode 210$dv$2$c$. In addition, the second group patterns FLP2$c$ may be disposed between the second divided touch electrodes 220$dv$1$c$, 220$dv$2$c$, 220$dv$3$c$, 220$dv$4$c$, and 220$dv$5$c$ adjacent to each other. Each of the floating patterns FLPc may have a rectangular shape having edges extending in the first direction DR1 and the second direction DR2.

In an embodiment, the floating patterns FLPc may be disposed on the same layer as the first touch sensing electrode 210$c$ and the first pen sensing electrode 230$c$. The floating patterns FLPc may be included in the second conductive layer 204 (refer to FIG. 7). However, embodiments are not necessarily limited thereto, and the floating patterns FLPc may be included in the first conductive layer 202 (refer to FIG. 7).

The pitch of sensing units in the embodiment described with reference to FIG. 40 may be equal to the pitch of the sensing units in the embodiment described with reference to FIGS. 20A to 24. In this case, the widths of the first divided touch electrodes 210$dv$1$c$ and 210$dv$2$c$, the second divided touch electrodes 220$dv$1$c$, 220$dv$2$c$, 220$dv$3$c$, 220$dv$4$c$, and 220$dv$5$c$, and the first pen sensing electrode 230$c$ in the embodiment described with reference to FIG. 40 may be smaller than the widths of the first divided touch electrodes 210$dv$1$a$ and 210$dv$2$a$, the second divided touch electrodes 220$dv$1$a$, 220$dv$2$a$, and 220$dv$3$a$, and the first pen sensing electrode 230$a$ in the embodiment described with reference to FIGS. 20A to 24.

Figure 41:
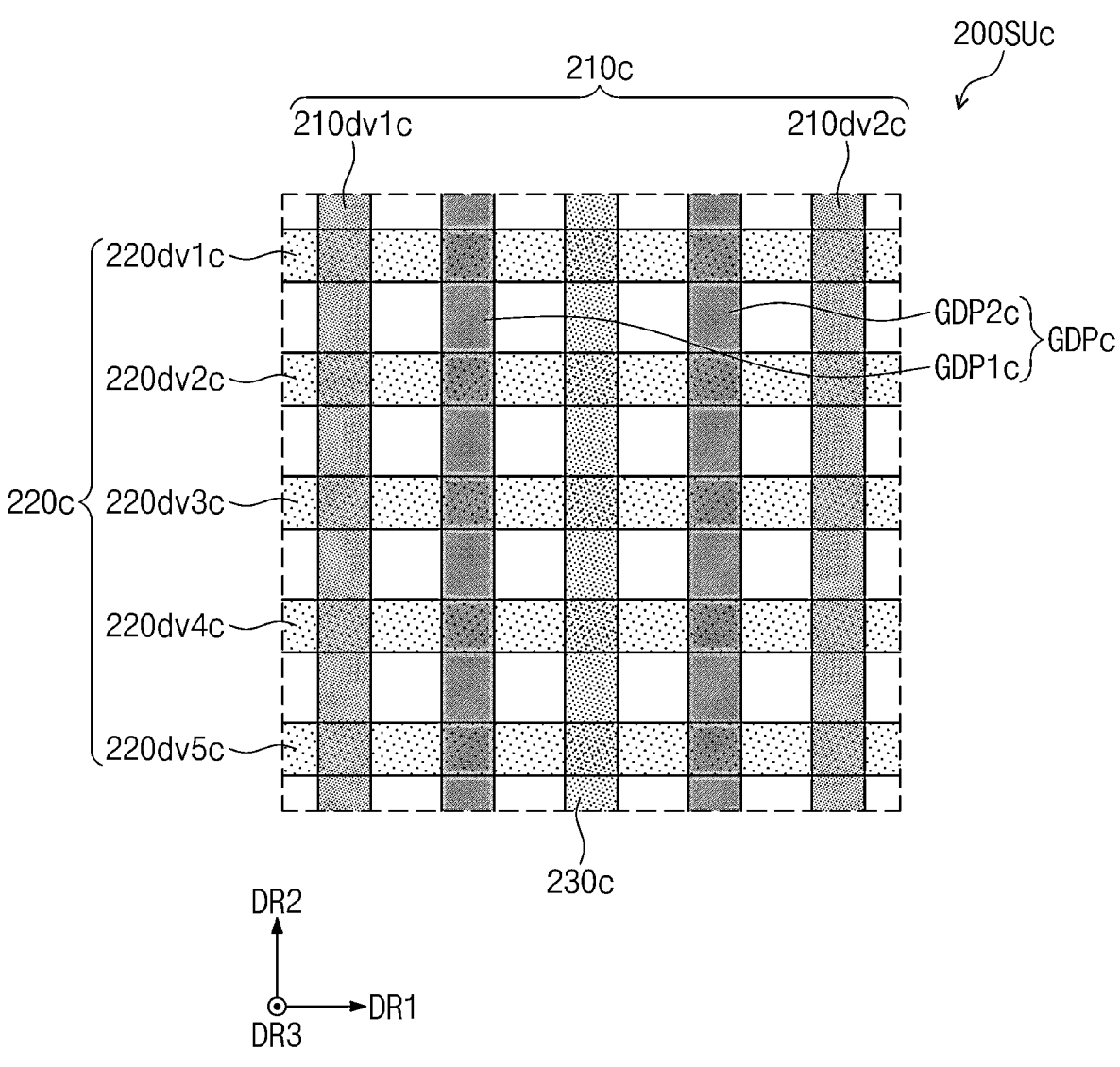

FIG. 41 is an enlarged plan view illustrating one sensing unit 200SUc in the sensor layer 200 (refer to FIG. 5) according to an embodiment of the present disclosure.

Referring to FIG. 41, the sensor layer 200 (refer to FIG. 5) may include a first touch sensing electrode 210$c$, a second touch sensing electrode 220$c$, and a first pen sensing electrode 230$c$. The description given above with reference to FIG. 40 may be identically applied to the first touch sensing electrode 210$c$, the second touch sensing electrode 220$c$, and the first pen sensing electrode 230$c$.

In an embodiment, the sensor layer 200 (refer to FIG. 5) may further include ground patterns GDPc. Each of the ground patterns GDPc may be grounded. For example, each of the ground patterns GDPc may be regarded as being grounded. In the one sensing unit 200SUc, the ground patterns GDPc may include a first group pattern GDP1$c$ and a second group pattern GDP2$c$. The first ground pattern GDP1$c$ may be disposed between the first pen sensing electrode 230$c$ and a first divided touch electrode 210$dv$1$c$. The second ground pattern GDP2$c$ may be disposed between the first pen sensing electrode 230$c$ and a first divided touch electrode 210$dv$2$c$.

Each of the first ground pattern GDP1$c$ and the second ground pattern GDP2$c$ may extend in the second direction DR2. Each of the first ground pattern GDP1$c$ and the second ground pattern GDP2$c$ may have a bar shape extending in the second direction DR2. The first ground pattern GDP1$b$ and the second ground pattern GDP2$c$ may be spaced apart from each other in the first direction DR1 with the first pen sensing electrode 230$c$ disposed therebetween.

Figure 42:
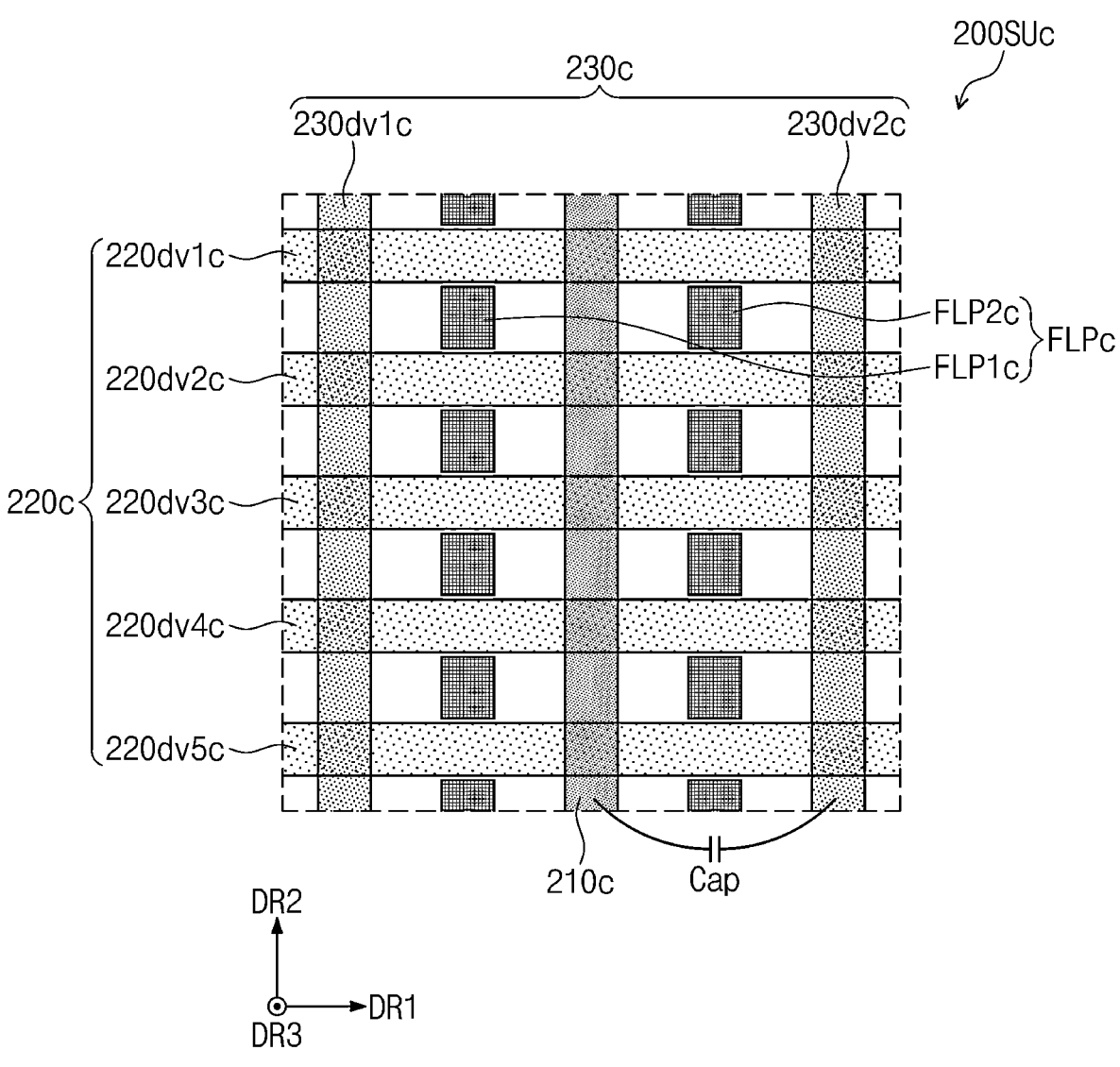
Figure 43:
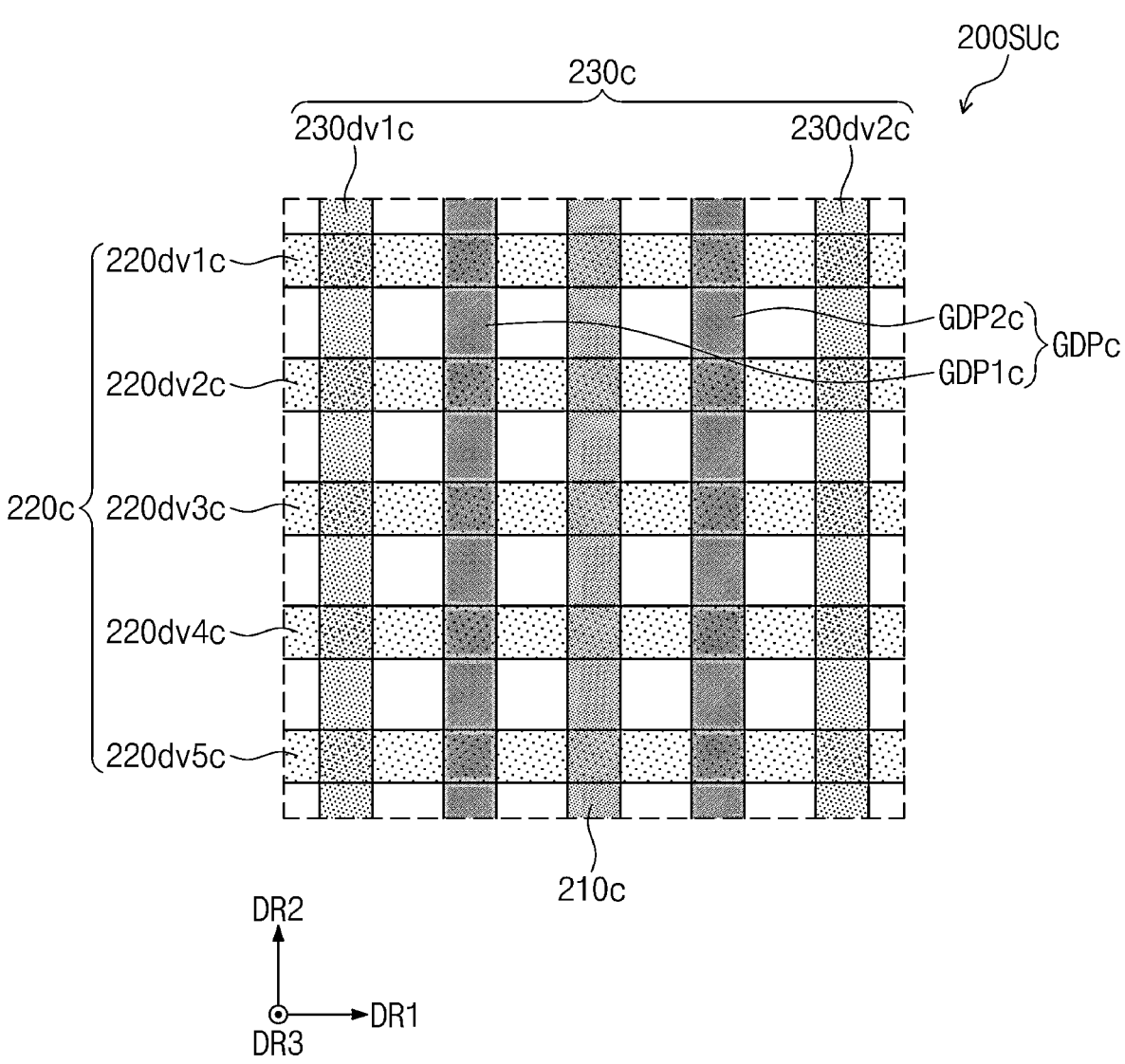

FIGS. 42 and 43 are enlarged plan views illustrating one sensing unit 200SUc in the sensor layer 200 (refer to FIG. 5) according to an embodiment of the present disclosure.

Referring to FIGS. 42 and 43, in an embodiment, a first touch sensing electrode 210$c$ might not include separate divided electrodes in the one sensing unit 200SUc and may be disposed as one electrode. The first touch sensing electrode 210$c$ may have a bar shape that has a substantially constant width in the first direction DR1. For example, the first touch sensing electrode 210$c$ might not include portions having different shapes. A first pen sensing electrode 230$c$ may include two first divided pen electrodes 230$dv$1$c$ and 230$dv$2$c$ in the one sensing unit 200SUc. Each of the first divided pen electrodes 230$dv$1$c$ and 230$dv$2$c$ may have a bar shape that has a substantially constant width in the first direction DR1. In the one sensing unit 200SUc, the first touch sensing electrode 210$c$ may be disposed between the two first divided pen electrodes 230$dv$1$c$ and 230$dv$2$c$.

The description given above with reference to FIGS. 40 and 41 may be identically applied to a second touch sensing electrode 220c.

As illustrated in FIG. 42, the sensor layer 200 (refer to FIG. 5) according to an embodiment may further include floating patterns FLPc. Alternatively, as illustrated in FIG. 43, the sensor layer 200 (refer to FIG. 5) according to an embodiment may further include ground patterns GDPc.

Figure 44A:
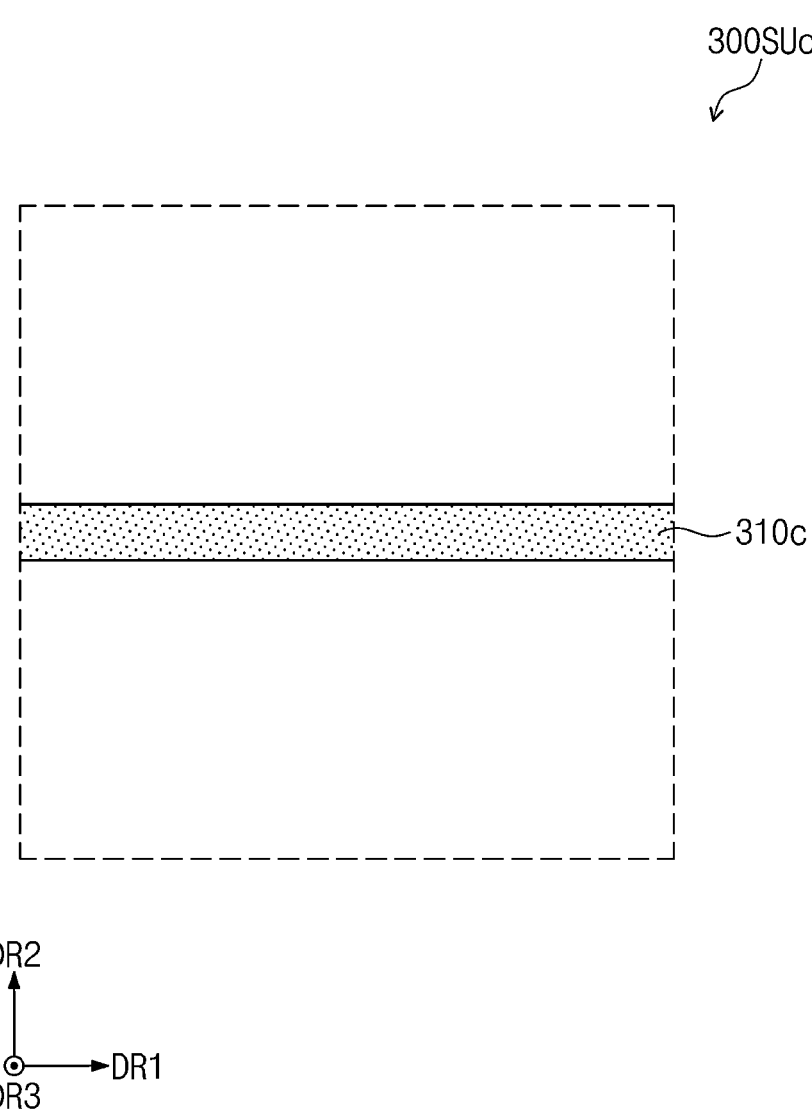
FIGS. 44A and 44B are plan views illustrating one sensing unit in the lower conductive layer according to an embodiment of the present disclosure.
Figure 44B:
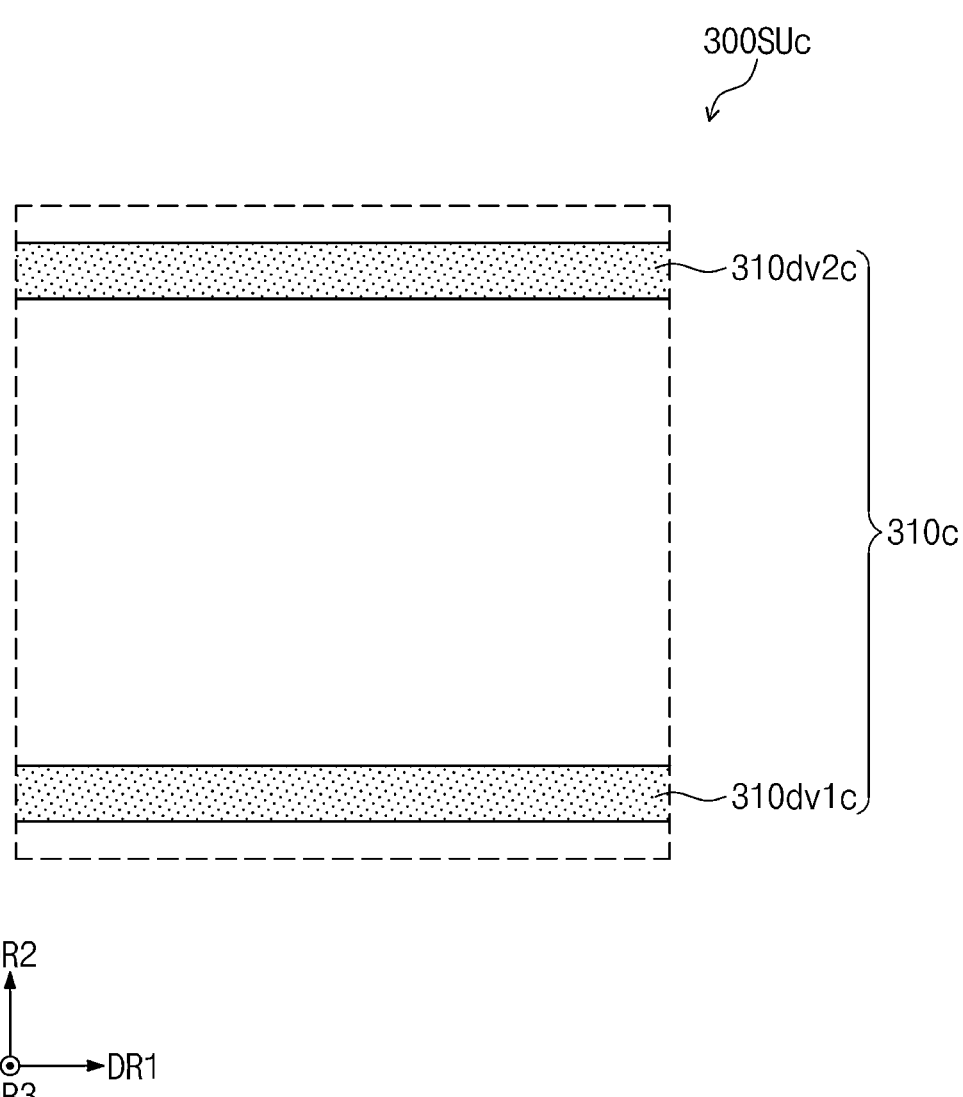

FIGS. 44A and 44B are plan views illustrating one sensing unit 300SUc in the lower conductive layer 300 (refer to FIGS. 4A to 4D) according to an embodiment of the present disclosure.

Referring to FIG. 44A, in an embodiment, the lower conductive layer 300 (refer to FIGS. 4A to 4D) may include a second pen sensing electrode 310c. In an embodiment, the second pen sensing electrode 310c might not include separate divided electrodes in the one sensing unit 300SUc and may be disposed as one electrode. The one electrode may be disposed in a central portion of the sensing unit 300SUc. The second pen sensing electrode 310c may have a bar shape that has a substantially constant width in the first direction DR1.

Referring to FIG. 44B, in an embodiment, the lower conductive layer 300 (refer to FIGS. 4A to 4D) may include the second pen sensing electrode 310c. In an embodiment, the second pen sensing electrode 310c may include two second divided pen electrodes 310dv1c and 310dv2c in the one sensing unit 300SUc. The two second divided pen electrodes 310dv1c and 310dv2c may be disposed in an upper edge portion and a lower edge portion of the sensing unit 300SUc, respectively. Each of the second divided pen electrodes 310dv1c and 310dv2c may have a bar shape that has a substantially constant width in the first direction DR1.

Figure 45:
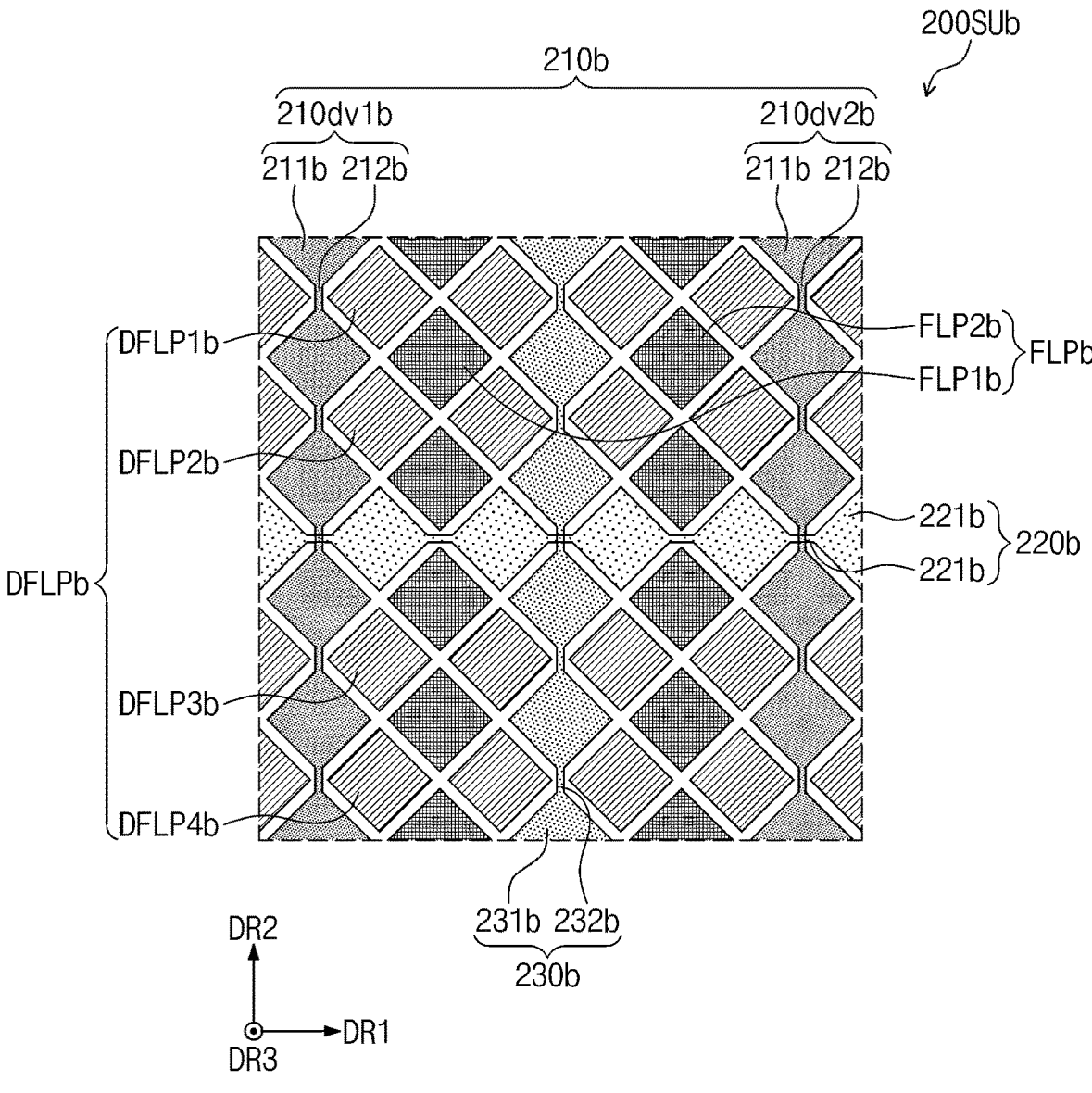
FIGS. 45 and 46 are enlarged plan views illustrating one sensing unit in the sensor layer according to an embodiment of the present disclosure.

FIG. 45 is an enlarged plan view illustrating one sensing unit 200SUb in the sensor layer 200 (refer to FIG. 5) according to an embodiment of the present disclosure.

Referring to FIG. 45, in an embodiment, a first touch sensing electrode 210b may include two first divided touch electrodes 210dv1b and 210dv2b in the one sensing unit 200SUb. A first pen sensing electrode 230b might not include separate divided electrodes in the one sensing unit 200SUb and may be disposed as one electrode.

A second touch sensing electrode 220b might not include separate divided electrodes in the one sensing unit 200SUb and may be disposed as one electrode. The second touch sensing electrode 220b may include two portions having different shapes. The second touch sensing electrode 220b may include second sensing portions 221b and second bridge portions 222b. Although FIG. 45 illustrates an example that the second sensing portions 221b and the second bridge portions 222b have a single-body shape, the present disclosure is not necessarily limited thereto. For example, the second sensing portions 221b and the second bridge portions 222b may be disposed on different layers and may be connected with each other through a contact hole CN (refer to FIG. 35A).

In an embodiment of the present disclosure, the sensor layer 200 (refer to FIG. 5) may further include floating patterns FLPb and dummy patterns DFLPb. Each of the floating patterns FLPb may be electrically floated. Each of the dummy patterns DFLPb may be electrically floated. However, without necessarily being limited thereto, each of the dummy patterns DFLPb may be grounded.

In the one sensing unit 200SUb, the dummy patterns DFLPb may include first group dummy patterns DFLP1b, second group dummy patterns DFLP2b, third group dummy patterns DFLP3b, and fourth group dummy patterns DFLP4b. The first and second group dummy patterns DFLP1b and DFLP2b may be spaced apart from the second touch sensing electrode 220b in the second direction DR2, and the third and fourth group dummy patterns DFLP3b and DFLP4b may be spaced apart from the second touch sensing electrode 220b in the direction opposite to the second direction DR2.

The first group dummy patterns DFLP1b may be arranged in the first direction DR1 so as to be spaced apart from each other, and the second group dummy patterns DFLP2b may be arranged in the first direction DR1 so as to be spaced apart from each other. The first group dummy patterns DFLP1b and the second group dummy patterns DFLP2b may be spaced apart from each other in the second direction DR2. The third group dummy patterns DFLP3b may be arranged in the first direction DR1 so as to be spaced apart from each other, and the fourth group dummy patterns DFLP4b may be arranged in the first direction DR1 so as to be spaced apart from each other. The third group dummy patterns DFLP3b and the fourth group dummy patterns DFLP4b may be spaced apart from each other in the second direction DR2.

Each of the first group dummy patterns DFLP1b may have a rhombic shape. In the one sensing unit 200SUb, the first group dummy patterns DFLP1b may include six patterns. Among the six patterns, four patterns may include an entire area of a rhombic shape, and the remaining two patterns may include a partial area corresponding to half of a rhombic shape. The second to fourth group dummy patterns DFLP2b, DFLP3b, and DFLP4b may also the same form as the first group dummy patterns DFLP1b.

The embodiment illustrated in FIG. 45 may be the same as the case in which in the embodiment described with reference to FIG. 34, the two second divided touch electrodes 220dv1b and 220dv2b (refer to FIG. 34) disposed on the upper side and the two second divided touch electrodes 220dv4b and 220dv5b (refer to FIG. 34) disposed on the lower side among the five second divided touch electrodes 220dv1b, 220dv2b, 220dv3b, 220dv4b, and 220dv5b (refer to FIG. 34) are omitted and the dummy patterns DFLPb are disposed to correspond to the second sensing portions 221b of the omitted four second divided touch electrodes 220dv1b, 220dv2b, 220dv4b, and 220dv5b (refer to FIG. 34).

Figure 46:
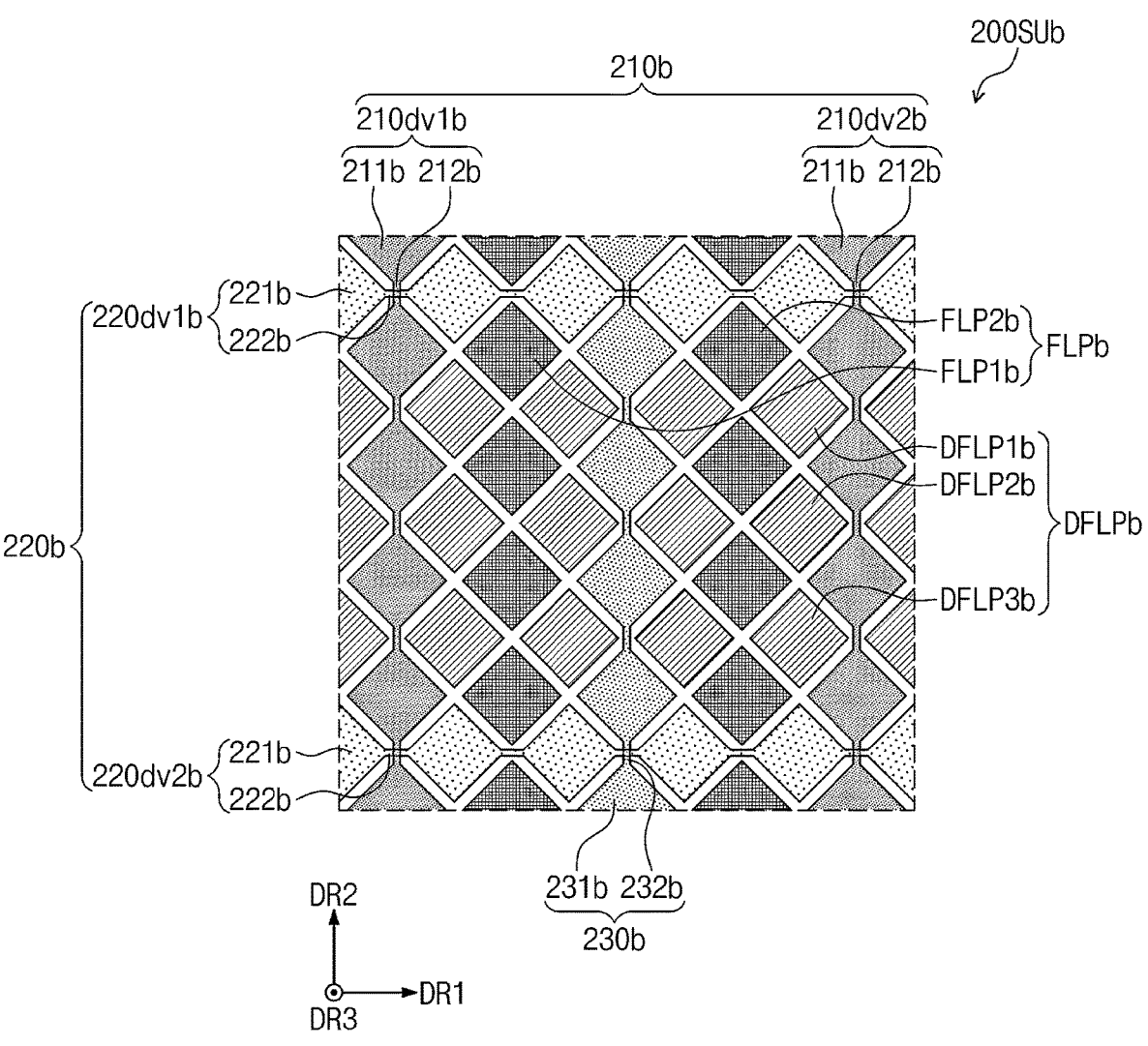

FIG. 46 is an enlarged plan view illustrating one sensing unit 200SUb in the sensor layer 200 (refer to FIG. 5) according to an embodiment of the present disclosure.

Referring to FIG. 46, in an embodiment, a second touch sensing electrode 220b may include two second divided touch electrodes 220dv1b and 220dv2b in the one sensing unit 200SUb. The two second divided touch electrodes 220dv1b and 220dv2b may be disposed in an upper edge portion and a lower edge portion of the sensing unit 200SUb, respectively. Each of the two second divided touch electrodes 220dv1b and 220dv2b may include second sensing portions 221b and second bridge portions 222b.

In an embodiment of the present disclosure, the sensor layer 200 (refer to FIG. 5) may further include floating patterns FLPb and dummy patterns DFLPb. In the one sensing unit 200SUb, the dummy patterns DFLPb may include first group dummy patterns DFLP1b, second group dummy patterns DFLP2b, and third group dummy patterns DFLP3b. The first to third group dummy patterns DFLP1b, DFLP2b, and DFLP3b may be disposed between the two second divided touch electrodes 220dv1b and 220dv2b.

The first group dummy patterns DFLP1b may be arranged in the first direction DR1 so as to be spaced apart from each other, the second group dummy patterns DFLP2b may be arranged in the first direction DR1 so as to be spaced apart from each other, and the third group dummy patterns DFLP3*b* may be arranged in the first direction DR1 so as to be spaced apart from each other. The first group dummy patterns DFLP1*b*, the second group dummy patterns DFLP2*b*, and the third group dummy patterns DFLP3*b* may be spaced apart from each other in the second direction DR2.

The embodiment illustrated in FIG. 46 may be the same as the case in which in the embodiment described with reference to FIG. 34, the three second divided touch electrodes 220*dv*2*b*, 220*dv*3*b*, and 220*dv*4*b* (refer to FIG. 34) disposed in the central portion among the five second divided touch electrodes 220*dv*1*b*, 220*dv*2*b*, 220*dv*3*b*, 220*dv*4*b*, and 220*dv*5*b* (refer to FIG. 34) are omitted and the dummy patterns DFLPb are disposed to correspond to the second sensing portions 221*b* of the omitted three second divided touch electrodes 220*dv*2*b*, 220*dv*3*b*, and 220*dv*4*b* (refer to FIG. 34).

According to the embodiments of the present disclosure, not only a touch input but also an input by a pen may be sensed using the sensor layer. Accordingly, a separate component (e.g., a digitizer) for sensing a pen does not need to be added to the electronic device, and thus an increase in the thickness and weight of the electronic device and a decrease in the flexibility of the electronic device depending on the addition of the digitizer might not occur.

According to the embodiments of the present disclosure, the capacitance between the touch sensing electrodes and the pen sensing electrodes may be reduced. Accordingly, the signal to noise ratio (SNR) may be increased, and thus the electronic device with increased sensing sensitivity may be provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device, comprising:
a display layer;
a sensor layer disposed over the display layer; and
a lower conductive layer disposed under the display layer,
wherein the sensor layer includes:
    a plurality of first electrodes arranged in a first direction and extending in a second direction crossing the first direction;
    a plurality of second electrodes arranged in the second direction and extending in the first direction; and
    a plurality of third electrodes either arranged in the first direction and extending in the second direction or arranged in the second direction and extending in the first direction, the plurality of third electrodes having first ends connected together,
wherein the lower conductive layer includes a plurality of fourth electrodes arranged in the direction of extension of the plurality of third electrodes and extending in the direction of arrangement of the third electrodes, the plurality of fourth electrodes have first ends connected together,
wherein the plurality of third electrodes of the sensor layer and the plurality of fourth electrodes of the lower conductive layer are configured to work together to detect electromagnetic resonance signals from a stylus or pen, and
wherein the plurality of third electrodes of the sensor layer are spaced apart from the plurality of fourth electrodes of the lower conductive layer by the display layer which is disposed between the sensor layer and the lower conductive layer.

2. The electronic device of claim 1, wherein the plurality of first electrodes and the plurality of third electrodes are disposed on a same layer,
wherein the direction of extension of the third electrodes corresponds to the first direction or the second direction, and
wherein the plurality of first electrodes alternate with the plurality of third electrodes.

3. The electronic device of claim 1, wherein the plurality of second electrodes and the plurality of third electrodes are disposed on a same layer,
wherein the direction of extension of the third electrodes corresponds to the first direction or the second direction, and
wherein the plurality of second electrodes alternate with the plurality of third electrodes.

4. The electronic device of claim 1, wherein each of the plurality of first electrodes, the plurality of second electrodes, and the plurality of third electrodes includes sensing portions having a rhombic shape and bridge portions, each of which is disposed between sensing portions adjacent to each other among the sensing portions.

5. The electronic device of claim 4, wherein the sensing portions and the bridge portions of each of the plurality of first electrodes, the plurality of second electrodes, and the plurality of third electrodes have a single-body shape, and
wherein the plurality of second electrodes are disposed on a layer different from a layer on which the plurality of first electrodes and the plurality of third electrodes are disposed.

6. The electronic device of claim 4, wherein the sensing portions and the bridge portions of each of the plurality of first electrodes and the plurality of third electrodes have a single-body shape, and
wherein the sensing portions and the bridge portions of each of the plurality of second electrodes are disposed on different layers, and the bridge portions of each of the plurality of second electrodes are disposed on a layer different from a layer on which the plurality of first electrodes and the plurality of third electrodes are disposed.

7. The electronic device of claim 4, wherein in one sensing unit of the sensor layer, each of the plurality of first electrodes, the plurality of second electrodes, and the plurality of third electrodes includes four sensing portions and three bridge portions, and
wherein among the four sensing portions, a first two sensing portions have a rhombic shape, and a second two sensing portions have a half-rhombic shape.

8. The electronic device of claim 4, wherein in one sensing unit of the sensor layer, each of the plurality of first electrodes, the plurality of second electrodes, and the plurality of third electrodes includes six sensing portions and five bridge portions, and
wherein among the six sensing portions, four sensing portions have a rhombic shape, and two sensing portions have a half-rhombic shape.

9. The electronic device of claim 4, wherein each of the plurality of fourth electrodes includes sensing portions having a rhombic shape and bridge portions, each of which is disposed between sensing portions adjacent to each other among the sensing portions.

10. The electronic device of claim 1, wherein each of the plurality of first electrodes, the plurality of second electrodes, and the plurality of third electrodes has a bar shape extending in a same direction.

11. The electronic device of claim 10, wherein each of the plurality of first electrodes, the plurality of second electrodes, and the plurality of third electrodes has a single-body shape, and wherein the plurality of second electrodes are disposed on a layer different from a layer on which the plurality of first electrodes and the plurality of third electrodes are disposed.

12. The electronic device of claim 11, wherein each of the plurality of first electrodes and the plurality of third electrodes has a single-body shape, wherein each of the plurality of second electrodes includes sensing portions and bridge portions disposed on different layers, and each of the plurality of first electrodes and the plurality of third electrodes crosses a corresponding bridge portion among the bridge portions of each of the plurality of second electrodes, and wherein the bridge portions of each of the plurality of second electrodes are disposed on a layer different from a layer on which the plurality of first electrodes and the plurality of third electrodes are disposed.

13. The electronic device of claim 11, wherein each of the plurality of fourth electrodes has a bar shape extending in a same direction.

14. The electronic device of claim 1, wherein the sensor layer further includes floating patterns disposed between a first electrode and a third electrode adjacent to each other among the plurality of first electrodes and the plurality of third electrodes.

15. The electronic device of claim 1, wherein the sensor layer further includes ground patterns disposed between a first electrode and a third electrode adjacent to each other among the plurality of first electrodes and the plurality of third electrodes.

16. An electronic device, comprising:

a display layer;

a sensor layer disposed over the display layer; and a lower conductive layer disposed under the display layer, wherein the sensor layer includes:

a plurality of first electrodes arranged in a first direction and extending in a second direction crossing the first direction;

a plurality of second electrodes arranged in the second direction and extending in the first direction; and a plurality of third electrodes either arranged in the first direction and extending in the second direction or arranged in the second direction and extending in the first direction, the plurality of third electrodes having first ends connected together, wherein the lower conductive layer includes a plurality of fourth electrodes arranged in the direction of extension of the plurality of third electrodes and extending in the direction of arrangement of the third electrodes, the plurality of fourth electrodes have first ends connected together, wherein each of the plurality of first electrodes includes a first-first divided electrode and a first-second divided electrode connected in parallel, and the first-first divided electrode and the first-second divided electrode each extend in the second direction and are spaced apart from each other in the first direction, and wherein in one sensing unit of the sensor layer, one third electrode is disposed between the first-first divided electrode and the first-second divided electrode connected in parallel.

17. The electronic device of claim 16, wherein each of the plurality of second electrodes includes a second-first divided electrode, a second-second divided electrode, and a second-third divided electrode connected in parallel, and wherein the second-first divided electrode, the second-second divided electrode, and the second-third divided electrode each extend in the first direction and are arranged in the second direction.

18. The electronic device of claim 17, wherein the sensor layer further includes electrically-floated or grounded dummy patterns, and wherein some of the second-first divided electrode, the second-second divided electrode, and the second-third divided electrode are omitted, and the dummy patterns are disposed in areas where the some of the second-first divided electrode, the second-second divided electrode, and the second-third divided electrode are omitted.

19. The electronic device of claim 16, wherein each of the plurality of second electrodes includes a second-first divided electrode, a second-second divided electrode, a second-third divided electrode, a second-fourth divided electrode, and a second-fifth divided electrode connected in parallel, and wherein the second-first divided electrode, the second-second divided electrode, the second-third divided electrode, the second-fourth divided electrode, and the second-fifth divided electrode each extend in the first direction and are arranged in the second direction.

20. The electronic device of claim 19, wherein the sensor layer further includes electrically-floated or grounded dummy patterns, and wherein some of the second-first divided electrode, the second-second divided electrode, the second-third divided electrode, the second-fourth divided electrode, and the second-fifth divided electrode are omitted, and the dummy patterns are disposed in areas where the some of the second-first divided electrode, the second-second divided electrode, the second-third divided electrode, the second-fourth divided electrode, and the second-fifth divided electrode are omitted.

21. The electronic device of claim 1, wherein each of the plurality of third electrodes includes a third-first divided electrode and a third-second divided electrode connected in parallel, and the third-first divided electrode and the third-second divided electrode each extend in the second direction and are spaced apart from each other in the first direction, and wherein in one sensing unit of the sensor layer, one first electrode is disposed between the third-first divided electrode and the third-second divided electrode connected in parallel.

22. The electronic device of claim 1, wherein a pitch of sensing units of the lower conductive layer ranges from 10% less than a pitch of sensing units of the sensor layer to 10% more than the pitch of the sensing units of the sensor layer.

23. The electronic device of claim 1, further comprising:

a sensor driver configured to selectively operate in a first mode to sense a touch input and a second mode to sense a pen input, wherein the plurality of first electrodes and the plurality of second electrodes are configured to be driven in the first mode, and the plurality of third electrodes and the plurality of fourth electrodes are configured to be driven in the second mode.

24. The electronic device of claim 23, wherein the second mode includes a charging drive mode and a pen sensing drive mode, and wherein in the charging drive mode, either the plurality of third electrodes or the plurality of fourth electrodes are driven, and in the pen sensing drive mode, the plurality of third electrodes and the plurality of fourth electrodes are driven.

25. The electronic device of claim 1, further comprising:

a first sensor driver configured to operate in a first mode to sense a touch input; and a second sensor driver configured to operate in a second mode to sense a pen input, wherein the plurality of first electrodes and the plurality of second electrodes are configured to be driven in the first mode, and the plurality of third electrodes and the plurality of fourth electrodes are configured to be driven in the second mode.

26. The electronic device of claim 1, wherein each of the plurality of first electrodes, the plurality of second electrodes, the plurality of third electrodes, and the plurality of fourth electrodes has a mesh shape.

27. The electronic device of claim 1, wherein each of the plurality of first electrodes, the plurality of second electrodes, the plurality of third electrodes, and the plurality of fourth electrodes has a single-layer structure or a multi-layer structure.

28. The electronic device of claim 1, further comprising:

a support plate disposed under the display layer, wherein the lower conductive layer is disposed directly on an upper surface or a lower surface of the support plate.

29. The electronic device of claim 1, further comprising:

a support plate disposed under the display layer; and a lower plate disposed under the support plate, wherein the lower conductive layer is disposed directly on an upper surface or a lower surface of the lower plate.

30. The electronic device of claim 1, further comprising:

a protective film disposed under the display layer; and a support plate disposed under the protective film, wherein the lower conductive layer is disposed between the protective film and the support plate.

31. An electronic device, comprising:

a display layer;

a sensor layer disposed over the display layer; and a lower conductive layer disposed under the display layer, wherein the sensor layer includes:

a plurality of first electrodes arranged in a first direction and extending in a second direction crossing the first direction;

a plurality of second electrodes arranged in the second direction and extending in the first direction; and a plurality of third electrodes either arranged in the first direction and extending in the second direction or arranged in the second direction and extending in the first direction, wherein the lower conductive layer includes a plurality of fourth electrodes arranged in the direction of extension of the plurality of third electrodes and extending in the direction of arrangement of the third electrode, wherein the plurality of first electrodes and the plurality of second electrodes are configured to sense a touch input in a first mode, and wherein the plurality of third electrodes and the plurality of fourth electrodes are spaced apart from each other by the display layer disposed therebetween and are configured to together sense a pen input in a second mode.

* * * * *